US011899824B1

(12) United States Patent
Hall et al.

(10) Patent No.: US 11,899,824 B1
(45) Date of Patent: Feb. 13, 2024

(54) SYSTEMS AND METHODS FOR THE SECURING DATA WHILE IN TRANSIT BETWEEN DISPARATE SYSTEMS AND WHILE AT REST

(71) Applicant: Vive Concierge, Inc., View Park, CA (US)

(72) Inventors: Dwayne Hall, Los Angeles, CA (US); Akwi Devine, Los Angeles, CA (US)

(73) Assignee: Vive Concierge, Inc., View Park, CA (US)

( * ) Notice: Subject to any disclaimer, the term of this patent is extended or adjusted under 35 U.S.C. 154(b) by 0 days.

(21) Appl. No.: 18/456,427

(22) Filed: Aug. 25, 2023

Related U.S. Application Data

(60) Provisional application No. 63/518,379, filed on Aug. 9, 2023.

(51) Int. Cl.
*G06F 21/62* (2013.01)
*G06F 21/60* (2013.01)

(52) U.S. Cl.
CPC ........ *G06F 21/6254* (2013.01); *G06F 21/602* (2013.01); *G06F 21/6227* (2013.01)

(58) Field of Classification Search
CPC . G06F 21/6254; G06F 21/602; G06F 21/6227
See application file for complete search history.

(56) References Cited

U.S. PATENT DOCUMENTS 6,185,567 B1 * 2/2001 Ratnaraj ............... G06F 16/972 707/999.005
11,386,111 B1 * 7/2022 Sommers .......... G06F 16/24532
2003/0123667 A1 7/2003 Weber et al.
2005/0223224 A1 10/2005 Carpentier et al.
2007/0124009 A1 * 5/2007 Bradley ............... G06Q 20/203 700/99
2007/0136091 A1 * 6/2007 McTaggart ............ G16H 40/20 705/2
2011/0184757 A1 * 7/2011 Daniel ................... G06Q 10/10 235/487
2013/0144843 A1 * 6/2013 Srivastava ............. G06F 16/33 707/E17.007

(Continued)

FOREIGN PATENT DOCUMENTS

WO WO-2016081628 A1 * 5/2016
WO WO-2022093845 A1 * 5/2022 ............ G16H 10/60

*Primary Examiner* — Meng Li

(74) *Attorney, Agent, or Firm* — Knobbe, Martens, Olson & Bear LLP

(57) ABSTRACT

Disclosed are methods and systems for secure data communication amongst computer systems. Encrypted data in a first format is accessed over a secure communication channel from a first source for a first subject. Encrypted data in a second format is accessed over a secure communication channel from a second source for the first subject. The encrypted data in the first format from the first source and in the second format from the second source is decrypted. The decrypted data in the first format from the first source and in the second format from the second source is converted to a third format. At least partly in response to the request for information from a first system, at least a portion of the data from the first source and the second source is accessed from a database The accessed data is transmitted in encrypted form to the first system.

22 Claims, 62 Drawing Sheets

(56) References Cited

U.S. PATENT DOCUMENTS

| | | | | |
|---|---|---|---|---|
| 2014/0316972 | A1* | 10/2014 | Yan | G06Q 40/04 705/37 |
| 2015/0309829 | A1* | 10/2015 | Hiltgen | G06F 21/53 718/1 |
| 2016/0019666 | A1* | 1/2016 | Amarasingham | G16H 40/67 705/3 |
| 2016/0180044 | A1 | 6/2016 | Delisle et al. | |
| 2016/0232306 | A1 | 8/2016 | Achan | |
| 2016/0342747 | A1 | 11/2016 | Sale | |
| 2017/0019383 | A1 | 11/2017 | Sauderwald et al. | |
| 2019/0372762 | A1 | 12/2019 | Shainski et al. | |
| 2020/0186520 | A1* | 6/2020 | Oberheide | G06Q 20/356 |
| 2021/0104304 | A1 | 4/2021 | Davidovics et al. | |
| 2022/0012802 | A1* | 1/2022 | Yahata | G06Q 50/12 |
| 2022/0108026 | A1* | 4/2022 | Ortiz | G06F 21/602 |
| 2022/0337631 | A1* | 10/2022 | Bhattacharya | H04L 63/0245 |
| 2023/0099208 | A1* | 3/2023 | Raduchel | G06F 21/31 713/300 |
| 2023/0122179 | A1* | 4/2023 | Mino | G16H 20/40 705/3 |
| 2023/0131525 | A1* | 4/2023 | Šopík | G06F 21/561 726/1 |
| 2023/0247387 | A1* | 8/2023 | Bartlett | H04M 15/8033 455/456.1 |
| 2023/0274003 | A1* | 8/2023 | Liu | G06F 21/577 726/26 |
| 2023/0325821 | A1* | 10/2023 | Honig | G06T 19/006 705/76 |

* cited by examiner

| | PHMS powered by | HIE |
|---|---|---|
| IOS and Android Mobile and Desktop Software | Y | X |
| Media File Sharing-Video and Photos | Y | X |
| Patient Referral Management (Internal and External) | Y | X |
| Geolocation for Health Professionals & Patients | Y | X |
| Interface with Clinical and Non-Clinical Databases | Y | X |
| Secure Real-Time Text Messaging Between Clinicians | Y | X |
| Care Alerts to All Tagged Clinicians for Cases that are Critical Whenever Patient has an Encounter | Y | X |
| Multi-Clinician Telemedicine Visits for Patient Centered Care | Y | X |
| Health Care Tracker to Monitor Health State Changes | Y | X |
| Care Alerts to All Tagged Clinicians for Cases that are Critical Whenever Patient has an Encounter | Y | X |
| Secure Text Messaging Between Patient and Clinician When Enabled | Y | X |
| Voice to Text Capable | Y | X |
| Message Center for all Messages Cross Referenced to Patient | Y | X |
| Alerts to Complete Charting | Y | X |

FIG. 8

| | **Health System** | ive WELLNESS CONCIERGE | Carequality **Integration Manager** |
|---|---|---|---|
| Project Kickoff Call | Participate | **Lead** | Participate |
| Establishing Connectivity | **Lead** | -- | **Lead** |
| Gathering Interface Requirements | Participate | Participate | **Lead** |
| Building and Configuring Interfaces in Redox | -- | -- | **Lead** |
| Facilitating Weekly Check-in Calls | Participate | **Lead** | Participate |
| Functional Testing | Participate | Participate | **Lead** |
| Integrated Testing | Participate | **Lead** | Participate |
| Go-Live | Participate | **Lead** | Participate |
| Transitition to Support | Participate | Participate | **Lead** |

FIG. 12A

FIG. 13D
12:48
Dr. Charles Patton, MD
Specialty: Neurology
Consectetur adipiscing elit,
incididunt ut labore et.
dolore magna aliqua.
consectetur adipiscing elit,
ut At vero eos et
accusamus et iusto
1:29 AM
Upload Documents/Scans
Messaging is restricted, waiting for the doctor to respond.

FIG. 13I
12:48
Dr. Charles Patton, MD
Specialty: Neurology
Doctor is waiting for you on a call
Duration: 1:24
Join
Consectetur adipiscing elit, incididunt ut labore et. dolore magna aliqua. consectetur adipiscing elit, ut At vero eos et accumus et iusto
1:29 AM
I'm happy to help. Can you attend a video chat now?
4:42 AM
I'm ready.Please call me now.
1:29 AM
Write a message

FIG. 13J
12:48
Dr. Charles Patton, MD
Specialty: Neurology
Consectetur adipiscing elit, incididunt ut labore et. dolore magna aliqua. consectetur adipiscing elit, ut At vero eos et accumus et iusto
1:29 AM
Upload Documents/Scans
Messaging is restricted, waiting for the doctor to respond.

SYSTEMS AND METHODS FOR THE SECURING DATA WHILE IN TRANSIT BETWEEN DISPARATE SYSTEMS AND WHILE AT REST

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Field

The present disclosure generally relates to secure transmission of data and the secure storage of data.

Description of the Related Art

An aspect of the present disclosure relates to electronic records, such as electronic health care records, that have been increasingly important in the provision of services, such as medical care. However, such records may be spread out across multiple systems (e.g., associated with different medical service providers), using different databases and database schemas, resulting in data fragmentation. This poses significant technical challenges when attempting to access the relevant data to provide a given service.

Further, as certain data, such as appointment data, may be scattered across various platforms, attempts to access such data may return stale data that is no longer accurate.

Further, particularly in the case of indigent patients with no fixed address and who may use multiple disparate names, it may be difficult to locate the relevant records associated with a given patient. This also poses a technical challenge in ensuring that the correct records are accessed for such a patient.

Yet further, it may be imperative that certain sensitive data be securely communicated and stored. It can be technically challenging to provide the needed security while at the same time providing real time access to such data to a large number of disparate users, such as different hospitals and other medical service providers.

Still further, communication across multiple platforms with different protocols amongst different stakeholders in real time is technically challenging.

Thus, there is a need to address the foregoing technical challenges.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

An aspect of the present disclosure relates to a system, comprising: a network interface; at least one processing device operable to: access over a secure communication channel encrypted data, via the network interface, in a first format from a first source for a first subject; access over the secure communication channel encrypted data in a second format from a second source for a first subject; decrypt the encrypted data in the first format from the first source for the first subject; decrypt the encrypted data in the second format from the second source for the first subject; convert the decrypted data in the first format from the first source to a third format; store the data from the first source in the third format in a data store in a record associated with the first subject; convert the decrypted data in the second format from the second format to the third format; store the data from the second source in the third format in the data store in the record associated with the first subject; receive, via a security layered application programming interface (API) a request for information regarding the first subject from a first system; at least partly in response to the request for information, access from the data store at least a portion of the data from the first source and the second source; and transmit, via the security layered API, the data accessed from the data store in encrypted form to the first system and enable the transmitted data to be rendered in a first user interface.

Optionally, the system is configured to perform authentication on an application attempting to access the security layered API, determine if an authenticated application is authorized to access data being requested by the authenticated application, perform input validation and sanitization on received data, and to perform throttling. Optionally, the system is configured to: receive an indication that a second subject is to reserve a first resource; periodically access a first resource reservation system for the first resource; detect a newly available time period for the first resource; transmit a notification to the second resource regarding the newly available time period for the first resource; and enable the second resource to reserve the first resource for the newly available time period. Optionally, the system is configured to: provide a dedicated virtual software environment, a dedicated hardware environment, and a multi-tenant environment. Optionally, the system is configured to: utilize the security layered API configured to provide search, web, application and notification functions. Optionally, the system is configured to: process an internal referral to a first resource; and process an external referral to a second resource. Optionally, the system is configured to: perform device discovery and communication using a distributed hierarchical registry. Optionally, the system is configured to: perform data cleaning and conflict resolution on data from the first source and data from the second source. Optionally, the system is configured to issue JSON queries to request elements of stored JSON documents comprising patient data. Optionally, the data from the first source stored in the third format is encrypted using a customer master key. Optionally, the system is configured to: receive a search request for a patient record from a requester system, the search request comprising at least a portion of a patient name; identify patients matching the search request; score a closeness of matches for the identified patients; and provide search results comprising at least a portion of the identified patients, the search results comprising, for a given identified patient a name, birthdate, sex, age, telephone number, service provider, and a score indicating the closeness of match.

An aspect of the present disclosure relates to a computer-implemented method, the method comprising: accessing over a secure communication channel encrypted data in a first format from a first source for a first subject; accessing over the secure communication channel encrypted data in a second format from a second source for a first subject; decrypting the encrypted data in the first format from the first source for the first subject; decrypting the encrypted data in the second format from the second source for the first subject; converting the decrypted data in the first format from the first source to a third format; storing the data from the first source in the third format in a data store in a record associated with the first subject; converting the decrypted data in the second format from the second format to the third format; storing the data from the second source in the third format in the data store in the record associated with the first subject; receiving, via a security layered application programming interface (API) a request for information regarding the first subject from a first system; at least partly in response to the request for information, accessing from the data store at least a portion of the data from the first source and the second source; and transmitting, via the security layered API, the data accessed from the data store in encrypted form to the first system and enable the transmitted data to be rendered in a first user interface.

Optionally, the method further comprises performing authentication on an application attempting to access the security layered API, determining if an authenticated application is authorized to access data being requested by the authenticated application, and performing input validation and sanitization on received data. Optionally, the method further comprises: receiving an indication that a second subject is to reserve a first resource; periodically accessing a first resource reservation system for the first resource; detecting a newly available time period for the first resource; transmitting a notification to the second resource regarding the newly available time period for the first resource; and enabling the second resource to reserve the first resource for the newly available time period. Optionally, the method further comprises: providing a dedicated virtual software environment, a dedicated hardware environment, and a multi-tenant environment. Optionally, the method further comprises: utilizing the security layered API configured to provide search, web, application and notification functions. Optionally, the method further comprises: processing internal referral to a first resource; and processing an external referral to a second resource. Optionally, the method further comprises: performing device discovery and communication using a distributed hierarchical registry. Optionally, the method further comprises: performing data cleaning and conflict resolution on data from the first source and data from the second source. Optionally, the method further comprises issuing one or more JSON queries to request elements of stored JSON documents comprising patient data. Optionally, the data from the first source stored in the third format is encrypted using a customer master key. Optionally, the method further comprises: receiving a search request for a patient record from a requester system, the search request comprising at least a portion of a patient name; identifying patients matching the search request; scoring a closeness of matches for the identified patients; and providing search results comprising at least a portion of the identified patients, the search results comprising, for a given identified patient a name, birthdate, sex, age, telephone number, service provider, and a score indicating the closeness of match.

BRIEF DESCRIPTION OF THE DRAWINGS

Embodiments will now be described with reference to the drawings summarized below. These drawings and the associated description are provided to illustrate example aspects of the disclosure, and not to limit the scope of the invention.

FIG. 8 shows a comparison of functionality of the disclosed systems and methods to a conventional system.

FIGS. 12A-B show various example healthcare integration roles and responsibilities.

DETAILED DESCRIPTION

Figure 1:
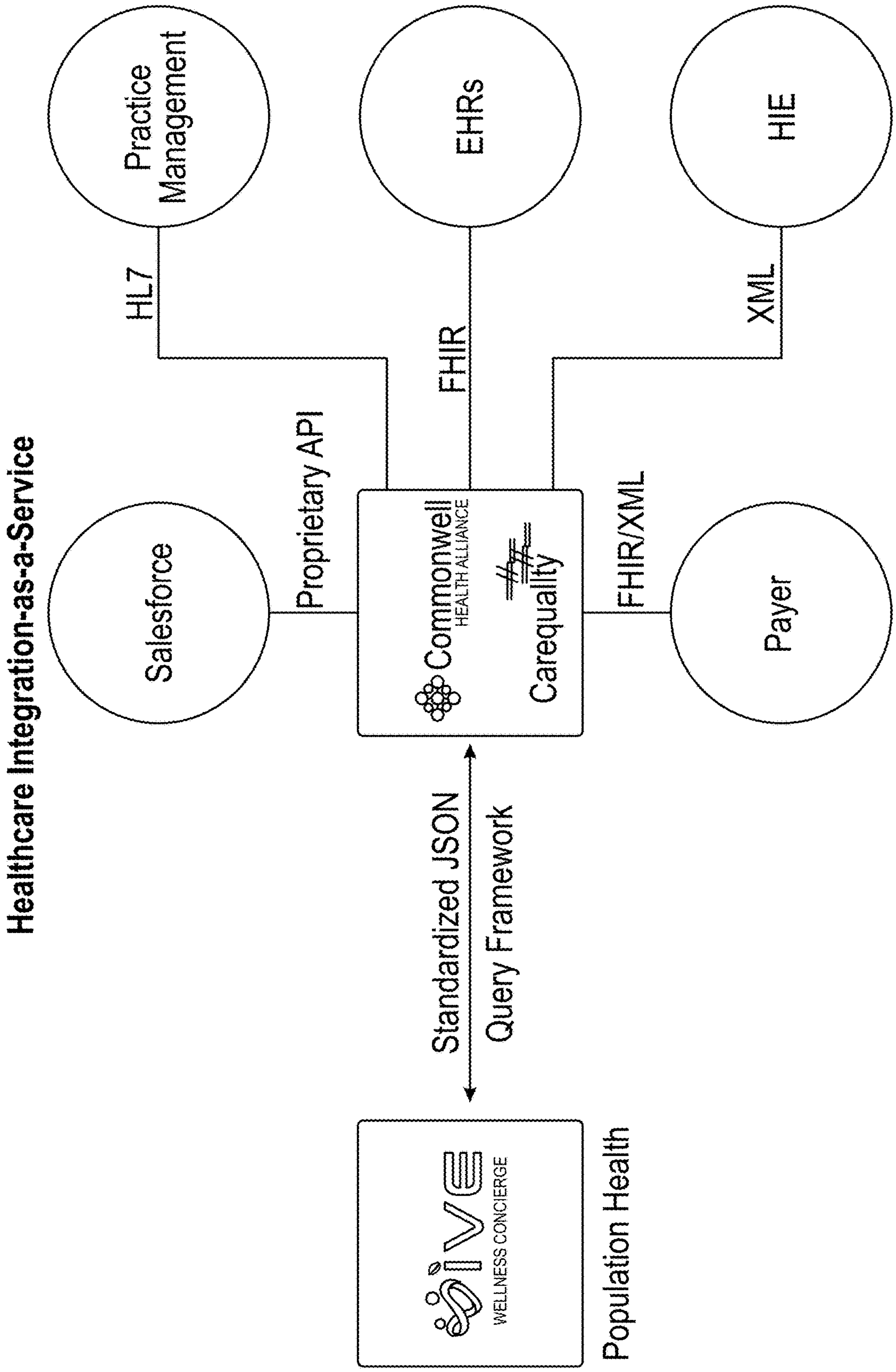
FIG. 1 illustrates an example networked architecture.

Aspects of the present disclosure address technical challenges described herein. For example, electronic records, such as electronic health care records, have been increasingly important in the provision of services, such as medical care. However, such records may be spread out across multiple systems (e.g., associated with different medical service providers), using different databases and database schemas, resulting in data fragmentation. This poses significant technical challenges when attempting to access the relevant data to provide a given service.

Further, as certain data, such as appointment data, may be scattered across various platforms, attempts to access such data may return stale data that is no longer accurate.

Further, particularly in the case of indigent patients with no fixed address and who may use multiple disparate names, it may be difficult to locate the relevant records associated with a given patient. This also poses a technical challenge in ensuring that the correct records are accessed for such a patient.

Yet further, it may be imperative that certain sensitive data be securely communicated and stored. It can be technically challenging to provide the needed security while at the same time providing real time access to such data to a large number of disparate users, such as different hospitals and other medical service providers.

Still further, communication across multiple platforms with different protocols amongst different stakeholders in real time is technically challenging.

The disclosed example systems and methods provide technical solutions to such technical challenges. As will be described, data in transit and at rest may be encrypted to enhance security.

An aspect of the present disclosure relates to a networked architecture that securely communicates data to and from healthcare provider systems. A security-layered API (Application Programming Interface) may be utilized by a health care management system to interface with healthcare provider systems and with user devices. The security-layered API may be configured to protect both the API itself and the data it handles. The disclosed system enables mobile healthcare providers to access over an encrypted channel data regarding a patient from multiple sources via a common user interface via handheld wireless devices (e.g., smart phone, tablets, laptop computers, and/or the like) enabling healthcare to be provided outside of medical facilities. The example platform may be implemented using a decentralized network architecture or a distributed network architecture.

The example platform functions as a system and method of delivering care through a virtualized techniques with advanced tools of managing, treating, and coordinating care around educating, coaching, and sustaining primary care. The example platform incorporates advanced technology, such as graphical and artificial intelligence ("AI") tools, allowing for the patient to customize care as their needs and those of their family are used to create services that are anticipatory of their unique health conditions as they age or experience changes in their health condition.

The disclosed platform is capable of deployment into underserved and rural regions to expand the availability of basic and advanced care, as well as allowing for lower income communities to access qualified physicians by matching low-income persons to physicians and other health care providers offering pro-bono care and support. The example platform decreases the burdens on the emergency rooms and lowers overall per patient healthcare costs by focusing on prevention, supporting sustainable outcomes by reinforcing and using holistic care plans, and expanding job creation and employment opportunities for health professionals and independent physician practices. The example platform can be used as a tool that enables concierge care, in office and virtual staff expansion and management, and a HIPAA compliant means of delivering services to patients.

The example platform is able to provide health care access to "care deserts" wherein limited access to medical care increases instances of aggravated illness and taxes the public care system. The virtual platform allows physicians and other health care team members to provide voluntary pro-bono care to individuals experiencing displacement, housing insecurity, transitional or vagrant living situations due to economic crises, those who live under itinerant conditions and low-income communities ("LICs"). The example platform incorporates the use of the US Treasury Community Development Financial Institution ("CDFI") mapping system to identify, track, and measure engagement within LICs with health professionals.

An aspect of the present disclosure relates to a customized external Application Programming Interface ("API") platform that integrates patient data, health care resources and information through mobile online accessibility, search, geolocation, and notification functionality. The API platform facilitates health care professionals to provide necessary medical care, illness prevention and harm reduction in otherwise adverse environments and unfavorable conditions.

The disclosed systems and methods optionally utilize advanced algorithms and artificial intelligence within a virtual, cloud-based graph platform to track, measure, record, and analyze patient care and activity to produce baseline predictors of emerging needs within various populations. The use of filtering and subjective analysis allows for cataloging, identifying, and driving written and recorded content to patients based upon their patterns of use and care.

The virtual, cloud-based graph platform enables the creation, management, and analysis of graph data (e.g., healthcare provider performance data) in a virtualized and cloud-hosted environment. Graph data comprises of interconnected nodes and edges, representing entities and relationships between them. This type of platform provides a scalable and flexible way to handle graph data without the need for physical hardware or on-premises infrastructure. The platform may be configured with a managed graph database service, allowing users to store, retrieve, and update graph data. It provides an efficient way to manage the complexity of relationships between data points. Being cloud-based, the platform can dynamically scale its resources up or down based on demand. This ensures that the system can handle varying workloads and data sizes effectively. The platform optionally abstracts the underlying hardware, enabling users to work with virtual instances of the graph database. This reduces or eliminates the need for physical server management and optimizes resource utilization. The platform optionally enables users to define graph schemas and data models, specifying the types of nodes, relationships, and properties within the graph. This aids in structuring the data for efficient querying and analysis. A graph query language may be supported, enabling users to retrieve specific information from the graph database based on complex patterns and relationships. The platform optionally integrates with tools and libraries for data analysis and visualization. This enables users to gain insights from the graph data and make informed decisions. The cloud-based platforms may be configured with security measures, such as the security layered API and encryption techniques described elsewhere herein.

The platform may implement multi-tenancy support enabling multiple users or organizations (tenants) on the same platform infrastructure, optionally each with their isolated graph databases and resources. The platform may be configured to enable users to import data from various sources into the graph database and export data (e.g., for backup or analysis purposes).

The platform is optionally configured with APIs and connectors that enable integration with other cloud services, applications, or analytics platforms.

Due to more personalized care which focuses on prevention, the example platform, while creating expanded opportunities for health professionals, moves the patient along the path at urgent care to primary care while decreasing their need to seek more costly paths of medical treatments and ensuring better outcomes through lifestyle changes and greater access to convenient care.

The disclosed systems and methods enable structuring rapid implementation and long term support. The disclosed systems and methods may also include an implementation plan that is cloud-based, wherein a medical concierge feature, such as Vive Concierge, will use the private cloud-based servers for accessing, processing, logging, storage, breaches, and redundancy backup of population health information. This optionally implementation is based on the HIPAA Security Controls Mapping Implementation Playbook.

FIG. 1 is an overview of an example networked architecture configured to provide healthcare integration-as-a-service. In accordance with the disclosed example embodiment, technology-enabled information sharing of electronic health records ("EHR") is utilized to build upon existing applications and EHR platforms to establish an interoperable system of coordination (e.g., where all street medicine providers can access patient health information and coordinate across the delivery system).

For example, population health may be accessed via a health care management system hosting a platform configured to send and receive patient records, including data such as registration data, medication data, allergy data, lab/radiology; medical history and medication history, vaccination data, clinical notes, and/or Homeless Management Information System ("HMIS") data for a given patient. The health care management system may access from and/or provide patient data to an intermediary networked system that connects to multiple sources of patient large health systems, clinics, specialists and/or other patientcare systems (e.g., practice management systems, electronic healthcare record systems, customer relationship management systems, insurance systems, and/or the like). A JSON query framework may be utilized in the request for patient data, where the JSON query by reference and request elements of stored JSON documents. Advantageously, the JSON data model is more flexible than SQL, and does not require data to be stored in a well-defined schema. JSON is a file format and data interchange format that uses human-readable text to store and transmit data objects consisting of attribute—value pairs and arrays. Data may be accessed by the health care management system and/or the intermediary system may access patient data from a variety of health care provider systems using an API compatible with FH IR (Fast Healthcare Interoperability Resources) which defines how healthcare information can be exchanged between different computer systems regardless of how it is stored in those systems, HL7 comprising standards for the transfer of clinical and administrative health data between applications, and/or XML.

Figure 2:
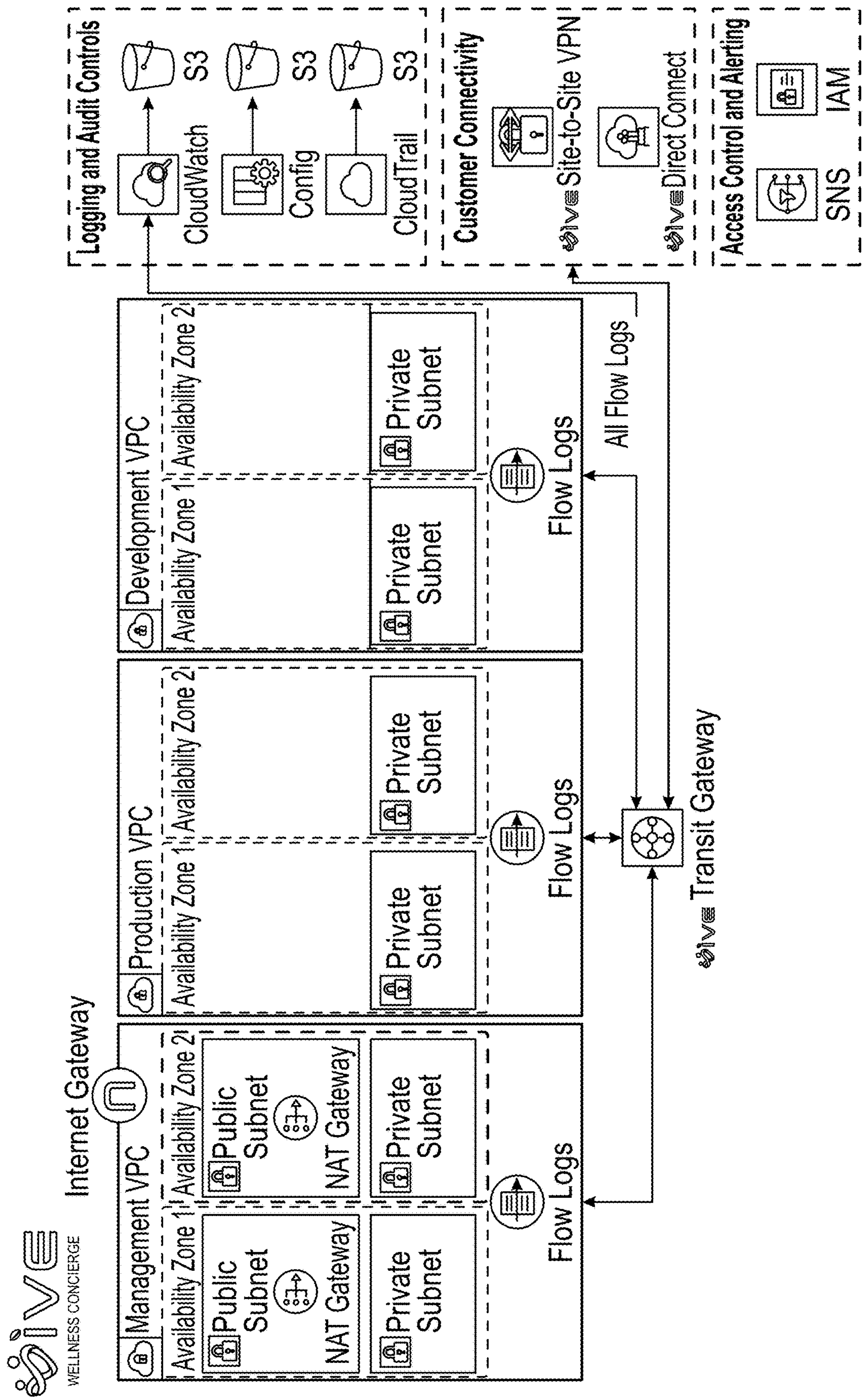
FIG. 2 is a flow diagram of an example private cloud-based application.

FIG. 2 is a flow diagram of the example private cloud-based application. The application may utilize virtual private cloud ("VPC") technology, for an on-demand configurable pool of shared resources allocated within a public cloud environment, providing a certain level of isolation between the different organizations using the resources. The application platform consists of a management VPC, a production VPC, and development VPC, connected via a transit gateway to flow logs, audit controls, customer connectivity, access control and alerting.

Figure 3:
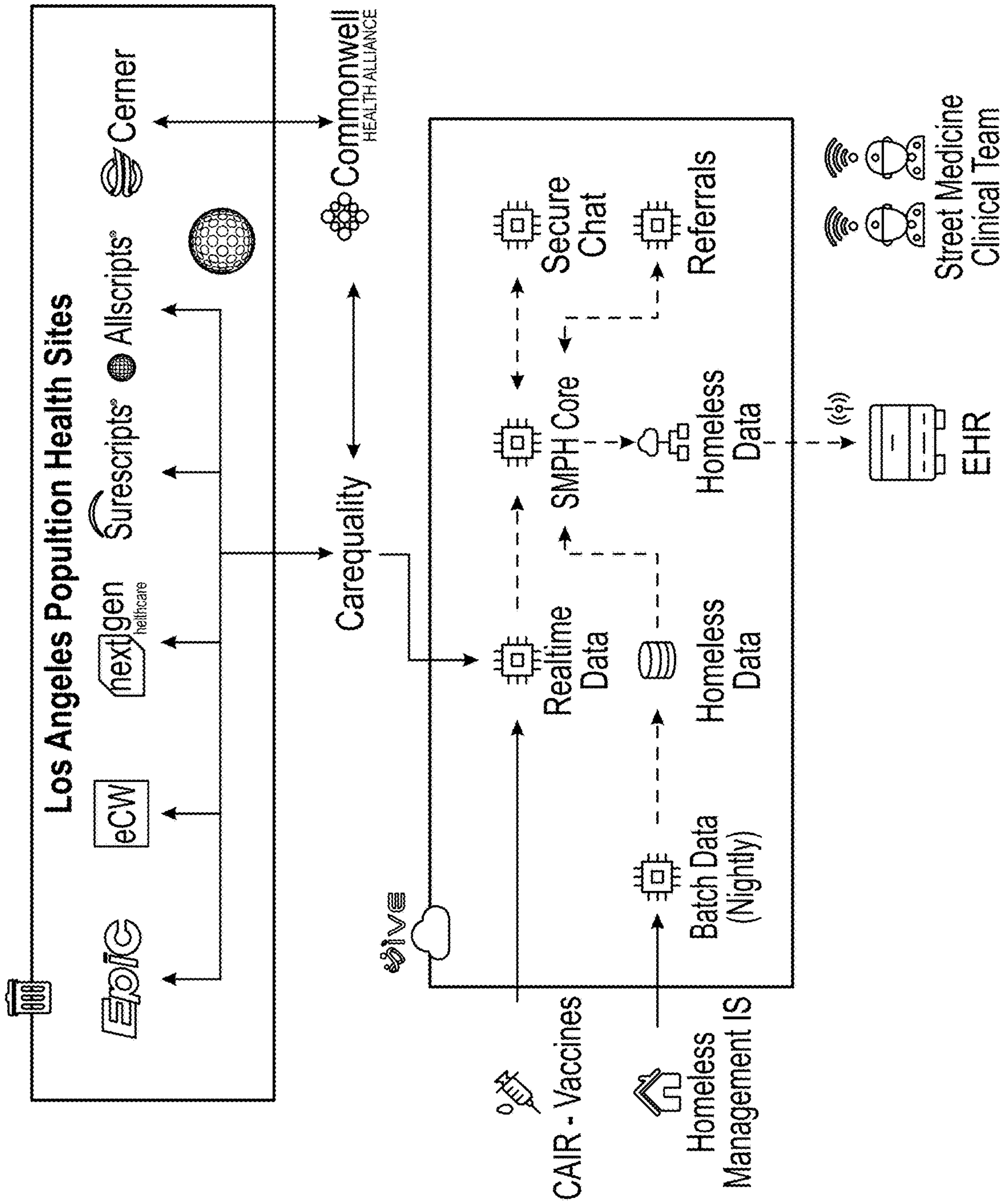
FIG. 3 is a diagram of an example end-to-end data flow.

FIG. 3 is a diagram of an example end-to-end data flow which may be utilized in conjunction with the example networked architecture illustrated in FIG. 1. In accordance with the disclosed example embodiment, tackling complex problems starts with understanding the data flow and human needs involved. The example disclosed platform is configured to send and receive patient records, including data (optionally real time data) such as: registration; medication; allergies; lab/radiology; medical history and medication history software ("Med Hx"); vaccinations; clinical notes; and/or Homeless Management Information System ("HMIS") data. The example platform offers real-time coordination and communication, including secure text; provider referrals; and geolocation features.

For example, a given employer and its employees may utilize man different healthcare services provided using respective systems. Examples of such systems may include health information technology systems that may be utilized by an employer to access, organize, store, and share electronic medical records; practice management systems, prescription systems; homeless management service systems, and/or the like. The homeless management service systems may provide information on a homeless patient, such as their name, aliases, physical description (e.g., height, weight, distinguishing features, age, gender, sex, etc.), areas where the patient often camps, and/or the like to better enable a patient to be located and identified. The health care management system may input the data from the various systems and consolidate the data, which may then be stored in a centralized healthcare record using a healthcare record platform, optionally in encrypted from. Optionally, the centralized healthcare records may be accessed and updated by medical service providers, such as clinical teams (e.g., via mobile computing devices, such as wirelessly networked phones, tablets, or laptop computers) providing medical services to homeless people on the streets.

The patient healthcare data may be securely stored in a database. For example, the data may be encrypted before storing it in the database. This ensures that even if someone gains access to the physical storage or backups, the data remains unreadable without the appropriate decryption keys. Encryption keys used to encrypt data may be managed using hardware security modules (HSMs). The data may also be encrypted (e.g., using the HTTPS, SSL/TLS, and SSH protocols) while it's being transmitted between a given application disclosed herein and the database to prevent interception or eavesdropping. Role-based access control (RBAC) may be utilized where roles are assigned to users and access permissions are granted based on such roles. A given user may only be permitted to access data and operations necessary for their responsibilities. In addition, attribute-based access control (ABAC) may be utilized where access is controlled based on specific attributes or conditions, such as user roles, location, time, and data sensitivity. Optionally, multi-factor authentication (MFA) may be utilized where users need to provide multiple forms of verification (e.g., password or a biometric input and a one-time code) to access the database. Data masking may optionally be utilized where a masked version of sensitive data is provided for display to users who don't have the necessary privileges to view the actual data. Data redaction may optionally be utilized where portions of sensitive data are permanently delete obscured when displaying it to certain users, even in query results. Logging mechanisms to record database activity and access attempts. A database firewall may be utilized to monitor and filter incoming and outgoing database traffic, preventing unauthorized access and suspicious queries. Optionally, the databases may be segmented to isolate different types of data. This minimizes the impact of a breach and limits access to sensitive information.

The health care management system may provide, based in part on the patient data and on data regarding medical service providers, patient referrals to medical service providers. In addition, one or more secure communication channels may be provided that enables a patient to securely communicate (e.g., via a text, audio, and/or video chat session) with different medical service providers via a centralized platform.

Figure 4A:
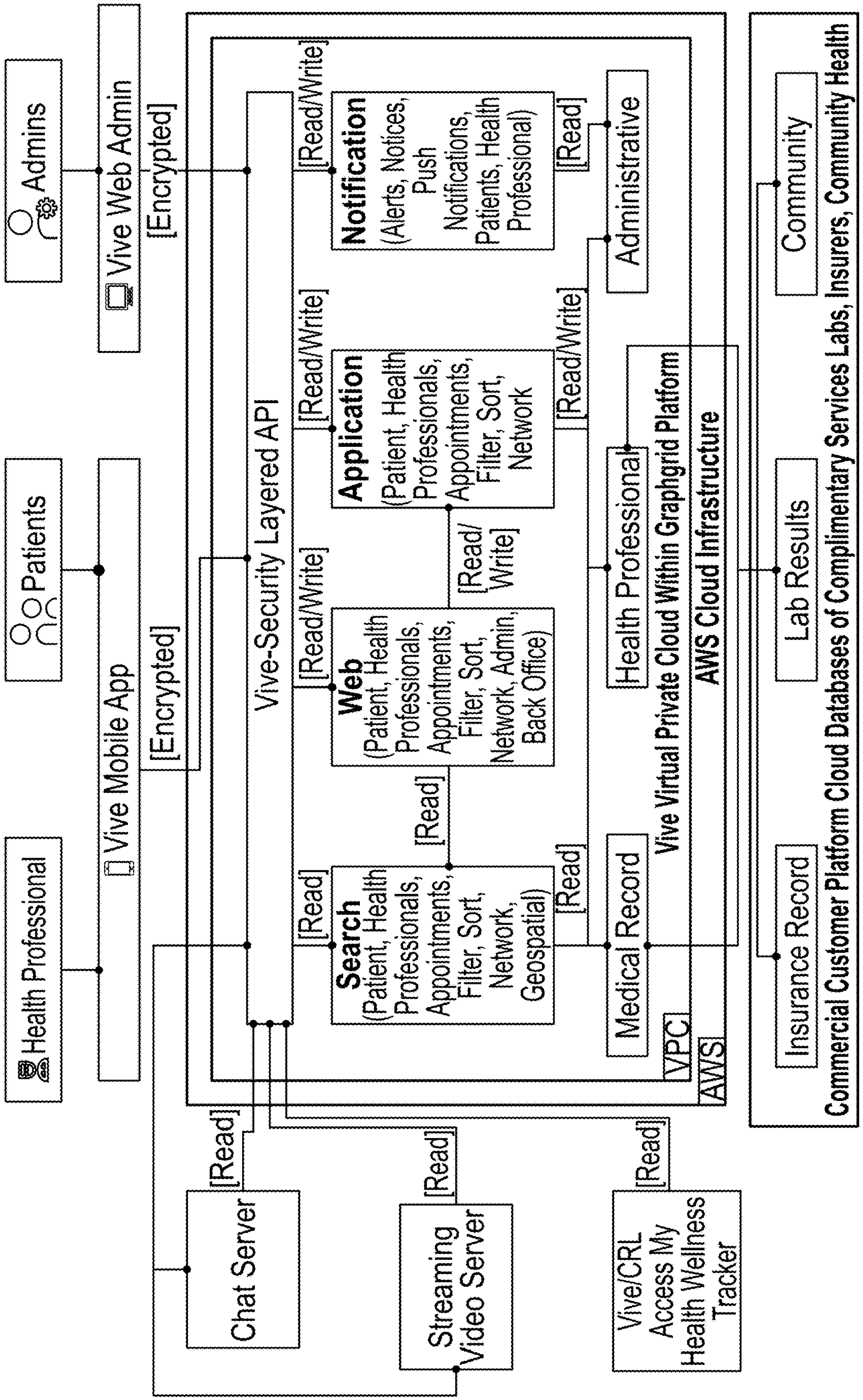
FIGS. 4A-B are diagrams of an example platform architecture.
Figure 4B:
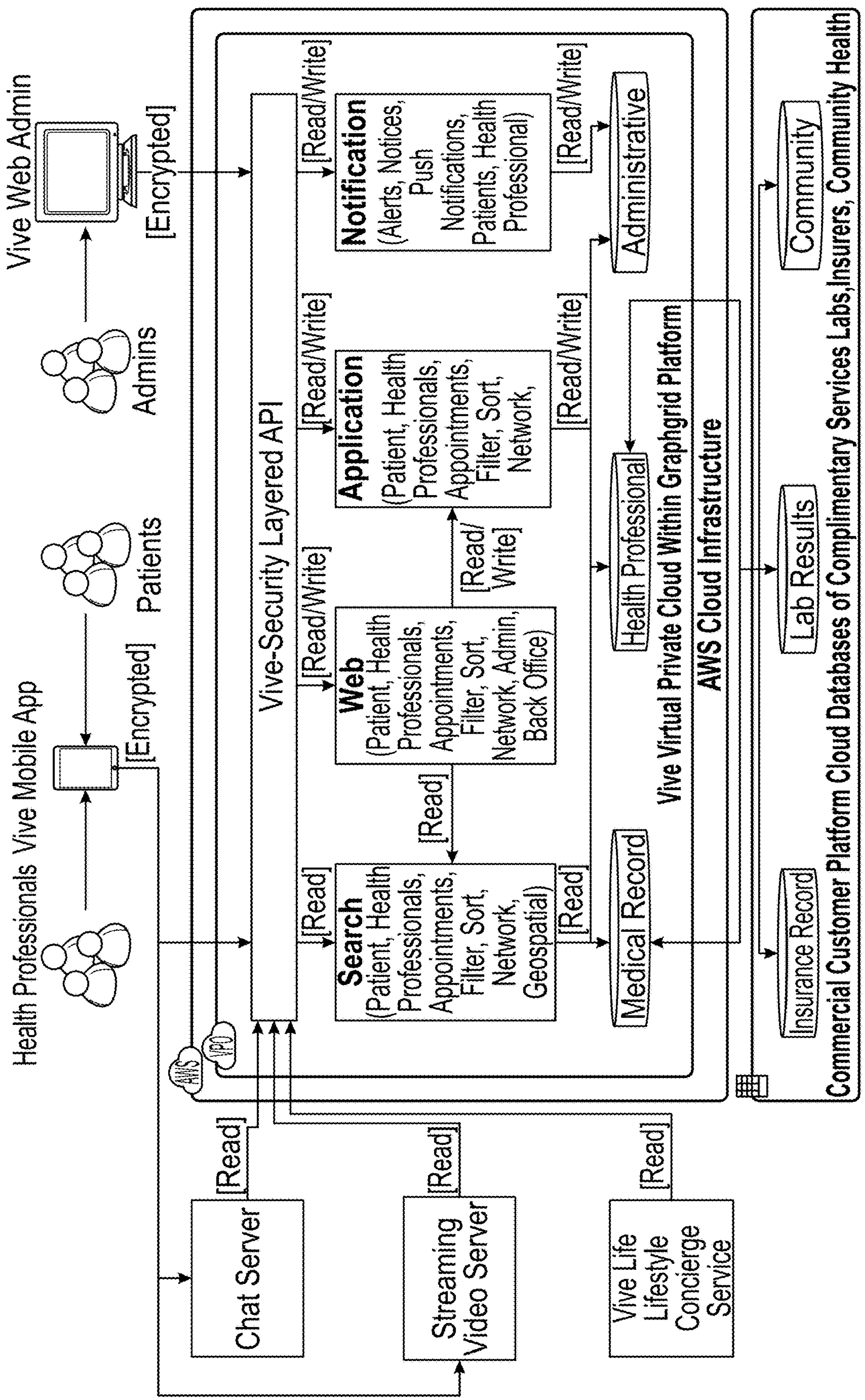

FIGS. 4A-B are diagrams of an example platform architecture which may be utilized to perform functionality described herein. In accordance with the disclosed example embodiment, health professionals and patients can use the mobile application to access the example platform through a security layered API. Administrators can also access the example platform through a web admin portal. The security layered API provides functions that include search, web, application and notification. Through these functions, health professionals and patients can access medical records, as well as health professional and administrative modules. The API is optionally located on a virtual private cloud ("VPC") infrastructure. The medical record and health professional modules also allow for access to insurance records, lab results, other data disclosed herein, and the overall community of the platform. The security layered API can also provide health professionals and patients with access to the platform's chat server, streaming video server, and access to a health and wellness feature.

The web feature allows admin, patients, and health professionals to access the search engine for patients, health professionals, and appointments with the option to sort the search results based on insurance network, location, and other filters. It also provides a back office and administrative features for the admin access. The application feature is also accessible by admin, health professionals, and patients and acts as the user interface for each, providing access to patient information, health professional information, appointments, and more. The user interface is tailored to the user, and appears different for health professionals and patients, respectively. Users may choose to enable notifications, which provides the user with alerts, notices, and push notifications for upcoming appointments, messages from patients or health professionals, reminders, special offers, and more. All the data collected such as lab results and insurance records are stored on commercial customer platform cloud databases and may be securely accessed by the respective patient and sent to the patient's disclosed providers when applicable.

As discussed above, a security-layered API (Application Programming Interface) may be utilized by the health care management system to interface with other systems and user devices. The security-layered API may incorporate multiple layers of security measures to protect both the API itself and the data it handles. This approach is used to ensure the confidentiality, integrity, and availability of data, prevent unauthorized access, and mitigate various security risks.

The first security layer may perform authentication of users or applications attempting to access the API. Authentication mechanisms, such as API keys, tokens (such as OAuth tokens), or digitally signed JWTs (JSON Web Tokens) may be utilized. Authentication ensures that only authorized entities can interact with the API.

Once a user or application is authenticated, the API determines what actions they are allowed to perform. This may be referred to as an authorization step. Different users or roles may be provided different levels of access to different parts of the API or specific operations. Authentication may be implemented utilizing access control lists (ACLs) or role-based access control (RBAC).

Input validation and sanitization may optionally be performed by the API on data it receives from users or applications. This prevents security vulnerabilities such as SQL injection, cross-site scripting (XSS), and more.

APIs are often subject to overuse or misuse, whether intentional or unintentional. Rate limiting and throttling mechanisms are optionally employed to restrict the number of requests that can be made within a certain time frame, preventing abuse and ensuring fair usage.

The API may be configured to perform data encryption on data being transmitted to other systems or user devices.

Data Encryption: APIs should ensure that data transferred between the client and the server is encrypted to prevent eavesdropping and data interception. Optionally, Transport Layer Security (TLS) and/or other encryption mechanisms described herein may be utilized to establish secure encrypted connections.

The data received from the API may be stored securely using encryption and proper access controls. This prevents unauthorized access to data even if the underlying storage is compromised.

An API gateway may be utilized that acts as a centralized entry point for multiple APIs. the API gateway may optionally provide additional security features such as caching, traffic analysis, logging, and/or API composition. The API gateway may also manage the application of security policies across various APIs.

Monitoring and logging mechanisms may be utilized to identify any abnormal or malicious activity, such as security breaches, and to generate audit trails.

A Web Application Firewall (WAF) may optionally be utilized to inspect and filter incoming traffic to block malicious requests and attacks, such as SQL injection, cross-site scripting, and/or the; like.

Figure 5:
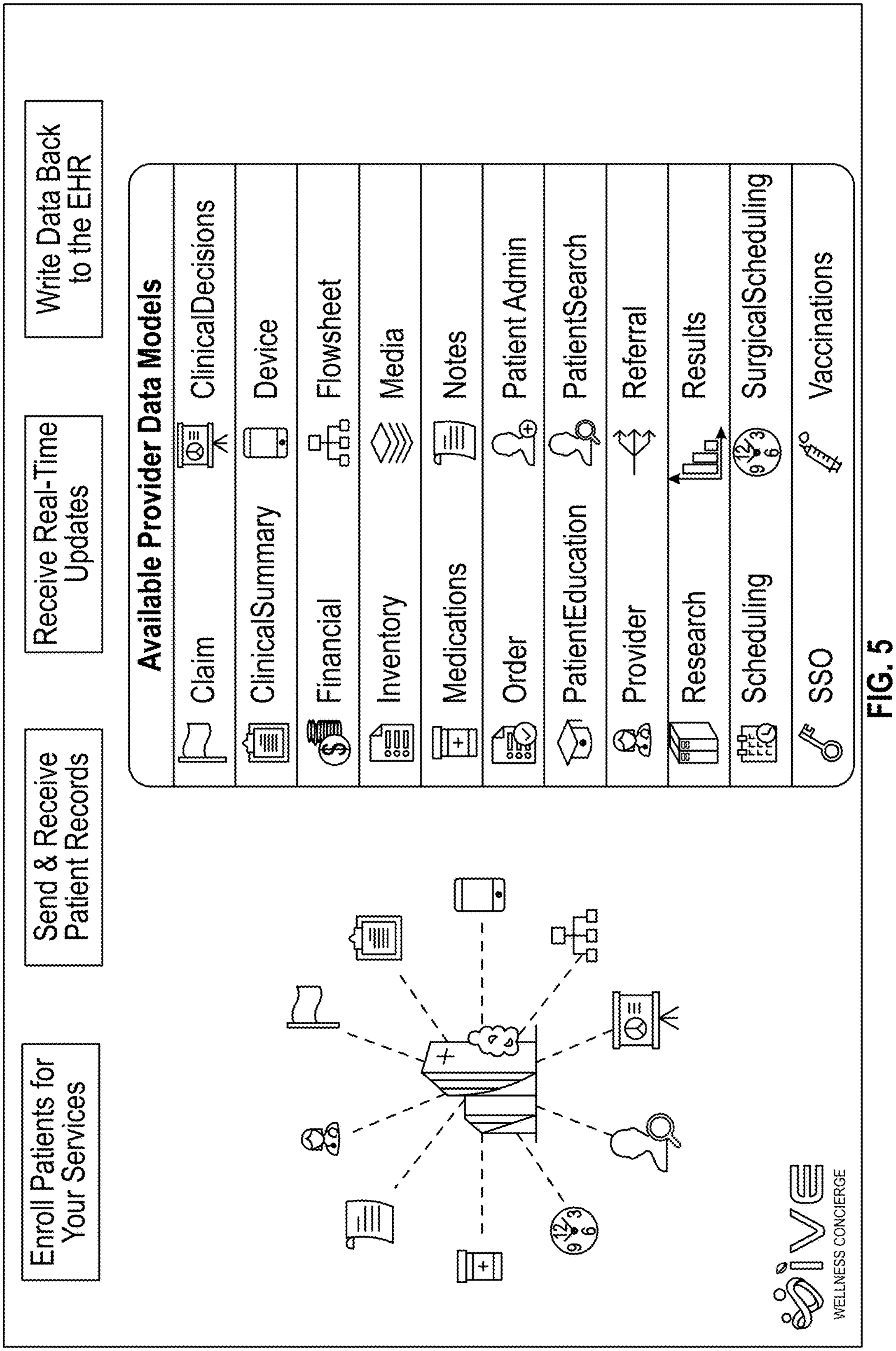
FIG. 5 is a diagram of example integrated data sets.

FIG. 5 is a diagram of example integrated data sets. In accordance with the disclosed example embodiment, the example platform is configured to provide features such as patient enrollment, sending and receiving patient records, real time updates, and writing data to electronic health records (EHR). The example platform also features various provider data models, such as: claims; clinical decisions and summaries; mobile device; financial; flow sheet; inventory; media; medications; notes; orders; patient admin, education and search; provider; referral; research; results; appointment and surgical scheduling; single sign on ("SSO"); and vaccinations.

Figure 6A:
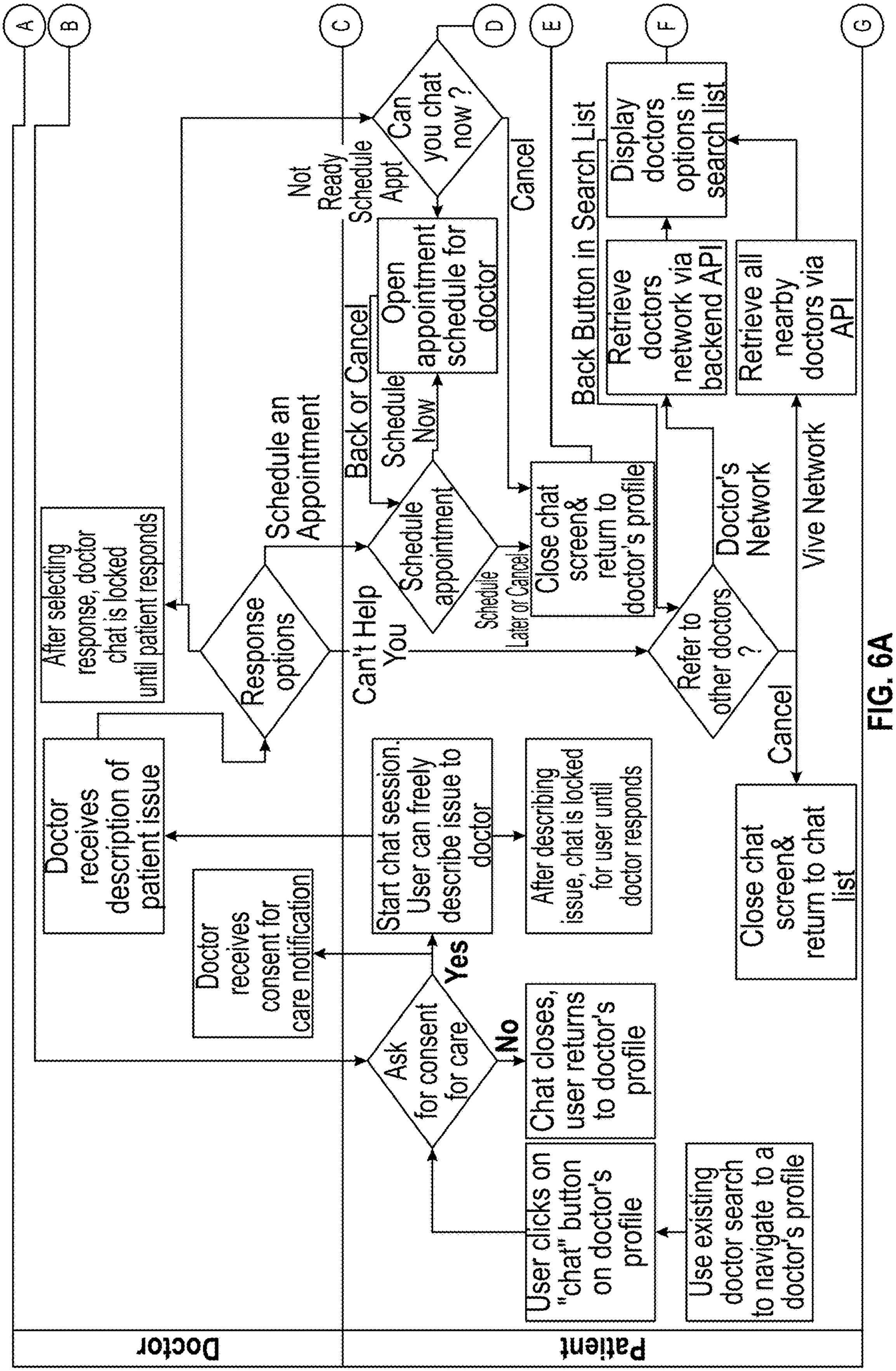
FIGS. 6A-B are flow diagrams of an example appointment workflow.
Figure 6B:
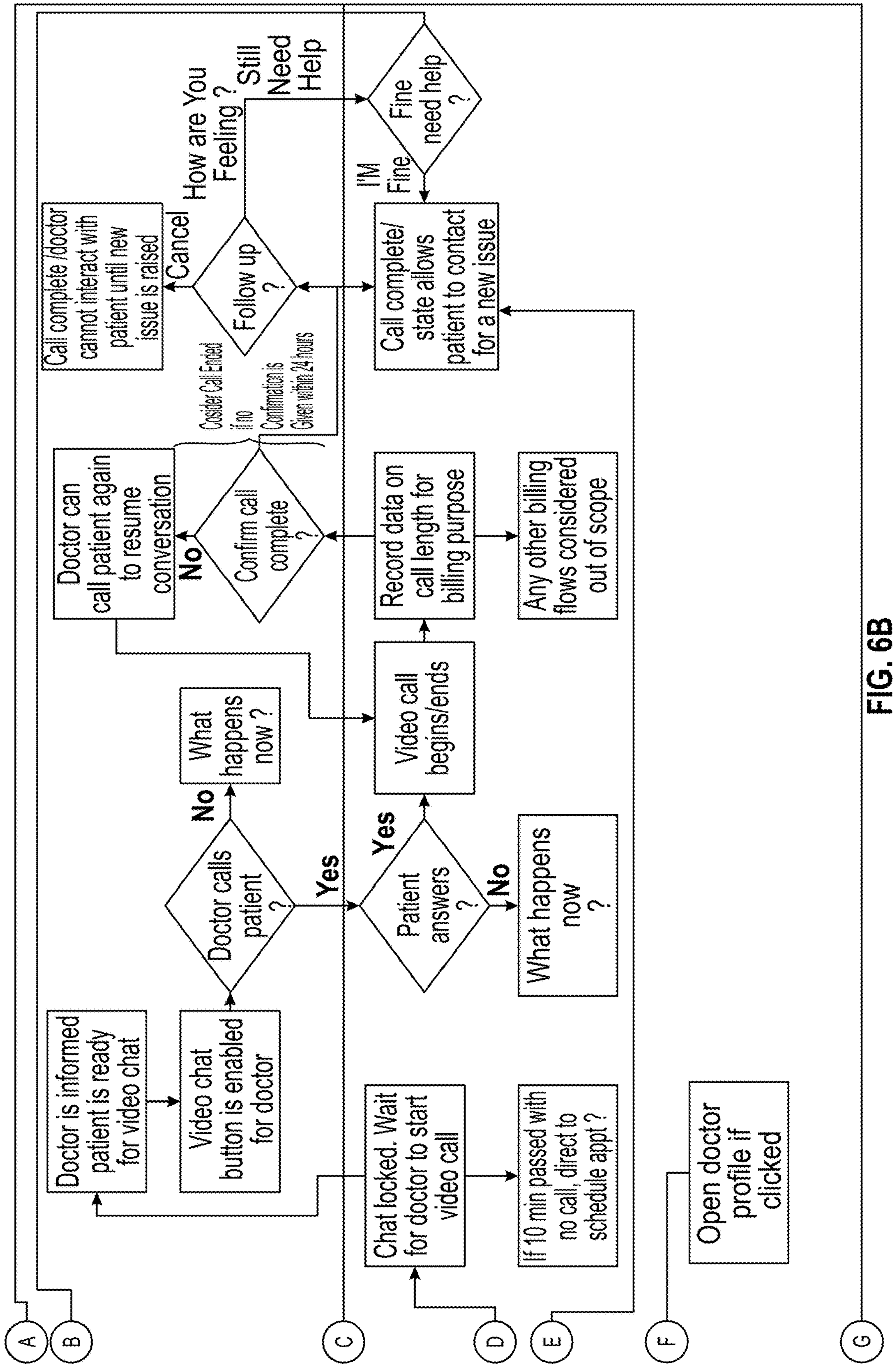

FIGS. 6A-B are flow diagrams of an example appointment workflow. In accordance with the disclosed example embodiment, the patient user can use the platform's existing doctor search to navigate to a doctor's profile. The user clicks on the "chat" button on the doctor's profile, which is followed by a verification of consent for care from the patient user. If the patient selects no, the chat function closes and the user is returned to the doctor's profile. If the patient selects yes, the doctor receives a notification of the consent and the chat session can start, wherein the user can freely describe the issue to the doctor. After describing the issue, the chat is locked for the user until the doctor responds. The doctor receives the description of the patient's issue from the chat, and is then able to select from response options. If the doctor cannot help the patient with the specific issue, the doctor can then refer the patient to other doctors within the doctor's network or platform network. The doctor network is retrieved through a backend API, and the doctor options are displayed on a search list, allowing for the patient to select another doctor. The chat is then closed. If the doctor agrees to help the patient, the next step is to schedule an appointment, allowing the patient to schedule now or schedule at a later time. The patient can also chat with the doctor if the doctor is available at that time.

If the doctor is available, the chat is then locked until the doctor starts a video call for a virtual appointment. The doctor is then informed that the patient is ready for a video chat, and the video chat button is enabled. The doctor initiates the video call appointment, and once the patient answers, the appointment officially begins. Data such as the length of the call is recorded for billing purposes. Once the appointment call is complete, the doctor can call the patient again to resume another conversation, or the appointment is considered complete if no follow up is necessary. The patient is then able to contact the doctor if they have a new issue.

Figure 7A:
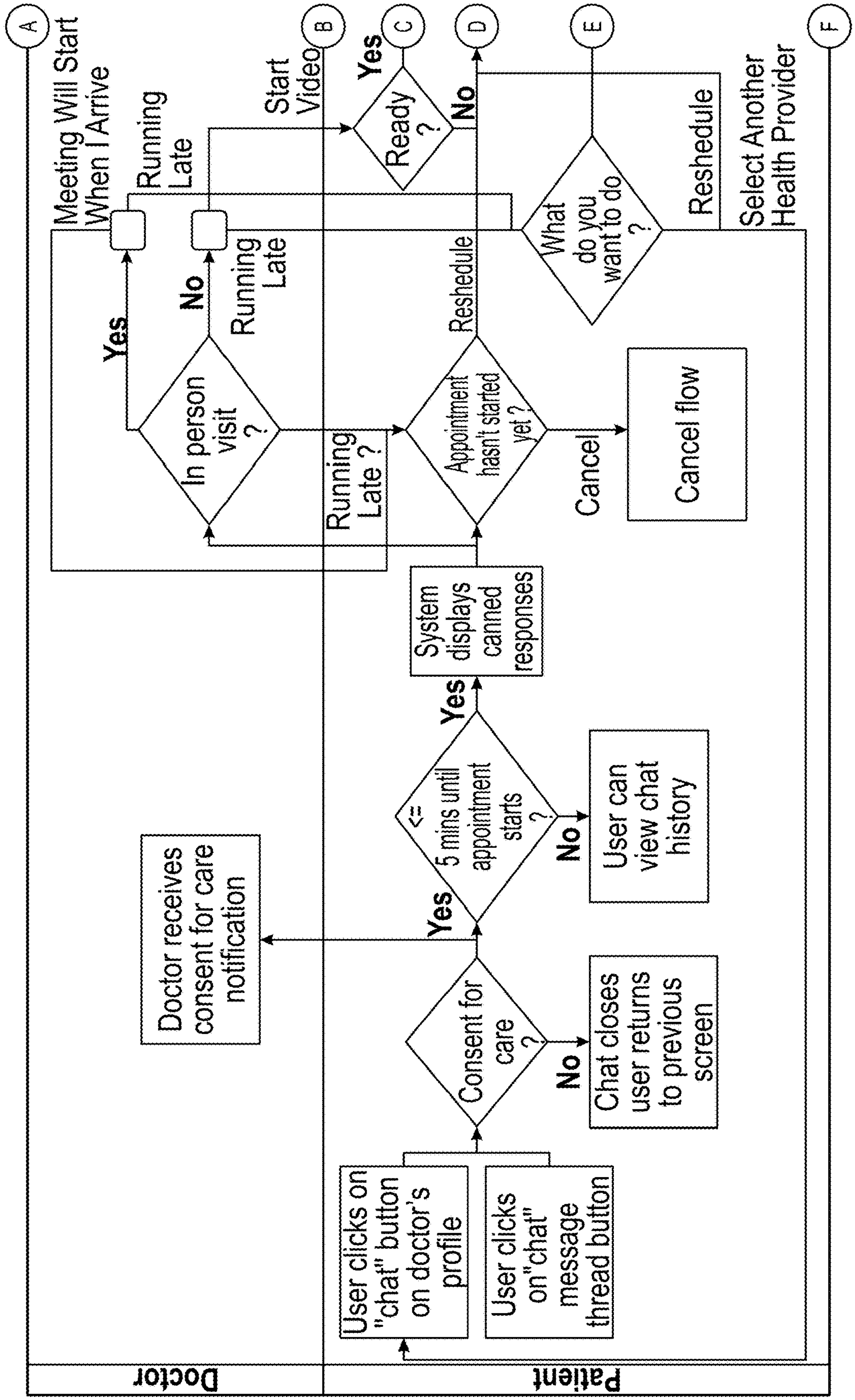
FIG. 7A-B are example flow diagrams of an appointment and chat workflow.
Figure 7A:
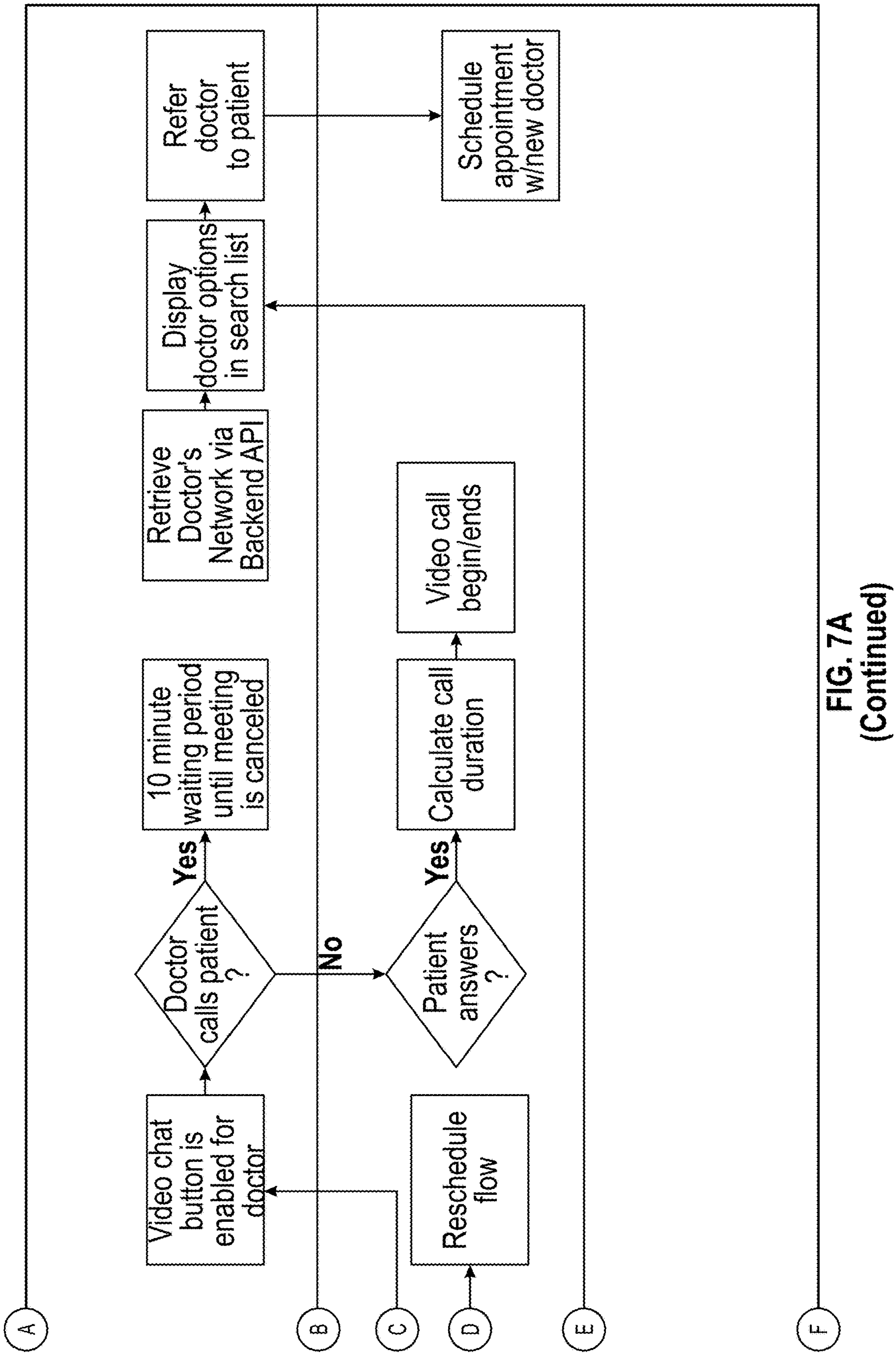
Figure 7B:
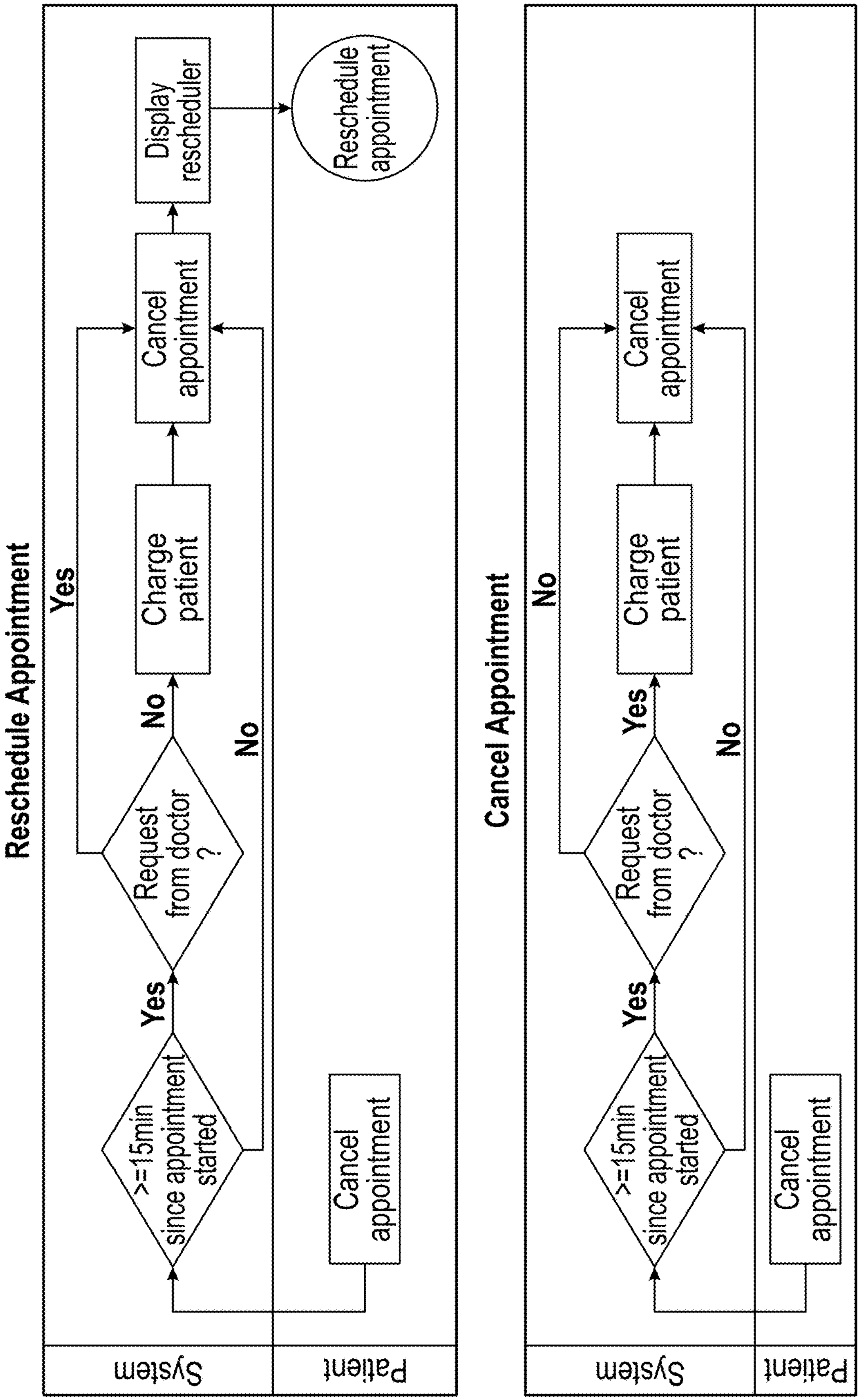

FIG. 7A-B are flow diagrams of an example appointment and chat workflow. In accordance with the disclosed example embodiment, the patient user can click on the "chat" button on a doctor's profile, or click on the "chat" message thread button. Once the user gives consent for care, the doctor receives a notification of consent, and the patient is notified that the appointment will start in a specific amount of time (e.g., 5 minutes). The patient is able to cancel the appointment within that time or reschedule if necessary. Once the doctor is ready to start the appointment, a video chat button is enabled and the appointment can begin when the doctor calls the patient. If the doctor cannot help the patient with the specific issue, the doctor can then refer the patient to other doctors within the doctor's network or platform network. The doctor network is retrieved through a backend API, and the doctor options are displayed on a search list, allowing for the patient to select another doctor. The patient can then schedule an appointment with another doctor.

If the patient chooses to cancel the appointment, the patient can be charged and is presented with the rescheduling module to reschedule the appointment. If the doctor has requested to reschedule the appointment, the patent will not be charged and is able to reschedule the appointment through the rescheduling module. The patient or doctor can also cancel the appointment without rescheduling another appointment.

FIG. 8 shows a comparison of functionality of the disclosed systems and methods to a system, such as the electronic health information exchange ("HIE"). An aspect of the present disclosure relates to a Population Health Management System ("PHMS") that utilizes a multitude of features not offered by HIE, including but not limited to: IOS and Android mobile and desktop software; media file sharing—video and photos; patient referral management (internal and external); geolocation for health professionals & patients; interface with clinical and non-clinical databases; secure real-time text messaging between clinicians; care alerts to all tagged clinicians for cases that are critical whenever patient has an encounter; multi-clinician telemedicine visits for patient centered care; healthcare tracker to monitor health state changes; care alerts to all tagged clinicians for cases that are critical whenever patient has an encounter; secure text messaging between patient and clinician when enabled; voice to text capable; message center for all messages cross referenced to patient; and alerts to complete charting.

Figure 9:
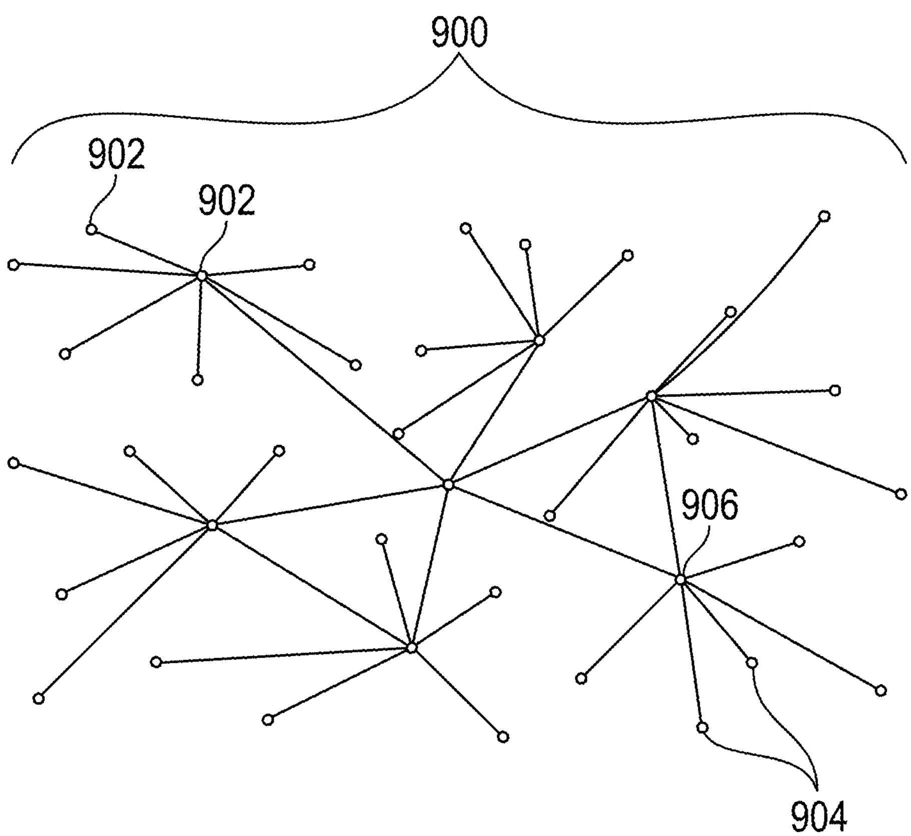
FIG. 9 is a line diagram illustrating a decentralized network.

FIG. 9 is a line diagram illustrating a decentralized network. In accordance with the disclosed example embodiment, the specific architecture of the network can be either decentralized or distributed. FIG. 9, generally represented by the numeral 900, provides an illustrative diagram of the decentralized network. FIG. 9 depicts each node with a dot 902. A given node may correspond to a given system or portion thereof described herein.

Under this system, each node is connected to at least one other node 904. Only some nodes are connected to more than one node 906.

The decentralized network may comprise a plurality of peer nodes, with a given node functioning as a client and server simultaneously. The decentralized architecture enhances fault tolerance, scalability, and security while enabling distributed decision-making and data storage. The disclosed decentralized network architecture enables distributed data storage, consensus mechanisms, and decision-making. A given peer node may be a self-contained unit (e.g., comprising processing capabilities, storage capacity, and communication abilities) capable of communicating directly with other peers to share resources, validate transactions, and collectively manage network operations.

Decentralized network may provide distributed data storage. Optionally, copies of certain data may be stored across multiple peer nodes through replication. Thus, a given node may maintain a copy of the replicated data, ensuring availability and resilience in the event of node failures.

Optionally, consensus mechanisms, including Proof of Work (PoW) or Proof of Stake (PoS), may be used to validate and agree upon the state of the network. Consensus prevents malicious activities and maintains the integrity of transactions. Optionally, network decisions are made collectively by peer nodes. Optionally, no central authority dictates network rules or operations. Optionally, consensus mechanisms may be utilized to facilitate agreement on matters such as data updates, transaction sequencing, and resource allocation.

The decentralized architecture enables easy scalability as, optionally, new peer nodes can join the network without central coordination. The redundancy of data across peers enhances fault tolerance and ensures data accessibility.

Optionally, a blockchain is employed to record and secure transactions or data changes. The transparent and immutable nature of the blockchain enhances trust and auditability.

Figure 10:
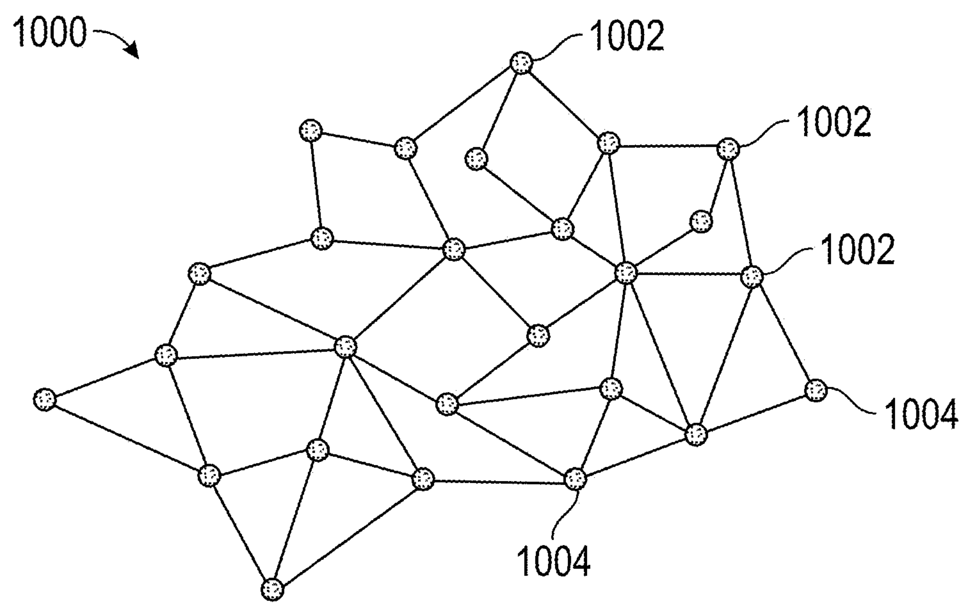
FIG. 10 is a line diagram illustrating a distributed network.

FIG. 10 is a line diagram illustrating a distributed network. For comparison purposes, FIG. 10, which is generally represented by the numeral 1000, illustrates a distributed network.

Specifically, the illustration shows the interconnection of each node 1002 in a distributed decentralized network 1000. In accordance with the disclosed example embodiment, each node 1002 in the distributed network 1000 is optionally directly connected to at least two other nodes 1004. This allows each node 1002 to transact with at least one other node 1002 in the network. The software can be deployed on a centralized, decentralized, or distributed network.

In one embodiment, each transaction (or a block of transactions) is incorporated, confirmed, verified, included, or otherwise validated into the blockchain via a consensus protocol. Consensus is a dynamic method of reaching agreement regarding any transaction that occurs in a decentralized system. In one embodiment, a distributed hierarchical registry is provided for device discovery and communication.

The distributed hierarchical registry comprises a plurality of registry groups at a first level of the hierarchical registry, each registry group comprising a plurality of registry servers. The plurality of registry servers in a registry group provide services comprising receiving client update information from client devices, and responding to client lookup requests from client devices. The plurality of registry servers in each of the plurality of registry groups provide the services using, at least in part, a quorum consensus protocol.

As another example, a method is provided for device discovery and communication using a distributed hierarchical registry. The method comprises broadcasting a request to identify a registry server, receiving a response from a registry server, and sending client update information to the registry server. The registry server is part of a registry group of the distributed hierarchical registry, and the registry group comprises a plurality of registry servers. The registry server updates other registry servers of the registry group with the client update information using, at least in part, a quorum consensus protocol.

Figure 11:
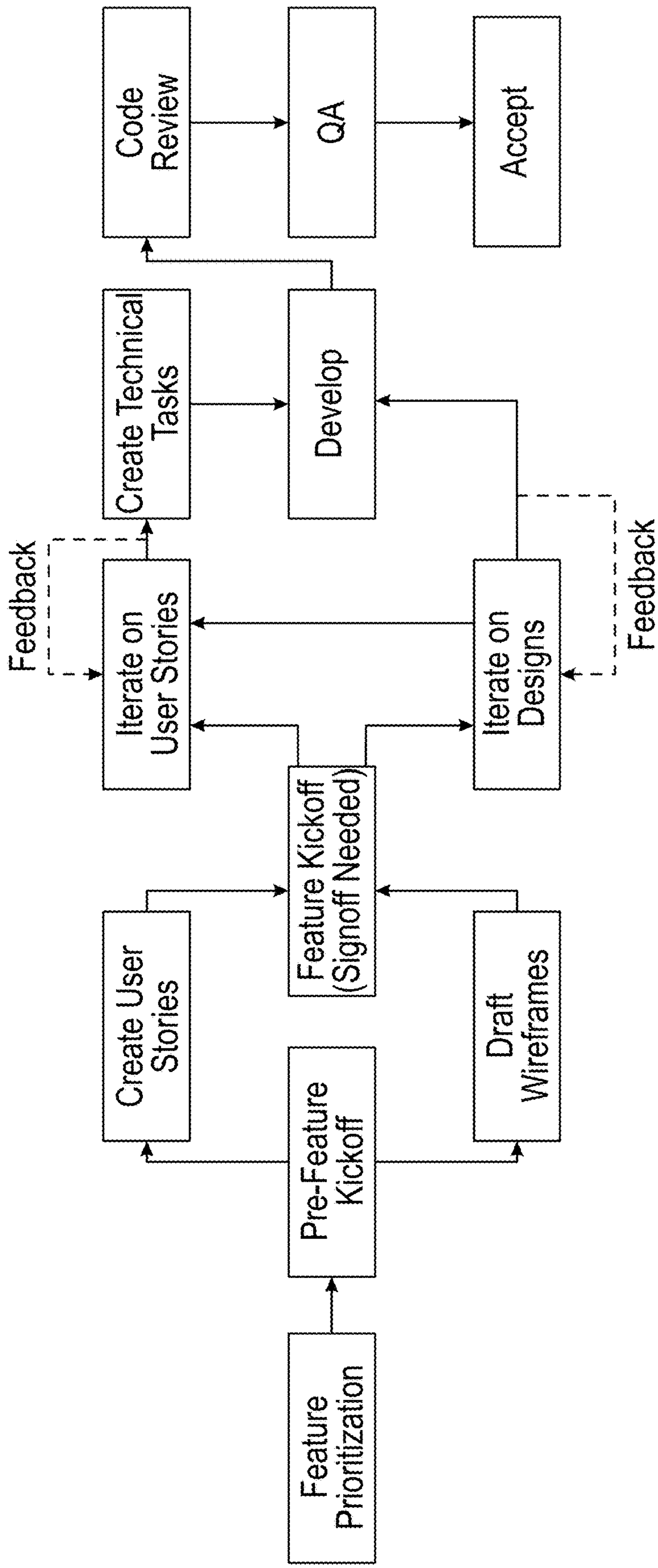
FIG. 11 is a flow diagram of an example process.

FIG. 11 is a flow diagram of an example process. In accordance with the disclosed example embodiment, some or all application features are subjected to this process before implementation into the platform.

Figure 12B:
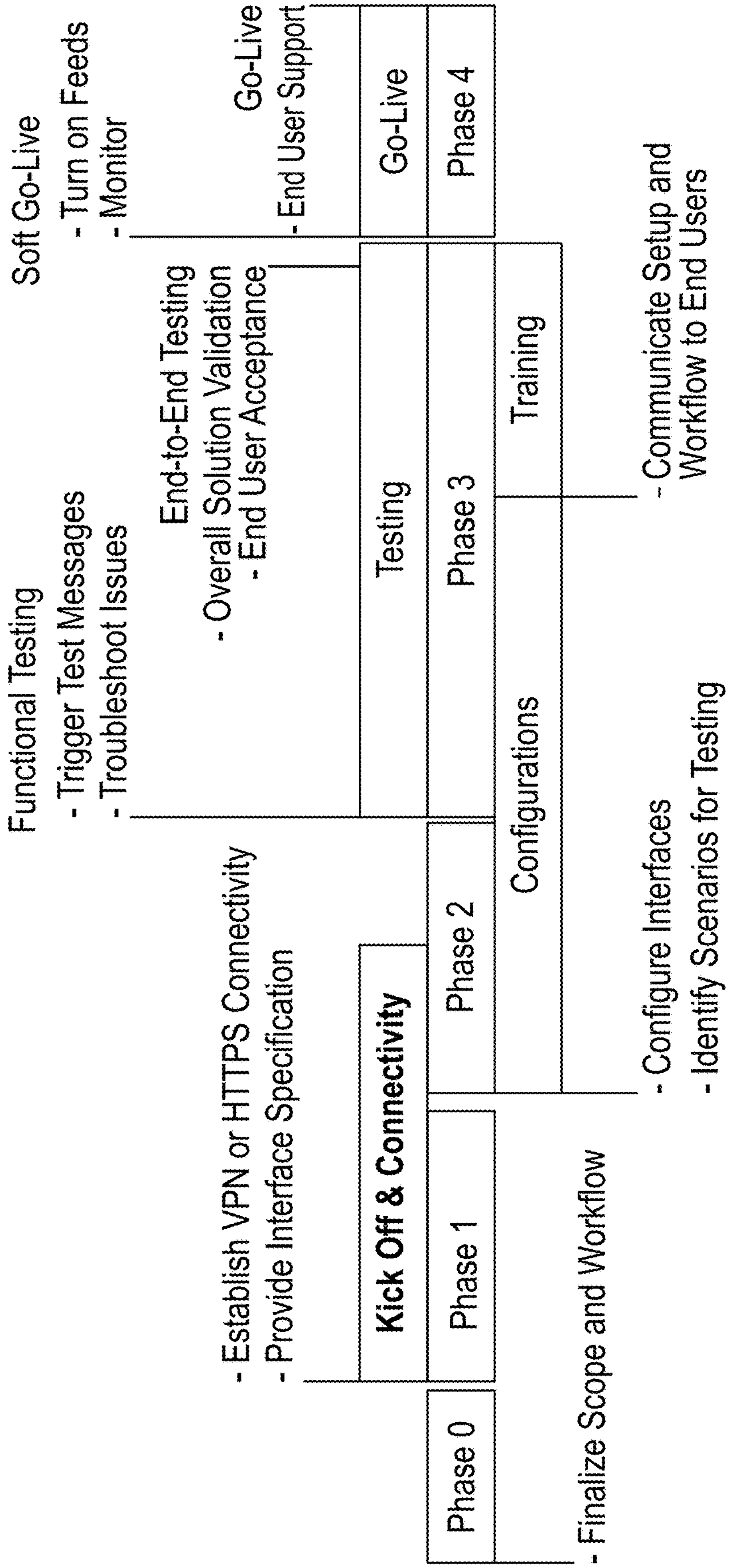

FIGS. 12A-B show various example healthcare integration roles and responsibilities. FIG. 6A shows various example healthcare integration roles and responsibilities, including the project kickoff call; establishing connectivity; gathering interface requirements; building and configuring interfaces in redox; facilitating weekly check-in calls; functional testing; integrated testing; go-live; and transition to support. FIG. 6B is a diagram of an example integration process, showing the phases used to integrate the disclosed example platform to other platform structures such as CareQuality.

Figure 13A:
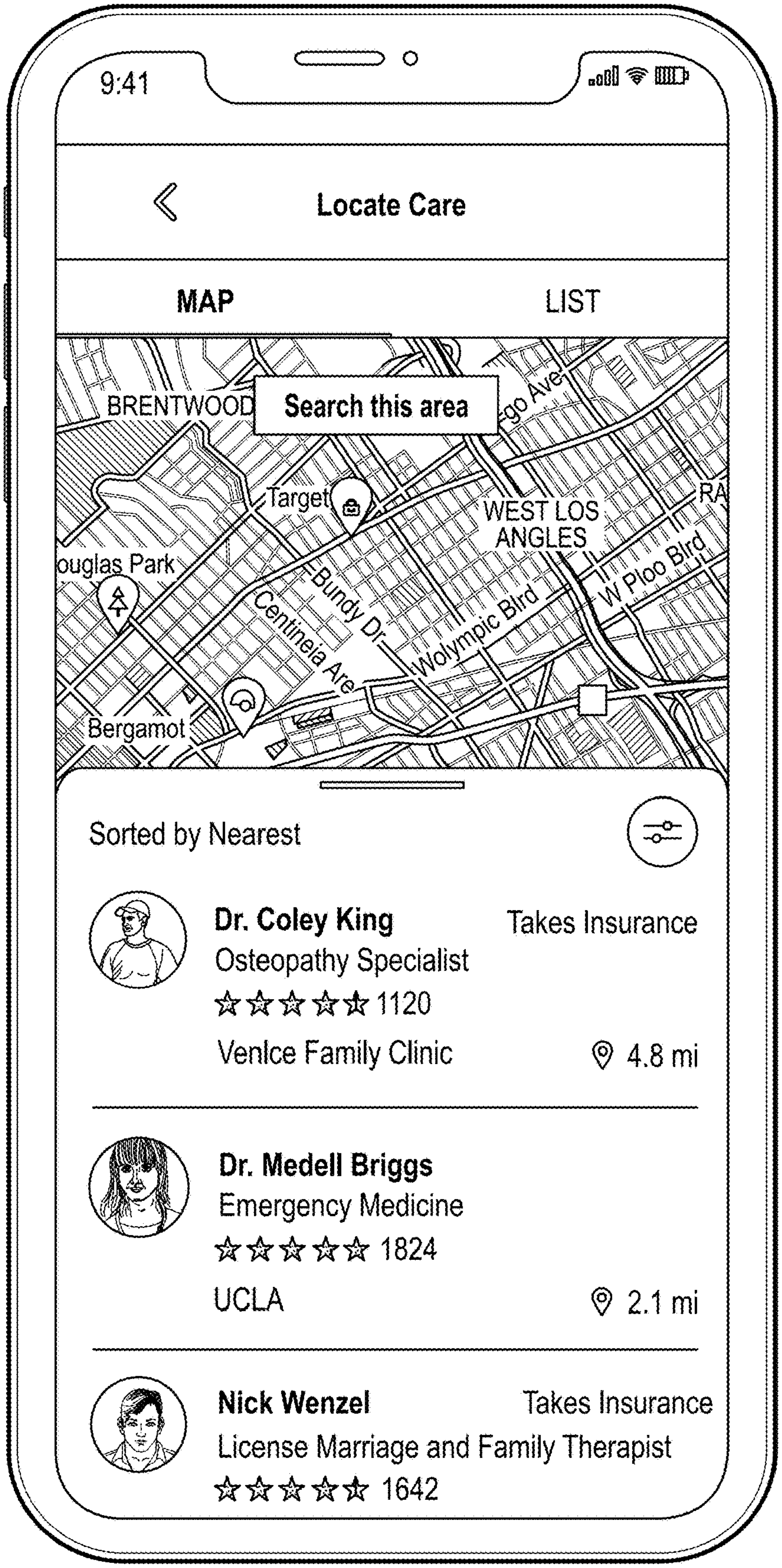
FIGS. 13A-T are renderings of example mobile application interfaces.
Figure 13B:
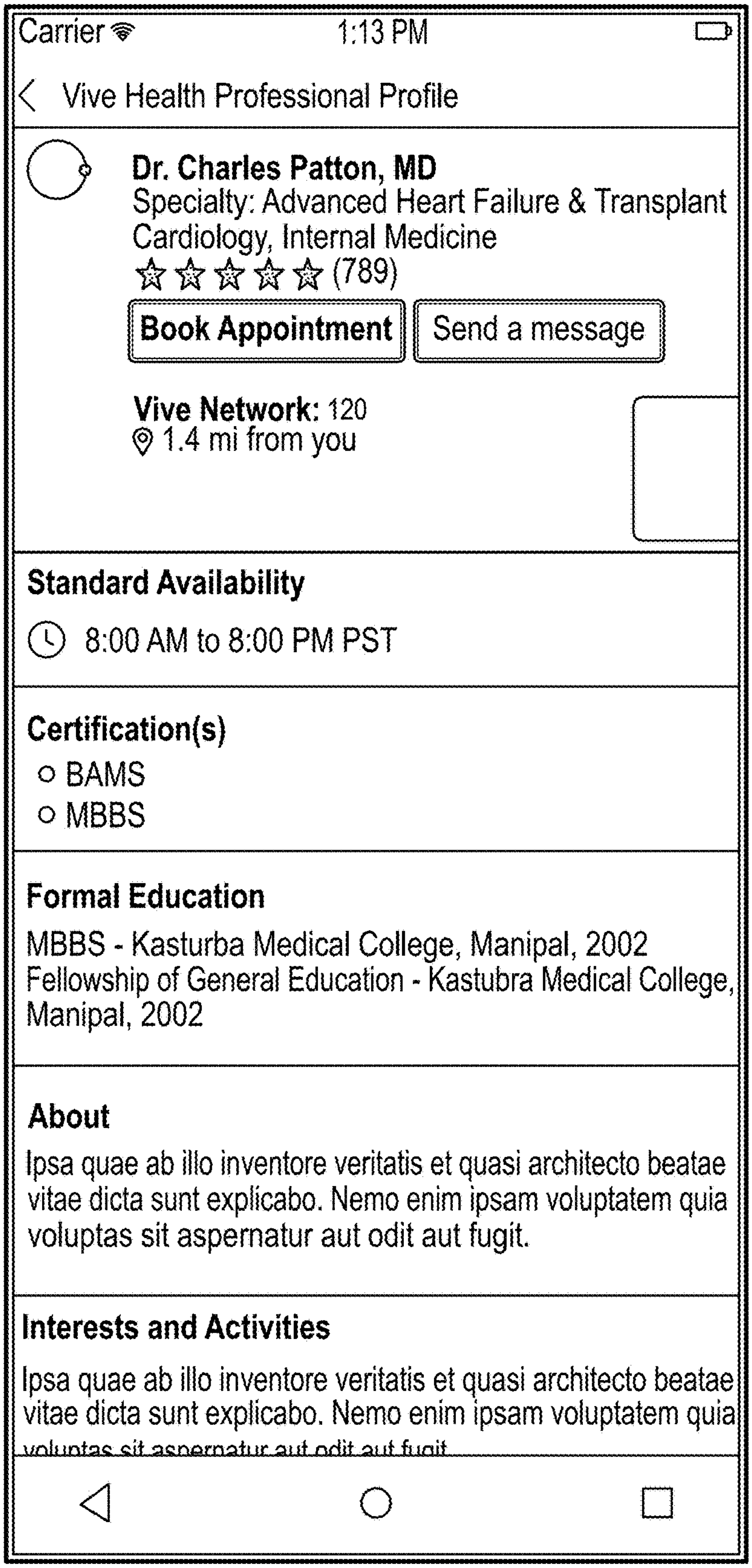
Figure 13C:
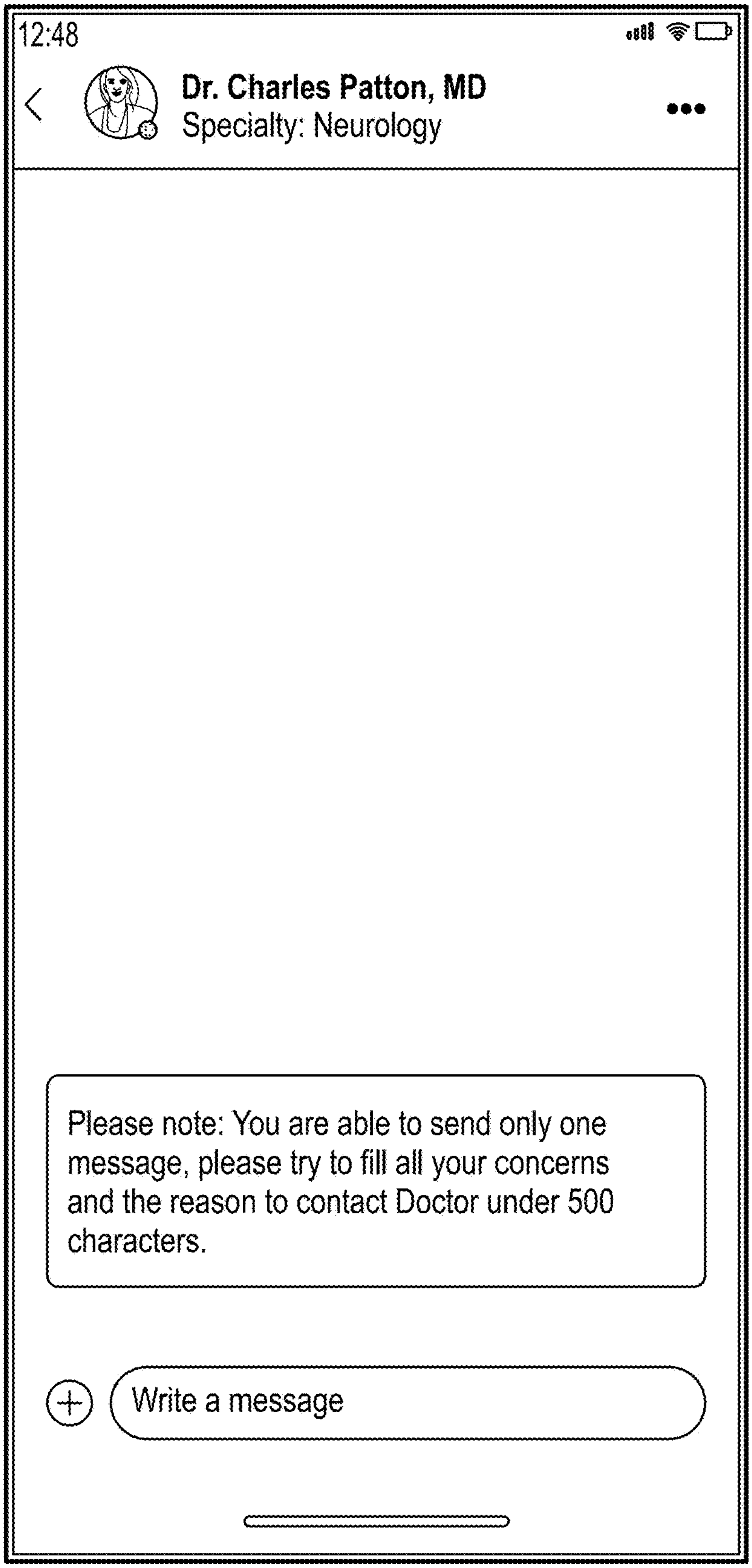
Figure 13D:
Figure 13E:
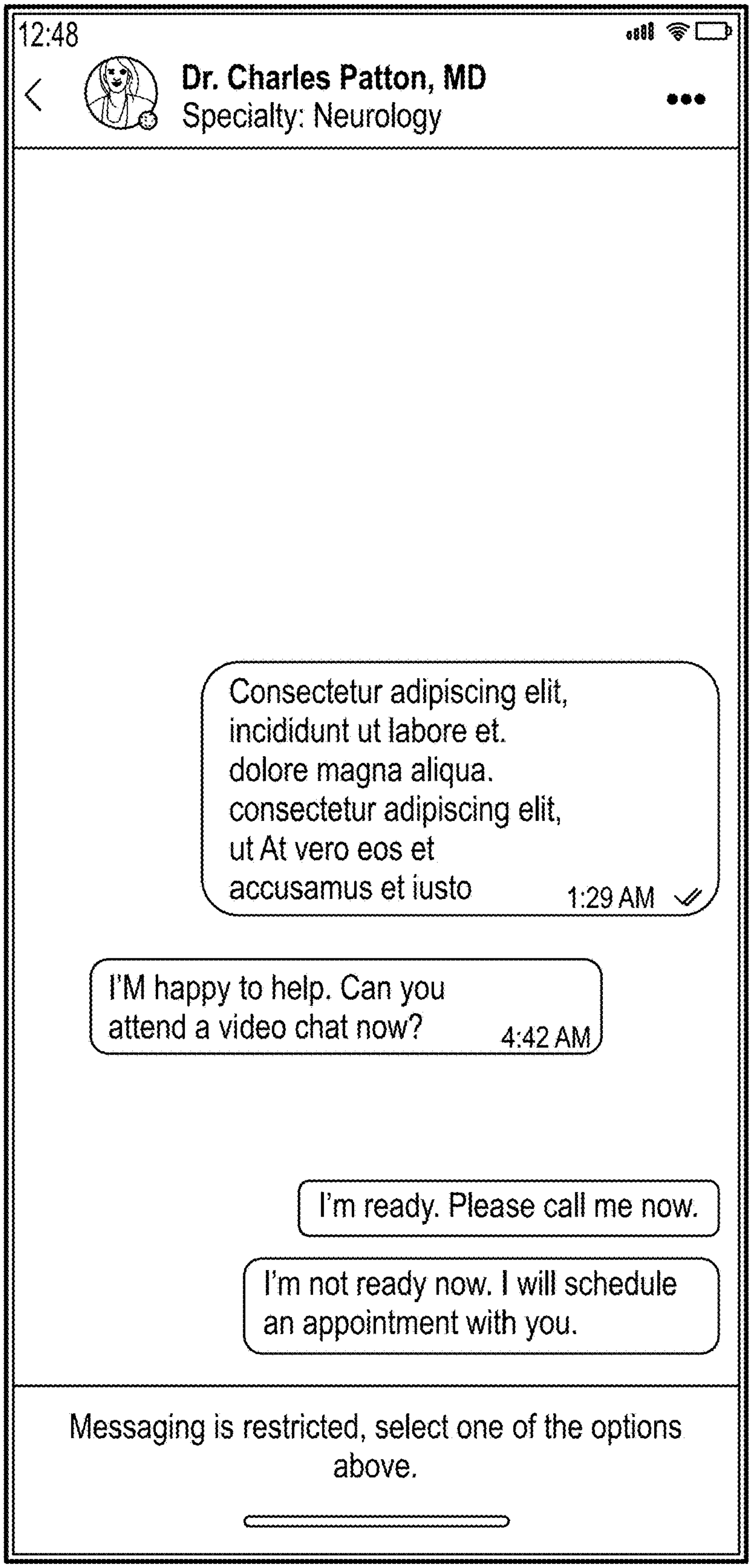
Figure 13F:
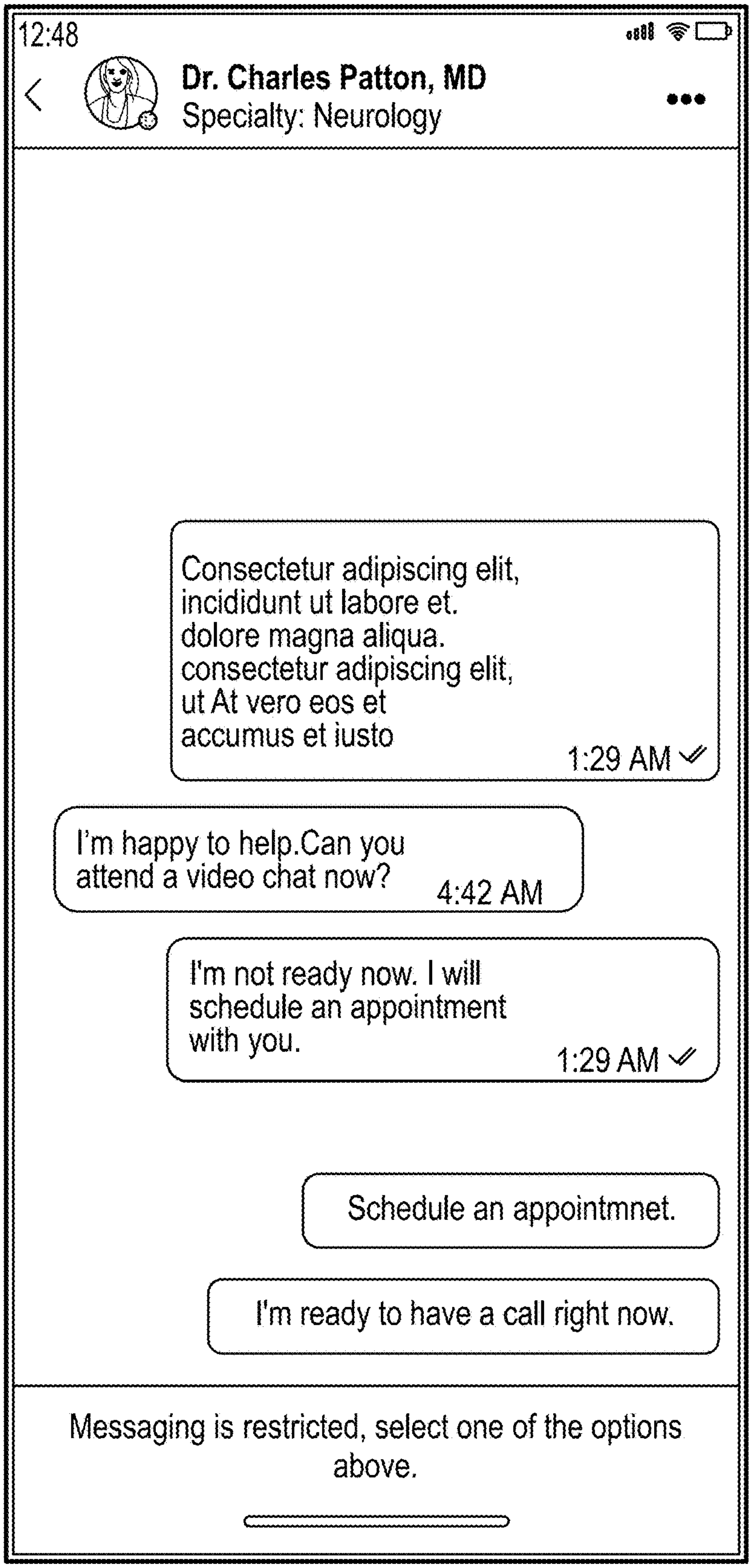
Figure 13G:
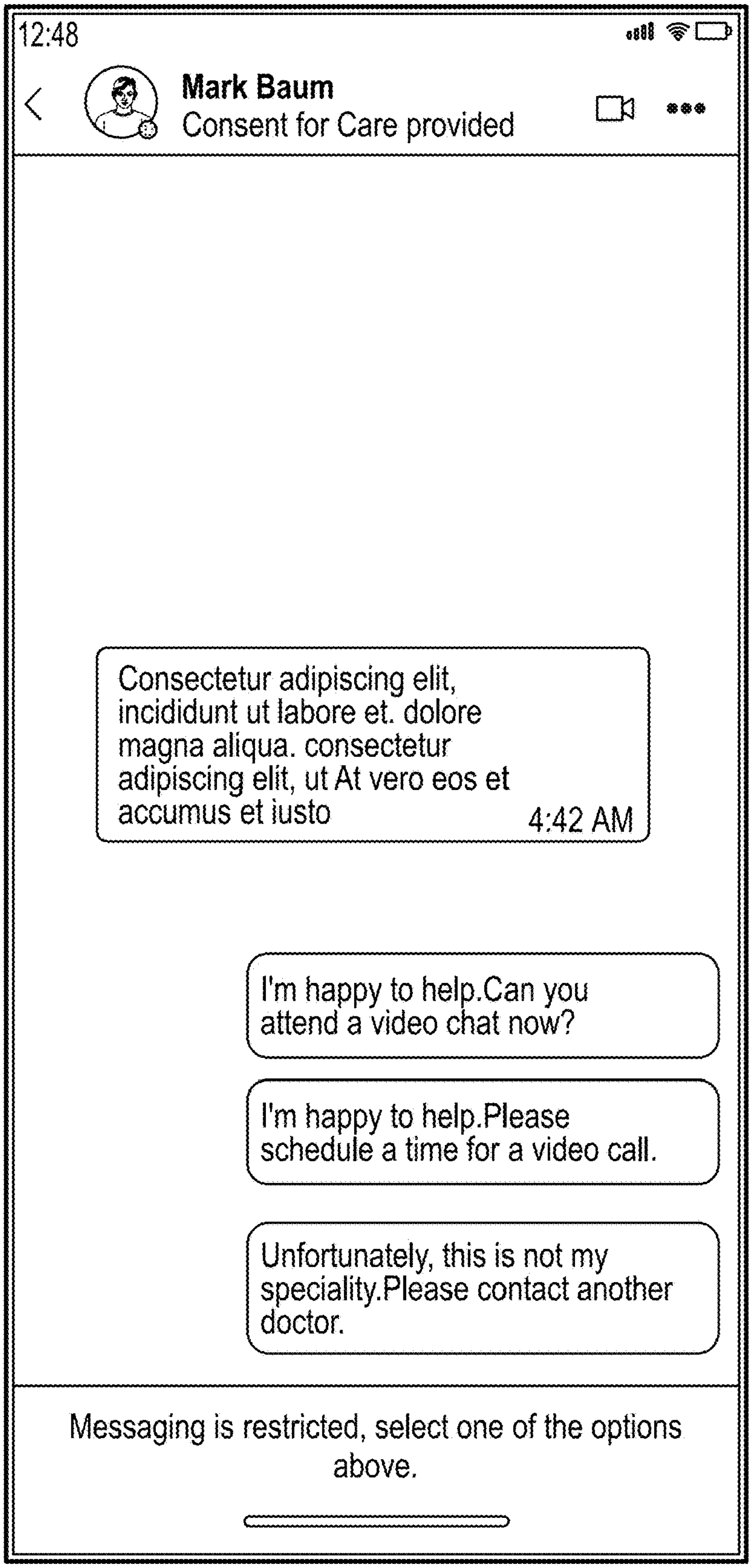
Figure 13H:
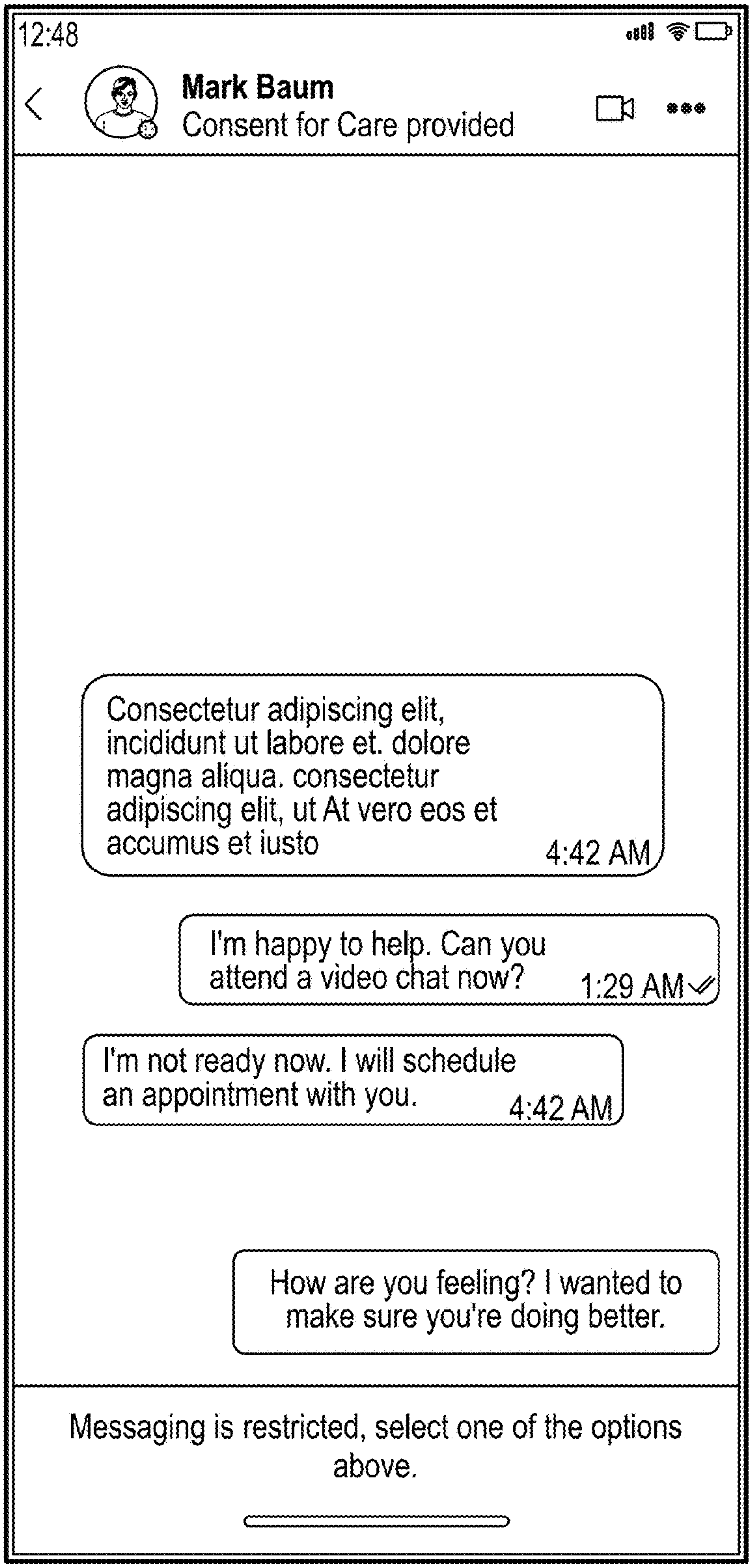
Figure 13I:
Figure 13J:
Figure 13K:
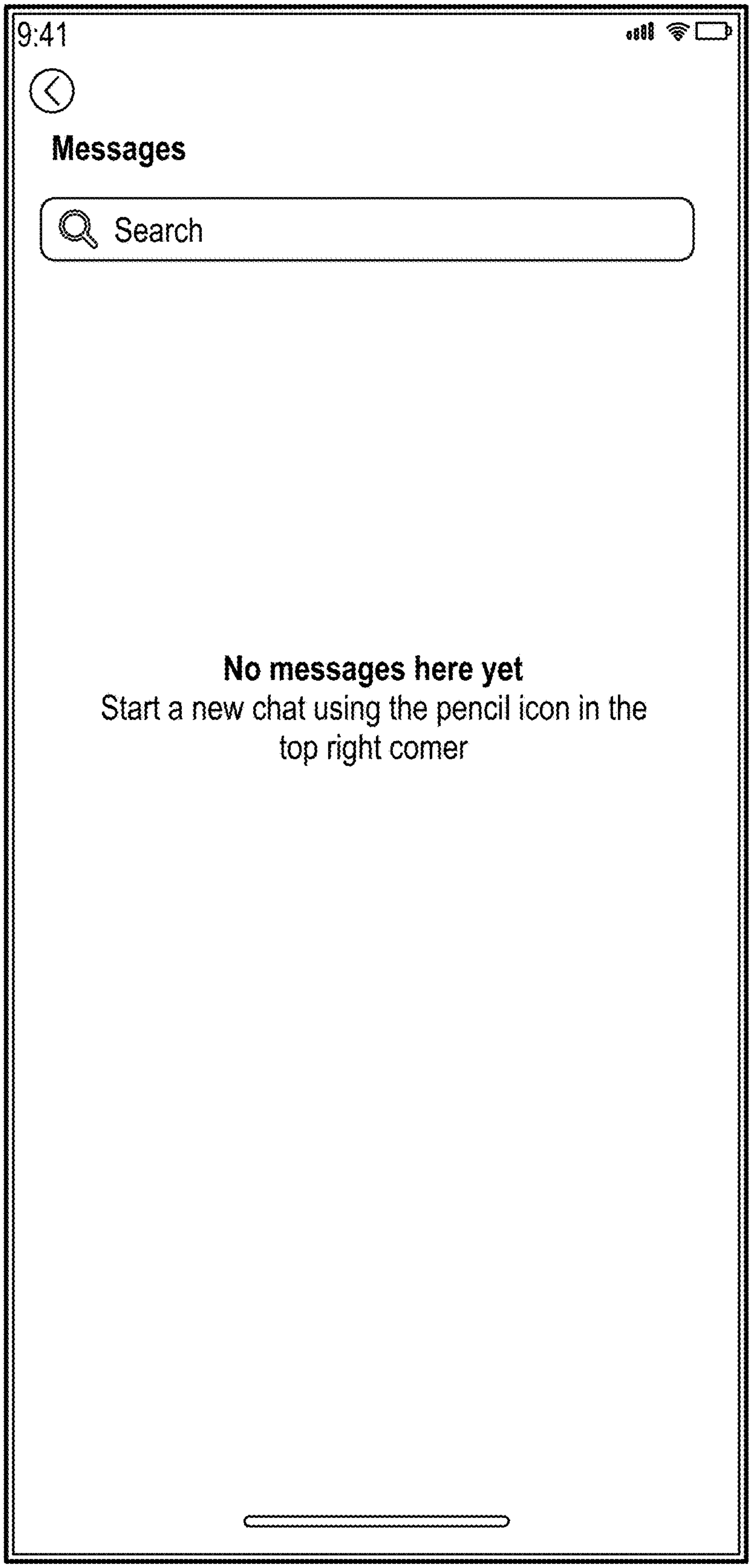
Figure 13L:
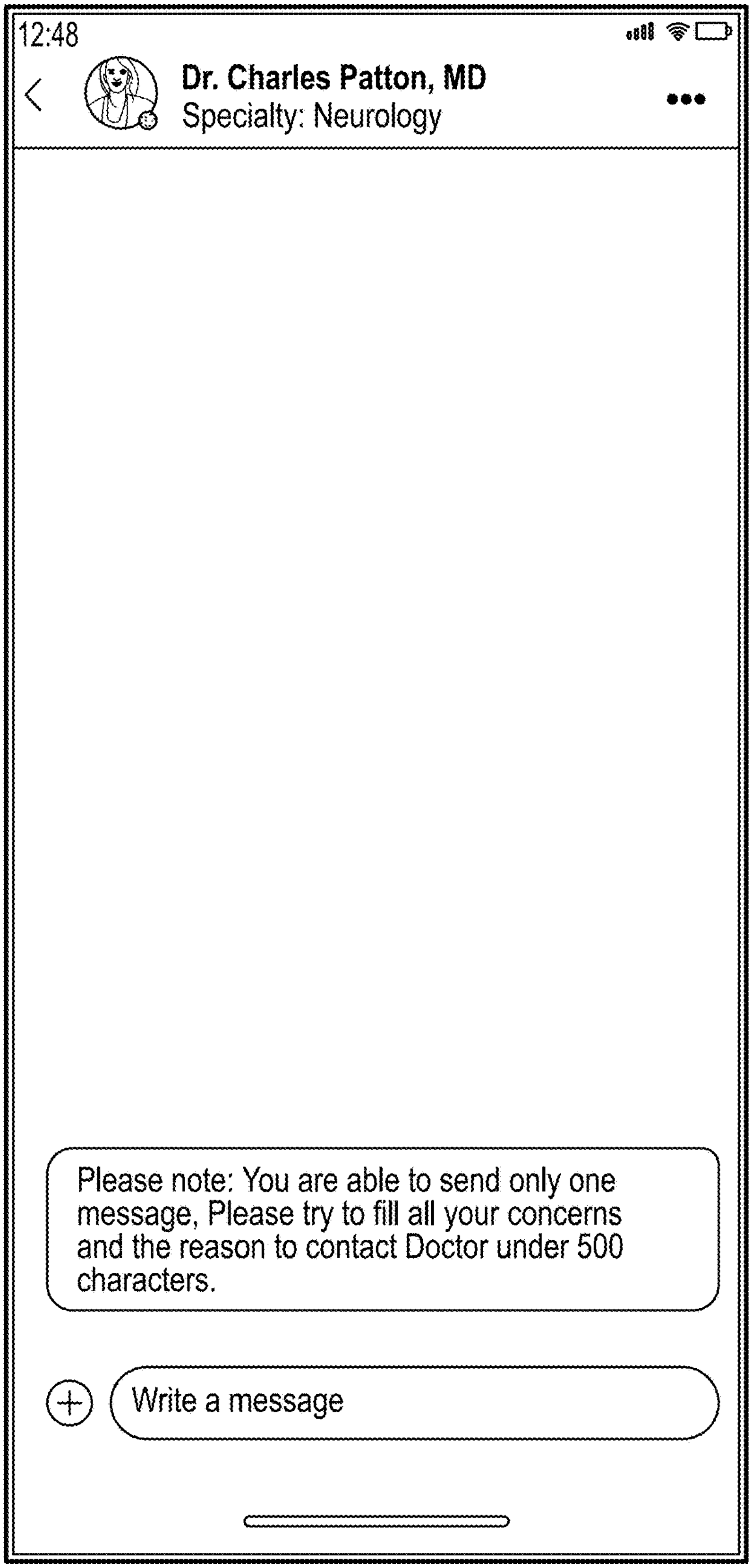
Figure 13M:
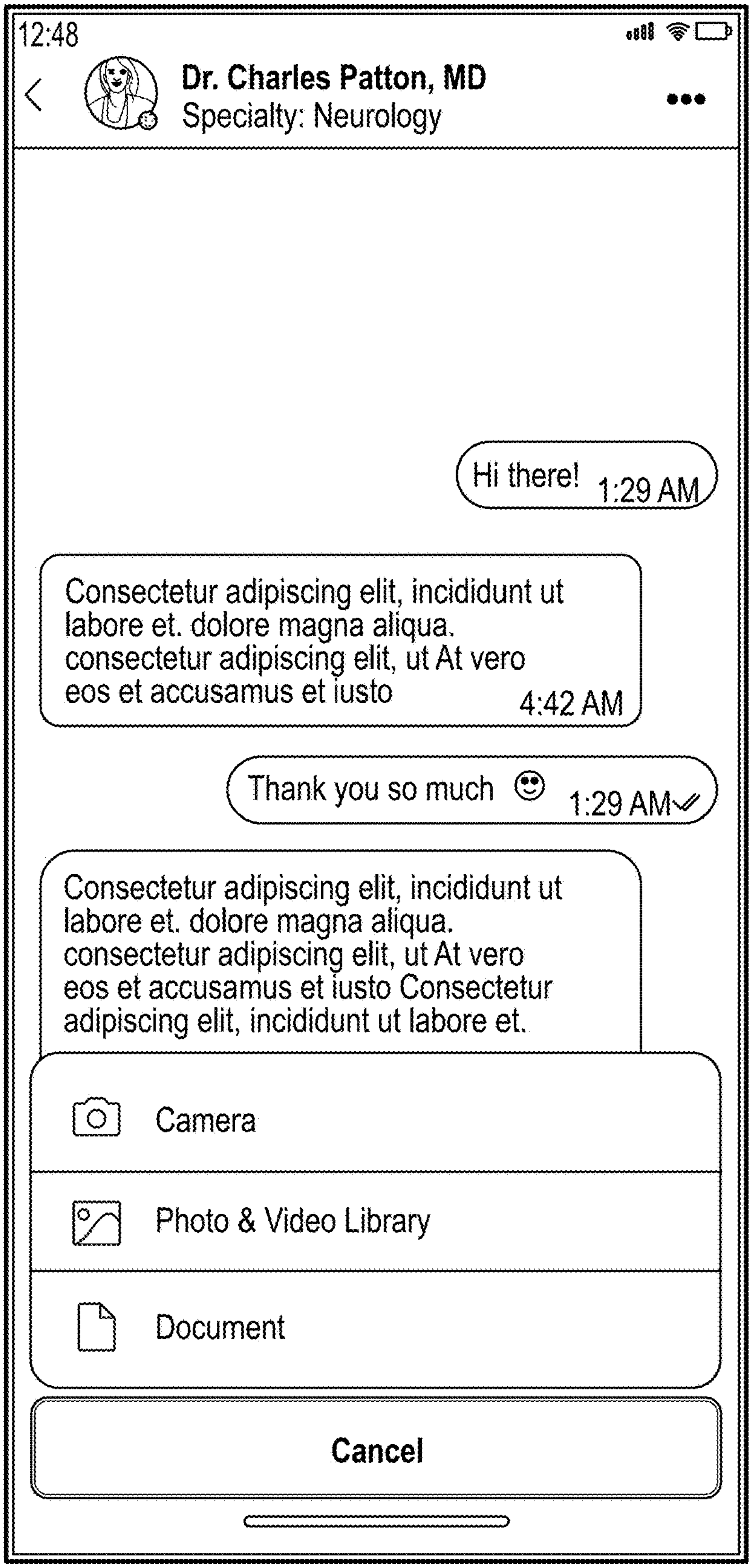
Figure 13N:
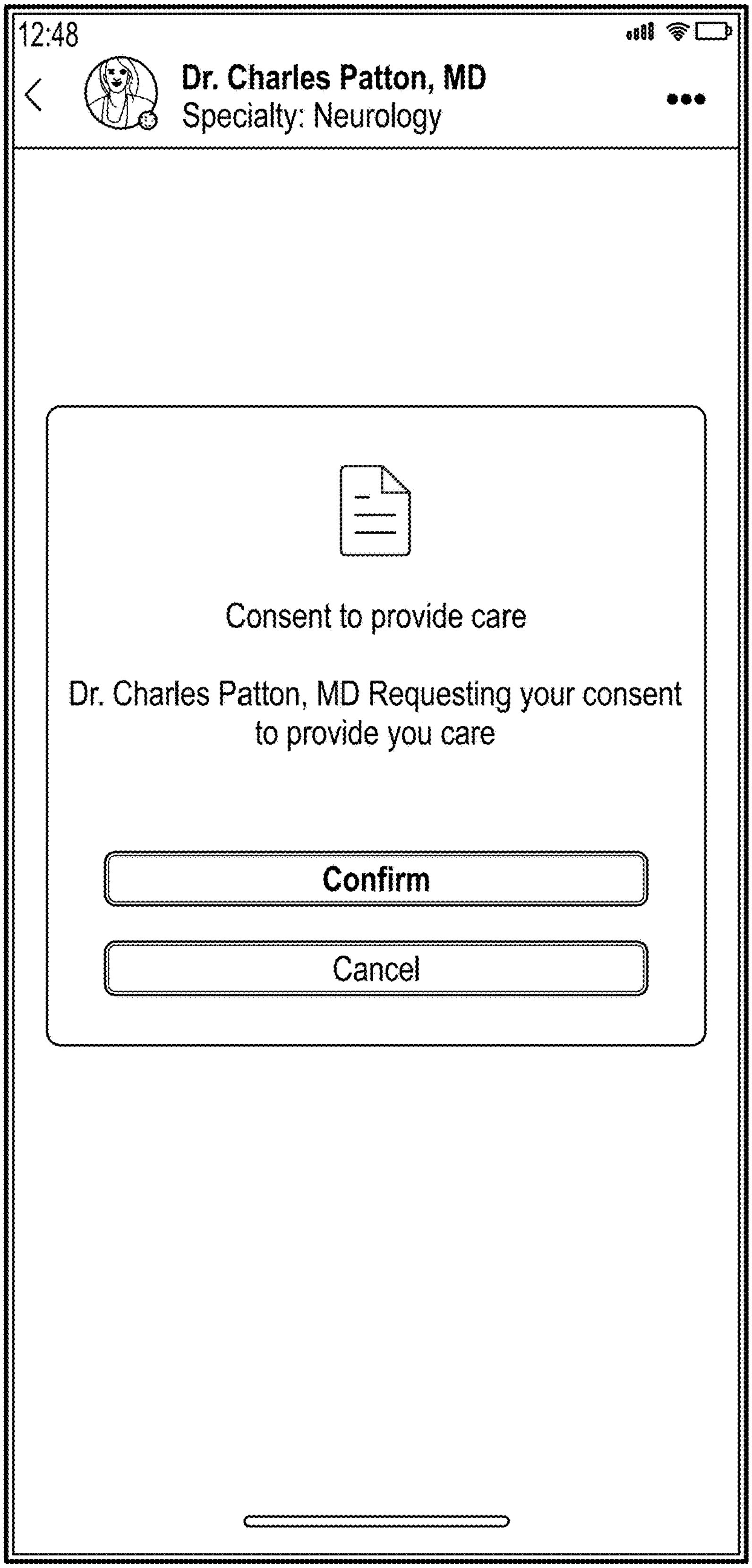
Figure 13O:
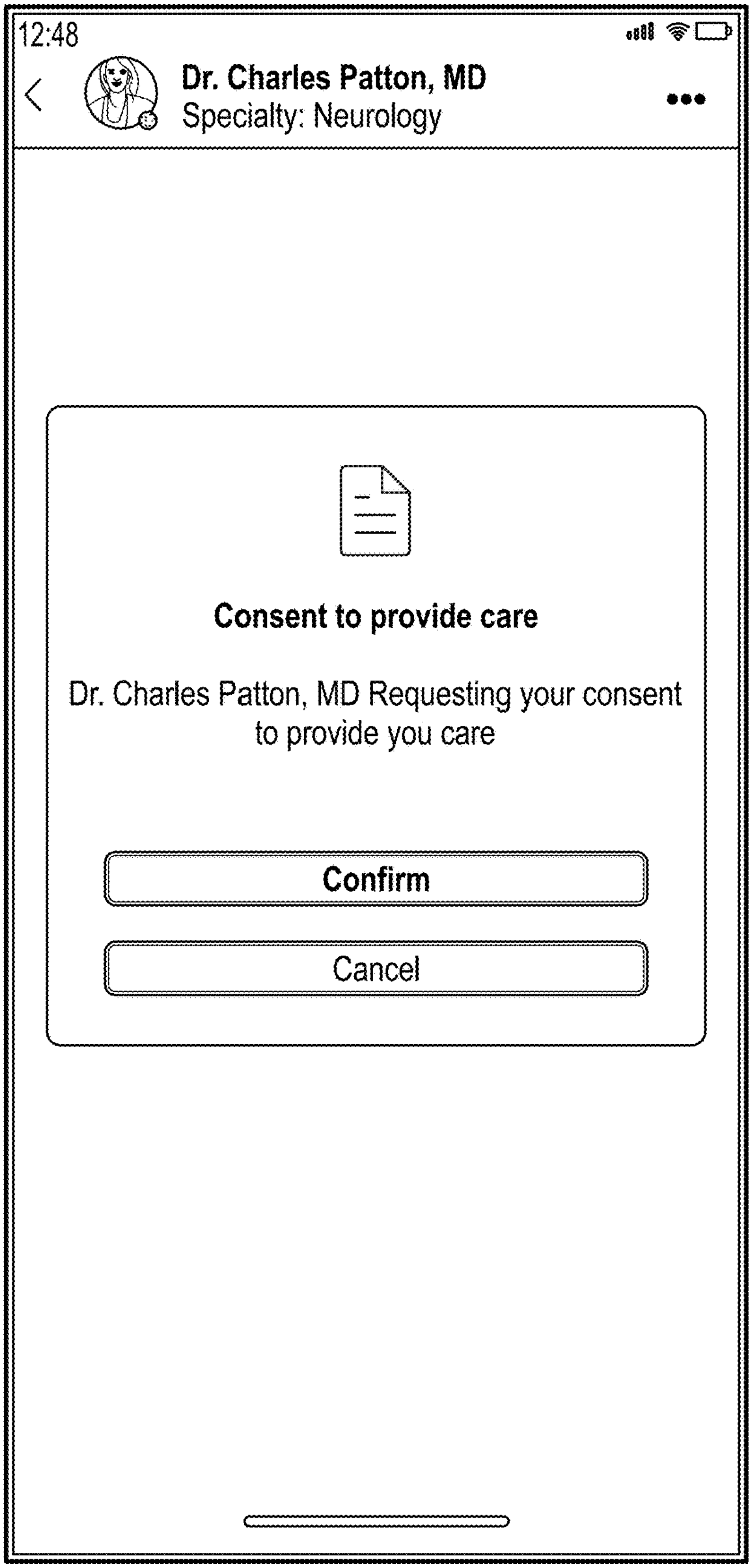
Figure 13P:
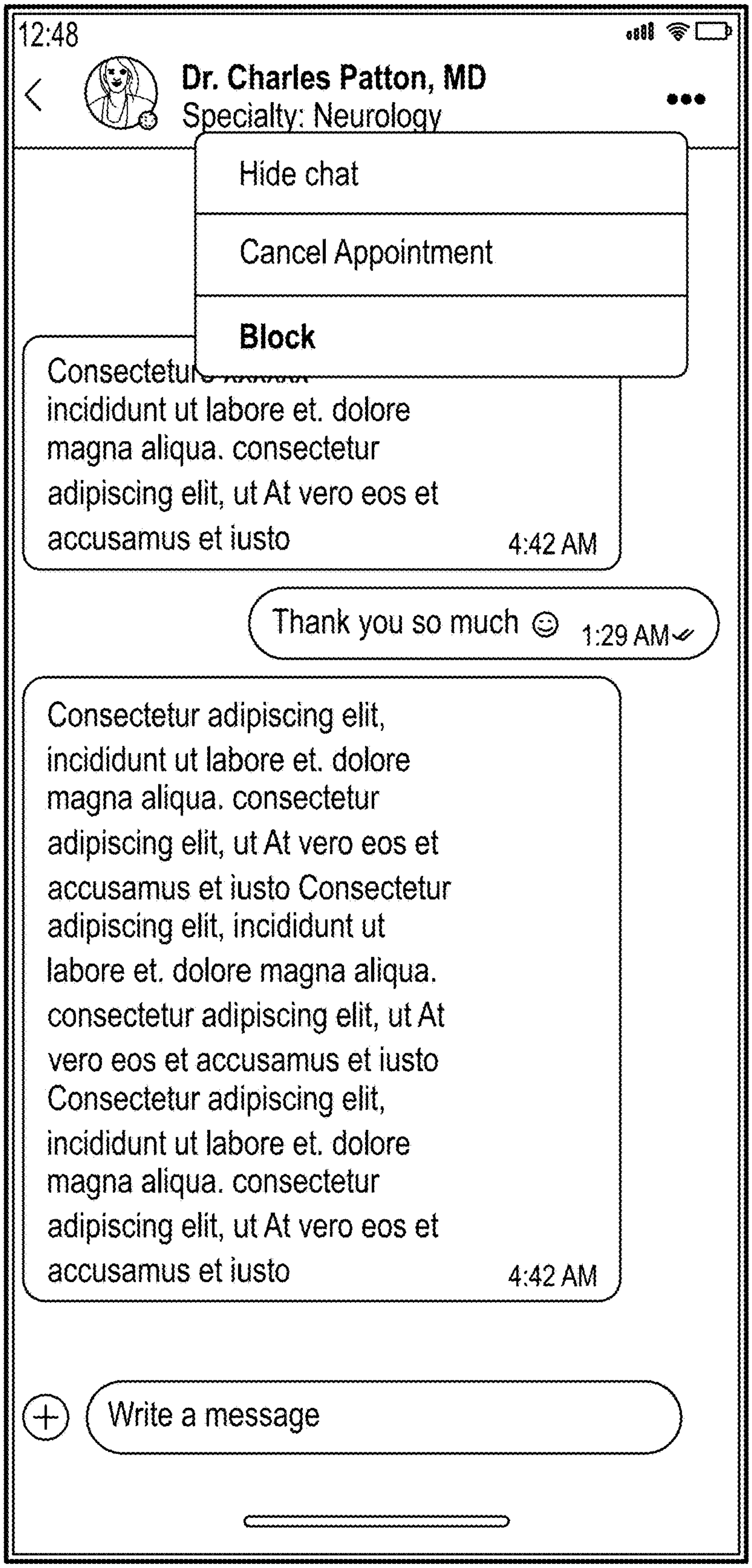
Figure 13Q:
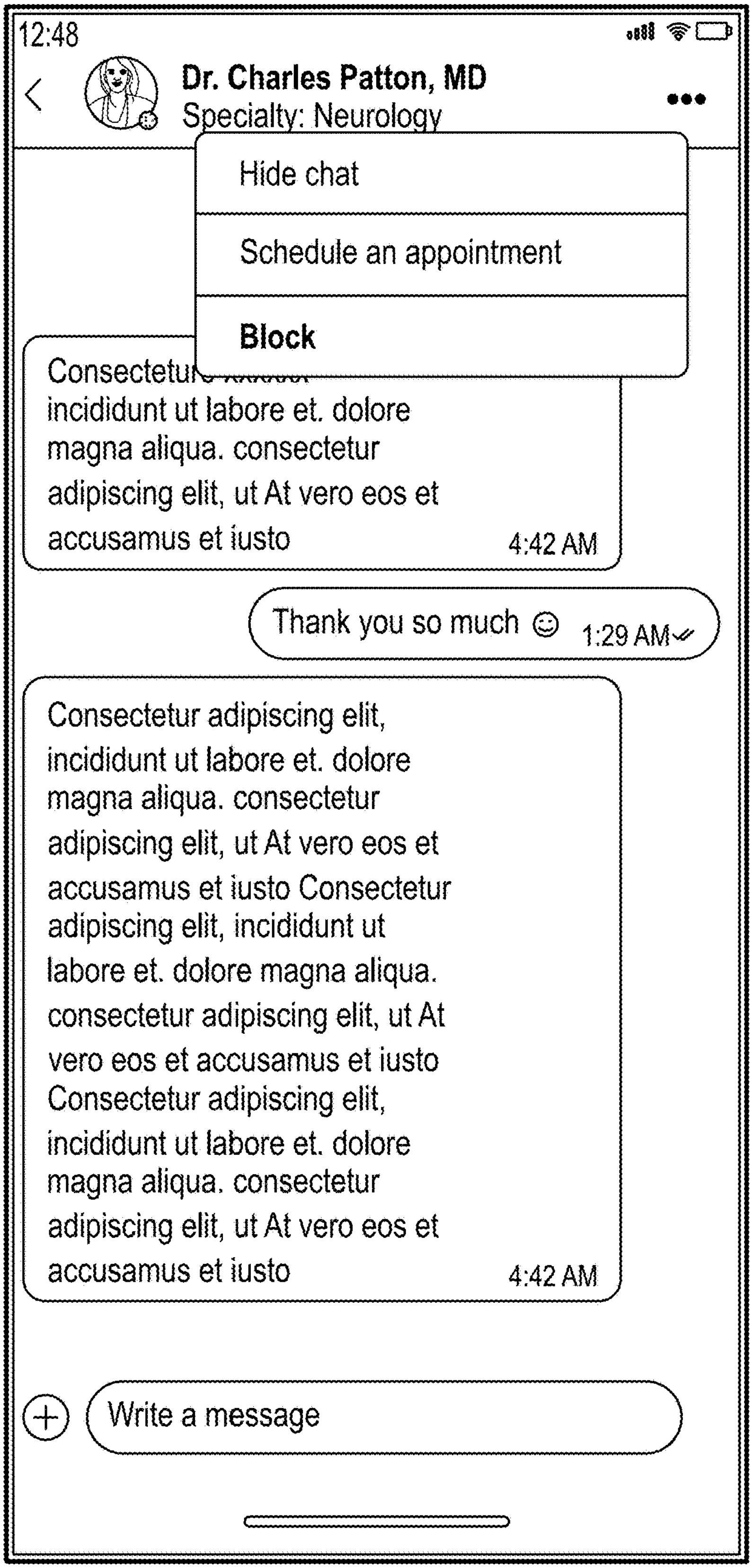
Figure 13R:
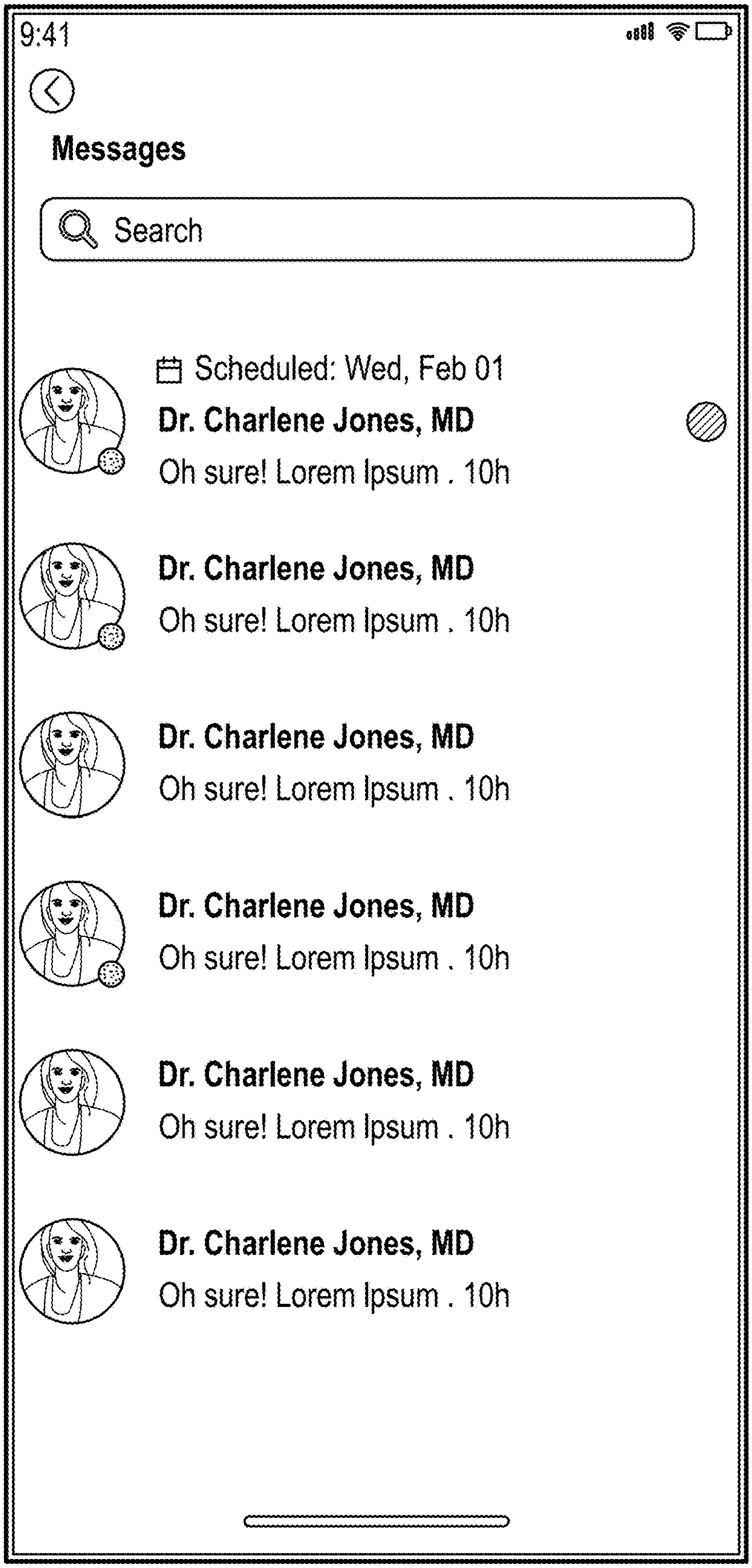
Figure 13S:
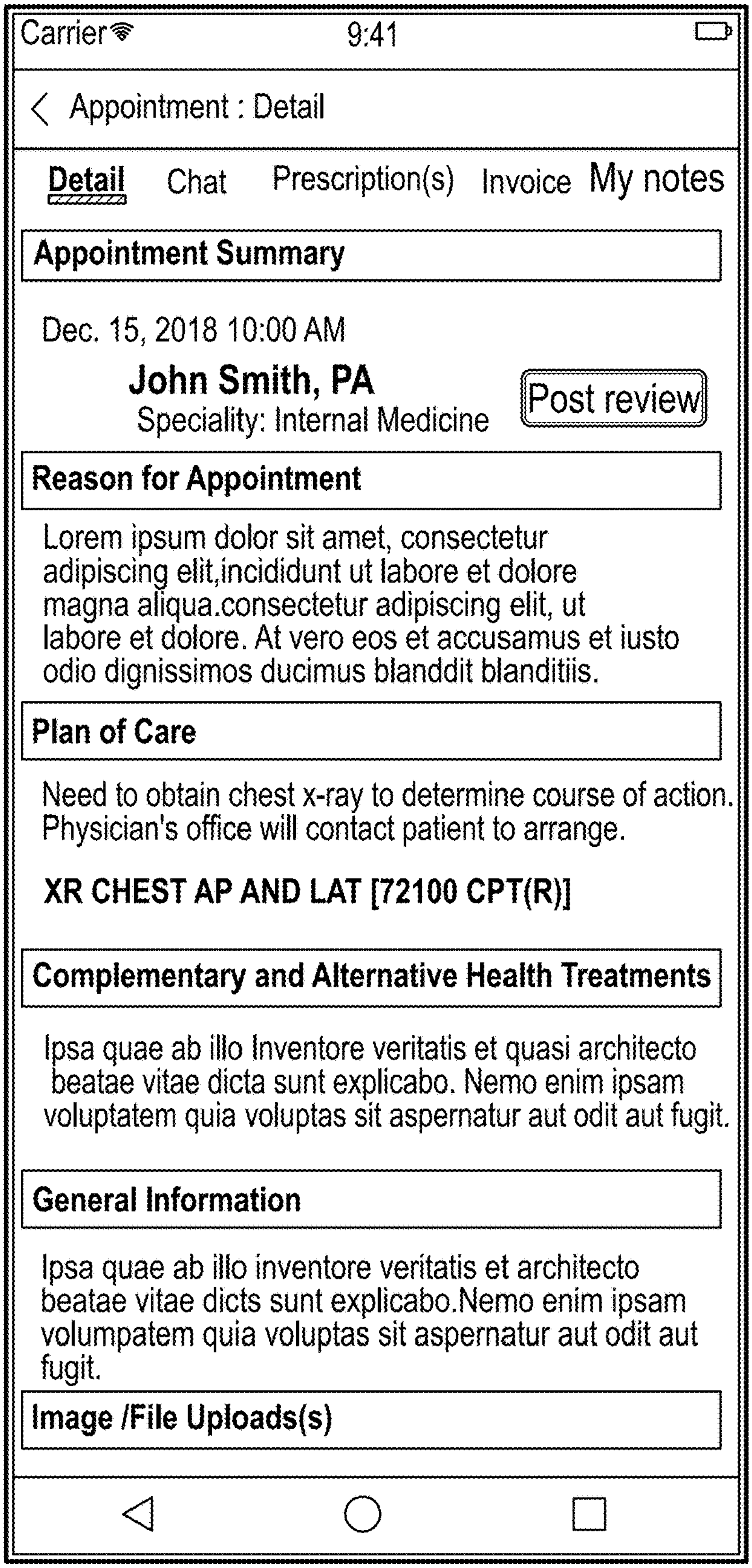
Figure 13T:
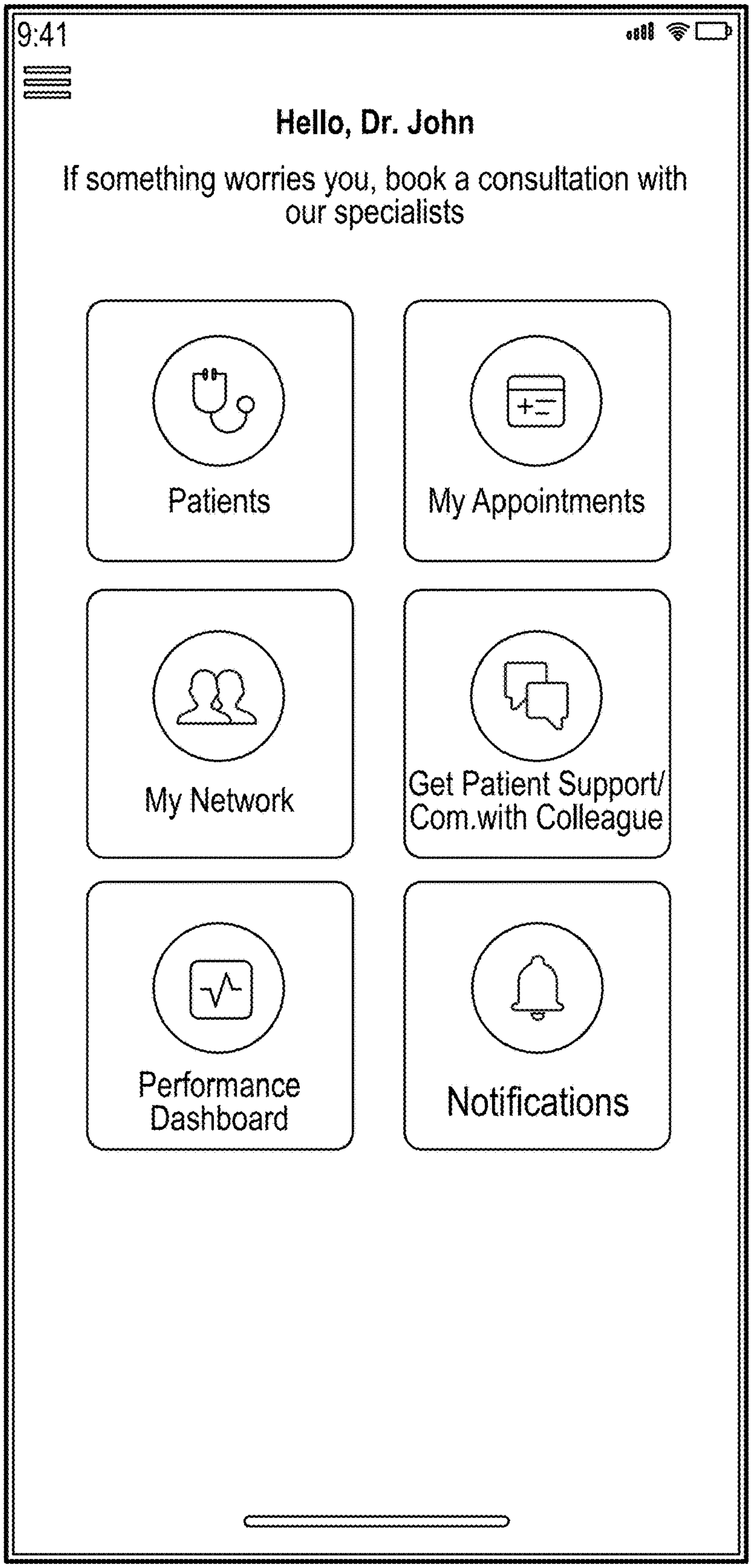

FIGS. 13A-T are renderings of example mobile application interfaces. The user interfaces may be populated in whole or in part by the health care management system discussed herein. In accordance with the disclosed example embodiments, the example platform can be accessed through a mobile application downloaded to an installed on a user device (e.g., a mobile phone, tablet, wearable, and/or the like), which provides geolocation and provider search functionality, as shown in FIG. 13A. Providers can be filtered using specific criteria that allows the patient to filter the type of provider for their healthcare needs based on factors such as geolocation and proximity. As illustrated, a map may be rendered that shows a mapping of a given area to be searched. For medical service providers in the given area, the names, specialty area, distance from a user or user-specified location, review ratings, and an indication as to whether the medical service provider takes insurance, may be rendered.

FIG. 13B shows a rendering of the doctor profile through the mobile interface. Through the doctor profile page, the patient user can book an appointment or send a message to the doctor. The profile page also shows the doctor's standard availability, certifications, education, patient review ratings, distance from the user, and/or other information about the doctor.

FIGS. 13C-R are renderings of example messaging interfaces (e.g., text, audio, and/or still/video image messaging interfaces) of the mobile application. Patients and health providers can communicate securely via the live chat feature. Messages are saved for future reference unless the user chooses to delete old messages. When a patient or health provider is currently active, they may choose to display their status as "active" which is represented by a green dot adjacent to their icon image. Users may also search for conversations to quickly locate previous messages by either searching keywords or names. If a patient has scheduled an appointment with a health professional, the appointment date will appear above their most recent chat conversation with the health professional. Optionally, a patient may only be enabled to send a limited number of messages to a given health professional over a period of time and/or until the health professional responds to the patient's initial message.

As indicated in FIG. 13D, a user may be enabled to uploaded documents and scans in association with a message.

FIG. 13E illustrates an example chat session. Optionally, a patient may be restricted by the system from sending a further message to the health profession until the patient selects an option provided by the health professional via the chat user interface.

FIG. 13M illustrates a chat user interface via which a patient may upload a lime image/video of the user, upload previously recorded still images/videos, or upload documents, which may be received by the health professional and/or stored on a device or system associated with the health professional.

A health profession may request that a patient provide affirmative consent to receiving care from the health profession via the mobile application. FIG. 13N illustrates an example of such a user interface, providing the name of the health care profession a control via which the patient may provide consent, and a control via which the patient may refuse or cancel the request.

FIG. 13P illustrates an example chat user interface via which the patient may hide the chat with the healthcare professional, cancel an existing appointment with the healthcare professional, or block chat communications from the healthcare professional, FIG. 13S is a rendering of the appointment detail of the mobile application including the date and time of the appointment, the doctor, the reason for the appointment, the plan of care, options for alternative treatments, image and/or file uploads, and other relevant health information. A control may be provided which when activated presents a review user interface via which the user may submit a review of the healthcare professional which may be utilized to monitor the performance of the healthcare professional.

FIG. 13T is a rendering of the healthcare professional's (e.g., doctor's) main interface of the mobile application. Optionally, healthcare professionals may utilize the same application as the patient, but with different functions and user interfaces enabled. Optionally, healthcare providers are provided with a different application than patients, with difference functionality and user interfaces. The main screen allows for doctors to access patient data, appointment information, the doctor's network, communication with colleagues, a performance dashboard and notifications via respective controls.

Certain disclosed features and services may be accessed through an application, such as one that can be downloaded to a mobile device. This application can incorporate various functions, including but not limited to online web access, a search function, administrative functions, health professional functions, and a patient portal with notification capability. The online access and search functionality may include a geolocation feature, locating all physicians within a specified distance that are immediately available for walk-in to an office appointment and for concierge visits, proximity of the patient to all urgent care centers across the US to expedites patient access, as well as coordinate the delivery of services for a mobile medical team for community wellness and prevention engagement. For example, this make take the form of coordinated engagement within low-income communities ("LICs"). Patients can also use the application to search for a physician and other health care provider profiles for care locally, nationally, and internationally. The application platform incorporates geolocation functions to provide clinical point-of-care ("POC"), wherein providers deliver healthcare treatment, products, and services to patients at the time of care. The example platform integrates crowdsourced data to deliver medical services and to those in need, at the "point of service" ("POS"). The application's geolocation functionality may also be used for patient intake procedures The application's administrative functionality facilitates a unique deployment and use of nurse practitioners (e.g., that can perform most medical functions on the virtual platform and on concierge visits, to diminish costs to patients for care and facilitate expanded physician supervision through administrative oversight managed through the platform). The application allows for advanced background checks and verification of physicians and other health care team members and allows for physicians and other health care team members to be tracked to a patient's location for security and transparency with updated estimated time of arrival ("ETA") for the patients. The example platform can also determine and display average visit times for providers on both the patient side and provider side.

The application's health professional function facilitates patient care and multi-practitioner coordination through a virtual platform to mitigate and remove the need for an in-office physician and other health care team member appointments. The referral process is simplified and streamlined from one provider to the next. Registered nurses can support the patient as health coaches and have platform support that aggregates medical notes with the existing medical record. This is supportive of the plan of care and is unique to each patient and dramatically increases intended outcomes. Support staff from private practices can be granted access by the primary health care provider to work as a team and open communication to save time for the care of the patient. Notes can be stored and shared across the example platform for continuity of care.

Physicians and other health care team members can use the application to prescribe standard pharmaceutical medications and track fills to ensure fulfillment was successful. As well, the example platform can track compliance of taking the medication. Physicians and other health care team members can also recommend and prescribe holistic medications and treatments to reduce costs to patients and encourage prevention, thereby lowering patient medical costs and reducing side-effects. Physicians and other health care team members can share referenced education material for the patient for later reference in an organized manner. This is inclusive of alternative protocols which will support the best holistic care. Case management, coordination and support can be managed through the application between patients. The application may also include a patient advocate support tool for health providers, patients, and caregivers involved in the patient's care.

The application platform may also integrate technology such as artificial intelligence to intuitively make recommendations based on a patient complaint. The application can incorporate real time charting, as well as dictation and transcribing technology for ease of use. The application may also include filtering capabilities to filter patients into certain groups for easy communications, for example, diabetics. The provider can then send specific information to diabetic patients in that specific group to facilitate patient health management.

The application provides software license revenue for practitioners, thus increasing revenues for independent physician practices and off-setting costs. This allows for physicians and other health care team members to be able to monetize and rate their health care networks through the ability to establish and manage their own "ranking system" of to whom to flow their referrals through the automated platform resulting in quality assurance checks within a virtual ecosystem for supervising physicians. The application provides an advanced rating system for providers as rated by patients, serving as an additional marketing tool for physicians and other health care team members. The provider reviews aid in supervision of practitioners if there is a private review system in place.

The application may also be used as a tool to aid in medical compliance, organization, and best practices, such as healthcare reminders and alerts that are sent to both providers and patients, and notifications to providers for license expiration and renewal reminders. Providers may also be able to upload their practice consent forms and other compliance related documents.

The application can be used by patients to facilitate the ordering of lab work, tracking, and presenting in-home blood tests and intravenous ("IV") services across a multitude of panels through a virtual platform. The application can facilitate, track, and arrange for band delivery of products as well as the shipment of wellness products and pharmaceutical medications. The application facilitates prevention of illness through measures to mitigate claims and losses, as well as prevention of illness and critical therapy needs for non-emergent patients in need of therapeutic care. The patient can refer to previous encounters and read up on their prescriptions and protocols within their health record profile. The application platform can also accommodate data entry such as blood sugar levels, blood pressure readings. The example platform may also incorporate features such as third person consent and consent for minors for healthcare treatment.

The application affords patient convenience and expands options by allowing for virtual medical records to be easily stored and accessed through the application, permitting a greater continuity of care for both patient convenience and safety. The example platform is configured to provide health record access to patients, resulting in full healthcare transparency. The application provides a means for virtual visits inclusive of medical charting, historical medical record—through electronic medical record ("EMR") access, and advanced health profile and treatments through a virtual platform. The patient's health record is inclusive of holistic modalities, treatments, and plan of care. The application can also track and measure patient health changes and vitals through graphical analysis.

The application may also function as a research and clinical trial communications portal. Collections of data can be aggregated, stored, and accessed, such as labs, prescriptions, and other holistic alternatives. As data is collected over time, this can be a very rich information source for certain industries. The application can generate digital health questionnaires as a means of aggregating data. Certain applicable advertisements may also be incorporated into the platform, as well as an option for patients to opt in or out.

Medical doctors can use the example platform to publish papers and other works, promoting and creating standing protocols for holistic and western treatments that can be shared globally.

Medical doctors may use the application as a means of holding lectures and seminars, broadcasting live and streaming globally. Continuing education courses may also be offered through the platform, providing continuing education for health professional management. Providers can pull from an integrative library, such as relevant documents and journals to share with college students, etc. The example platform may also incorporate programs such as a health coach program for Holistic registered nurses ("RNs"). Typically, coaches can be defined as non-medical personnel with certificates in health coaching. RNs can speak on healthcare treatment and the disease process, serving as teachers and instructors through the platform.

The disclosed system may enable the experience of stepping into a medical center for patients to be mimicked, as well as the "gamification" of the physician experience. The application can offer a medical concierge practice service, with elite care access to elite practice groups, admitting privileges, upgrades, and access to concierge services such as Vive life or Vive practice group, which provides access to highly specialized medical providers. Payment for medical services and healthcare related costs can also be processed through the platform, as well as payment by gift cards such as the Vive gift card, etc.

The example platform can also include a multitude of optional services in the health and wellness space, including but not limited to: specialty consulting for lab work; anti-aging; medical cannabis or medical marijuana prescribers and resources; rehabilitation and detox resources; stem cell therapy; nutritional supplement resources and e-commerce; veterinary services and resources; community impact resources, such as information related to community meetings and outpatient recovery groups; volunteering opportunities and donating hours or pro-bono opportunities; and pilot programs such as "minute clinics" in retail pharmacies that also offer technician support and various specialists.

As similarly discussed elsewhere herein, the modern healthcare landscape, while benefiting from the advancements of technology, still suffers from technical deficiencies and needs to improve its efficiency and communication gaps. Because of such technical deficiencies, patients frequently face difficulties booking medical appointments, navigating multiple platforms, managing healthcare information, and maintaining up-to-date patient data. At the same time, providers must grapple with the challenging task of efficiently managing their available appointment times, ensuring they reach potential patients, and handling the associated administrative overheads.

The disclosed technical solutions overcome these challenges, addressing several key problems and unmet needs in the healthcare appointment landscape.

Conventional appointment healthcare management systems' scheduling applications and processes utilize an undue amount of computer resources, including processor, memory, and network resources. In addition, conventional appointment scheduling systems and processes typically require a great deal of user navigation to multiple different appointment scheduling user interfaces hosted by different systems. For example, conventional scheduling systems often require patients to individually access and navigate multiple platforms to find and book suitable healthcare appointments with different healthcare service providers. This process is resource-intensive, may fail to provide a user with information on dynamic changes in appointment availability (thereby limiting patient access to available appointments), is time-consuming, and labor-intensive, and may limit patient access to available appointments.

The disclosed example system addresses such technical deficits by providing a centralized appointment system that communicates with the appointment systems of large numbers of service providers. By ingesting data from multiple sources, patients are provided with a fuller picture of a given provider's availability, thereby increasing the likelihood of securing a convenient appointment. An aspect of the present disclosure provides an integrated, user-friendly interface for patients to access and book appointments from various providers, thereby obviating the need for multiple systems of different medical service providers to host respective different appointment applications. Advantageously, by centralizing the management of appointment bookings, the burden on computer networks and medical service provider systems is reduced. Further, because appointment scheduling is centralized, the number of administrator terminals at various medical service providers may be reduced.

Another technical deficit of conventional health care management systems is that they typically result in fragmented patient information. For example, when multiple different health care management systems used by different medical service providers are used to maintain patient information such information often becomes fragmented, resulting in inefficient management of healthcare data and the risk of discrepancies and inconsistencies in patient records. In order to address such data fragmentation issues, the disclosed system provides a centralized solution for maintaining patient information, helping to ensure data accuracy, In addition, because conventionally appointment data is often scattered across various platforms, synchronization of appointments and availability can be technically challenging. The disclosed system overcomes such technical challenges by refreshing appointment availability data from multiple sources (e.g., service provider systems) periodically, ensuring the data is up-to-date and accurate.

In addition, because conventionally appointment data is often scattered across various platforms, the appointment data may be stored in disparate data formats making it challenging for patients and providers to interpret and utilize. In order to overcome this technical challenge, the discloses systems and methods utilizes a transformative module, which ingests the appointment data from the various different systems and standardizes the data into a common (e.g., universally understood) format so that it may be accurately and efficiently utilized.

Further, the disclosed system enables patient customization and configurations of the patient's personal preferences. For example, patients have unique preferences based on insurance plans, location, gender of the doctor, ratings, hospital affiliations, and the like. The system may refer a patient to a health care provider that satisfies the patient's preferences (e.g., that accepts a specified insurance plan, that is within a specified location, that has a minimum performance or review rating, that has admission privileges at specified hospitals, etc.). For example, if a patient is seeking to make an appointment with a particular type of specialist, the system may identify specialists that satisfy the patient's preferences, access available appointments for such specialists, and present the available appointments to the patient via a corresponding appointment scheduling user interface.

Because the system has access to a patient's appointments with multiple medical service providers, the system can detect if the patient has inadvertently scheduled overlapping, conflicting appointments with different service providers and provide a notification accordingly to the patient and/or service providers. The system may determine alternative appointments for one or more of the service providers with conflicting appointments, and present the appointments to the patient. The patient may then select one of the alternative suggested appointments. This is in contrast to conventional systems where the appointments may be scheduled via different platforms, and hence there may be no way of detecting conflicting appointments. Furthermore, the system may prevent a patient from even scheduling alternative appointments by only enabling the patient to schedule, via the centralized appointment system, non-conflicting appointments.

As similarly discussed elsewhere herein, when patient data and communications are stored on multiple platforms associated with different medical service providers, the security and privacy of sensitive patient information are increasingly at risk. The disclosed system may centralize the processing and storage of data, using improved security controls and encryption, such as discussed herein, better ensuring patient data is protected from improper access and use.

As similarly discussed elsewhere herein, conventionally, patient data may be siloed on different service provider systems, resulting in fragmented and disconnected healthcare data. Thus, conventionally, patients with unique health conditions or complex treatment plans often face challenges in securing suitable appointment times and finding providers with the necessary specialization. Because the disclosed example system integrates with Electronic Health Record (EHR) systems, the system ensures a more tailored, efficient, and seamless appointment scheduling process by accommodating these critical considerations.

In addition, voice, text, and image communication between medical service providers and patients can be technically challenging. The disclosed system centralizes and streamlines this process, increasing the speed and efficiency of patient-provider communications.

In addition, because the disclosed example system has centralized access to service providers' appointment schedules, the system is able to detect appointment cancellations or other dynamic changes to a service provider's availability for appointments. The system may detect a suitability of a newly available appointment time for a given patient, and may generate real time alerts to the patient regarding the appointment availability. The system may then enable the patient to schedule an appointment for the newly available appointment time. Thus, the disclosed example system solves the technical problem of detecting dynamic changes in appointment availability, compared to conventional systems wherein missed opportunities frequently occur due to a lack of real-time information on appointment cancellations or availabilities. Patients often face difficulties in getting appointments with their preferred healthcare providers due to a lack of information about last-minute openings. By providing real-time alerts to patients regarding these opportunities, the system not only ensures faster and more convenient appointment booking, but also increases the efficiency of healthcare service delivery.

Using conventional systems, the gap in communication between patients and providers has been a persistent problem in the healthcare sector. The present example system solves this technical challenge by providing a secure messaging platform that provides for encrypted communications. The present system enables more detailed consultation before and after appointments, improving communication, and providing an additional layer of personalized care. It reduces misunderstandings and improves the overall quality of care, addressing patients' needs for more direct, secure, and confidential communication with their healthcare providers.

In addition, conventionally, traditional prescription ordering and management systems lack access to sufficient patient data, and this may result in provision and delivery errors and the prescription of medications with conflicting, undesirable interactions. Advantageously, as a result of the digital integration described herein, a more complete, centralized data set for patients is obtained, including a record of a patient's prescriptions from different medical service providers. A user interface may be provided to patients enabling patients manage their prescriptions with ease and accuracy, reducing the risk of medication errors and enhancing overall health outcomes. Such streamlined and effective electronic medication management is particularly advantageous for patients with chronic diseases who require regular medication and may have a relatively large number of prescriptions.

In addition to prescriptions for medications, patients often need medical test kits (e.g., blood, urine, saliva, stool, and/or respiratory test kits), which can complex and time-consuming for patients, and which often results in mistaken orders, leading to a wasteful disposal of the incorrect test kit. For example, conventionally, a patient may need to use different unfamiliar websites to order different test kits or may need to actually drive to a health care center to obtain a test kit. The example system overcomes the foregoing challenge by providing a common user interface enabling patients to order and manage their medical test kits directly from the platform. This solves the problem of accessibility particularly for those who may have mobility issues to physically go to healthcare centers to obtain the medical test kits.

The system optionally enables system and service provider performance to be monitored and managed to thereby improve such performance. The system may monitor the system responsiveness to service provider and patient instructions and requests, the results of a given healthcare intervention, patient feedback (obtained via a review user interface provided to patients) regarding a given service provider or medical intervention, and/or other aspects disclosed. The results of such monitoring may be processed and presented to providers via a performance dashboard. Such a dashboard enables system and service provider performance improvement and enables healthcare institutions to maintain high-quality care delivery by keeping track of their professionals' performance.

Thus, the disclosed system overcomes technical deficits of conventional systems and provides centralized appointment scheduling with real time alerts, improved data management, and enhanced secure patient-provider communication.

As discussed above, technical challenges had to be overcome in providing the functions and services described herein.

Given the vast number of healthcare providers with distinct data structures, it is technically challenging to accurately collect data from these disparate sources. In order to address this technical challenge, an ingestion module is provided configured to ingest data from these disparate sources. The ingestion module utilizes a combination of web crawling techniques, API integration, and sophisticated parsing algorithms to collect and interpret data from disparate sources with different data structures.

Different healthcare providers often have different formats and structures for their data, which poses a challenge when it comes to integrating this data into a unified system. In order to overcome this technical challenge, a transformation module is utilized that standardizes data from the different sources into a common format for easy storage and access.

As discussed above, appointment availability may dynamically change. Keeping appointment availability information up-to-date in real time is crucial. In order to address this technical challenge, a refresh module is configured to regularly and accurately update data from multiple sources and to generate a synchronized central appointment database for multiple service providers. The refresh module utilizes intelligent algorithms that manage this update process at variable intervals, considering factors like popularity, cancellation rates, and/or source data retrieval time. Thus, an appointment synchronization process may be performed at intelligently dynamically adjusted intervals and/or in response to certain specified occurrences.

As discussed above, given the sensitive nature of healthcare data, strong security and privacy measures are provided to protect user information. Advanced security protocols and encryption methods are utilized to ensure a high degree of data security and to ensure patient data is stored and utilized in compliance with any relevant regulations, such as HIPAA (Health Insurance Portability and Accountability Act).

For example, encryption may be utilized to protect data both in transit and at rest. Data can be encrypted using a Key Management Service (KMS), such as AWS KMS which enables management and control of encryption keys used to encrypt data. A Customer Master Key (CMK) may be created that is a logical representation of a master encryption key managed by a hosting service. The CMK may be utilized to encrypt data in various hosting services that support encryption. When a request to encrypt data is made using KMS, the service may generate a unique data encryption key (DEK) for that specific data object. The DEK is then used to encrypt the data, and the DEK itself is encrypted using the CMK.

When the system needs to access the encrypted data, decryption may be utilized using the same CMK that was used for encryption. KMS may then verify the permissions and the requester's identity before returning the plaintext data. The data encryption key (DEK) is then decrypted using the CMK, and the DEK is used to decrypt the data.

Optionally, key rotation may be utilized to provide enhanced security. Key rotation involves periodically creating a new encryption key and using it for new data encryption, while the old keys are retained for decryption of existing data. Key rotation helps improve security by limiting the exposure of any single key.

Access to the CMKs may be controlled by Key Policies and IAM Policies. Key Policies are attached directly to the CMK and define the actions that IAM users and roles can perform on the CMK. IAM Policies define who can manage KMS keys and who can use the keys for encryption and decryption in AWS services.

Detailed logging may be utilized to monitor and audit key usage, key management operations, and API calls related to the CMKs.

Identity and Access Management (IAM) may be utilized to create users, groups, and roles with specific permissions to limit access based on the principle of least privilege.

In order to provide enhanced network security a Virtual Private Cloud (VPC), resources to be isolated and secured in a private network. Network security groups and access control lists (ACLs) may be utilized to control inbound and outbound traffic.

DDoS protection services may be utilized to help protect applications from distributed denial-of-service (DDoS) attacks.

SSH (Secure Shell) and SFTP (Secure File Transfer Protocol) may be utilized for secure remote access and file transfer over networks, such as the Internet.

SSH is a cryptographic network protocol that provides a secure way to access and manage remote systems or devices over an unsecured network. It enables users to establish a secure, encrypted connection to a remote server or device. SSH encrypts the data transmitted between the client and the server, ensuring that sensitive information, including patient data, passwords and commands, cannot be intercepted by unauthorized parties. SSH supports various authentication methods, including password-based authentication and public key-based authentication. SSH enables secure tunnels to be established between local and remote ports, enabling secure access to services running on a remote system.

SFTP is an extension of the SSH protocol that provides a secure way to transfer files between a client and a remote server. SFTP provides similar security features to SSH, ensuring that file transfers are encrypted and protected from eavesdropping and tampering. SFTP uses the SSH protocol's encryption capabilities to secure data during transit. SFTP supports various authentication methods, including password-based and public key-based authentication. SFTP allows users to perform file operations such as uploading, downloading, renaming, deleting, and managing file permissions on the remote server. Unlike FTP, which transmits data in clear text, SFTP encrypts all data, including usernames and passwords, ensuring that sensitive information is protected.

Optionally, PGP (Pretty Good Privacy) may be utilized to provide data encryption. PGP uses asymmetric encryption to secure data. It generates a pair of cryptographic keys for each user: a public key and a private key. The public key may be widely distributed and used for encrypting messages meant for the owner of the corresponding private key. When someone sends an encrypted message using the recipient's public key, only the recipient's private key can decrypt it. This ensures that sensitive information remains confidential and protected from unauthorized access. PGP enables users to create digital signatures using their private keys. When someone receives a digitally signed message, they can verify its authenticity and integrity by using the sender's public key to decrypt the signature. If the signature is valid, it proves that the message originated from the claimed sender and that the message content has not been altered during transit.

PGP employs a "web of trust" model, where users can validate the authenticity of each other's public keys. By personally verifying and signing the public keys of others, users can establish a trust relationship within the PGP community. This way, users can rely on each other's signed keys to verify the authenticity of messages and signatures from unknown sources.

PGP provides end-to-end encryption, meaning that data is encrypted at the sender's side and decrypted at the recipient's side, without being decrypted in transit or stored in plaintext on intermediary systems. This ensures that even if a message is intercepted or stored on intermediate servers, its content remains secure.

PGP may optionally be utilized to secure communications between service providers and patients, such as securing email communications. PGP may be integrated with a communication client (e.g., an email client) via which email content may be encrypted and digitally signed, providing an extra layer of security for sensitive communications.

PGP can be used to encrypt files, ensuring that data stored on disk or transmitted over networks remains protected. This is particularly useful for securing sensitive files and Creating a user-friendly interface capable of handling complex data in an easy to use and intuitive manner is technically challenging. In order to overcome such challenges, user-centric design principles and iterative testing was utilized to refine the interface.

To overcome the technical challenges of appointment scheduling management, complex filtering criteria may be utilized via a filtering module comprising a sophisticated filtering algorithm configured to handle complex and diverse user preferences, from location and insurance acceptance to the gender of the healthcare provider.

With data ingestion from multiple sources, handling redundancy and conflicts poses a considerable technical challenge. Data cleaning procedures and conflict resolution protocols are used to address this challenge. In particular, when different sources provide data to a centralized system or a database, there can be inconsistencies, duplicate entries, and conflicting information. Data cleaning and conflict resolution are utilized to ensure data accuracy, consistency, and reliability.

Data cleaning procedures may perform duplicate detection and removal, data standardization, missing data handling, outlier detection and handling, and/or data validation and verification.

Duplicate detection and removal may identify and remove duplicate records. Duplicate detection algorithms may be used to identify records with similar attributes and then merge or remove them, ensuring that only unique data remains.

Data standardization may be used to standardize data from various sources that may have different formats or representations. A data standardization process may convert data into a common format to eliminate inconsistencies. For example, converting dates to a standardized format or converting measurements to a common unit.

Missing data can be a common issue in datasets. Missing data handling may utilize imputation (estimating missing values based on existing data) and/or may discard records with significant missing information.

Outlier detection and handling may be utilized to detect data points that significantly deviate from the rest of the dataset. Such outliers may be flagged to an administrator or may otherwise be processed.

Data validation and verification may include validation checks to ensure data integrity and accuracy. This can involve verifying data against predefined rules or data quality metrics.

Conflict resolution may be managed by using timestamps or versioning. A given data source may include a timestamp or version number with the data. When conflicts occur, the system can use this information to determine the most recent or relevant data. Conflict resolution protocols may be utilized to assign priority or weight to different data sources. Data from sources with higher priority may be given preference in case of conflicts.

In some cases, the resolution of conflicts may need human intervention. For example, when data from multiple sources conflict, a user or administrator may be notified of such conflict so that the user can review the data and decide which information to accept or merge.

Another technical challenge is ensuring the system can be scaled up to handle an increase in users without compromising performance. Scalable technologies and architectures, such as those provided by AWS, may be utilized to ensure the system can handle growth seamlessly. For example, an Elastic Compute Cloud (EC2) may be utilized to provide resizable compute capacity in the cloud. Virtual servers (instances) may be utilized which may be scaled up or down based on demand enabling fluctuating workloads to be efficiently, automatically handled.

Auto Scaling may be utilized to automatically adjust the number of EC2 instances based on predefined conditions. Scaling policies may be defined that automatically add or remove instances based on metrics such as computer processor utilization, network traffic, and/or other metrics. This ensures that a given application has the right amount of resources to handle a current load.

Load balancing may be utilized to distribute incoming traffic across multiple EC2 instances to ensure that no single instance is overloaded.

A scalable database (e.g., a relational database and/or a NoSQL database) service may be utilized that provides managed database instances, enabling databases to be scaled up or down as needed. Read replicas may be provisioned to offload read-intensive workloads and ensure high availability.

Serverless computing may be utilized enabling code to be executed without provisioning or managing servers. It automatically scales based on incoming requests, ensuring that code runs in response to demand.

A content delivery network (CDN) service may be utilized that caches and distributes content globally to reduce latency and improve the performance of web applications and APIs.

Another technical challenge is enabling the system to interact and function with different user devices and operating systems to ensure user accessibility. For example, mobile devices often have limited processing power and slower Internet connections compared to desktop computers. Cross-platform optimization may be performed to accommodate such lower capability devices by optimizing images, compressing resources, and minimizing HTTP requests to improve performance and reduce load times on devices. Cross-platform optimization may involve testing on a wide range of devices, including different smartphones, tablets, and web browsers to identify and address any layout or functionality issues specific to certain devices. Optionally, responsive web design may be utilized to create websites that automatically adjust and adapt to different screen sizes and resolutions. With responsive web design the layout, images, and content of the website are flexible, allowing it to resize and reformat to fit the screen of the device being used. CSS media queries are used to detect the device's screen size and apply appropriate styles accordingly. Optionally, adaptive design may be utilized, which involves creating multiple versions of a website, each tailored to specific screen sizes or device types. When a user visits the website, the server detects the device and serves the appropriate version. This approach allows for more fine-grained control over the user experience on different devices. Optionally, Progressive Web Apps (PWAs) may be utilized that provide offline access, push notifications, and other app-like features. A PWA may be configured to work on different device types and offer a seamless experience across different platforms.

While the present disclosure relates to the healthcare data and appointment management fields, the disclosed systems, processes and technology may be utilized in other applications, such as the following example applications.

The system can be configured for the education field, including the scheduling and managing appointments with tutors, teachers, or guidance counselors. It can also handle scheduling of classes, seminars, and workshops across various educational institutions.

The system can be configured for the professional services, such as lawyers, accountants, consultants, and other professionals who often schedule appointments with clients may benefit from such a system. It may cater to individual preferences such as specialization, location, ratings, and availability.

The system can be configured for the fitness and wellness industry. Personal trainers, yoga instructors, physiotherapists, and other wellness professionals may utilize this platform for their clients to schedule sessions with clients. The example platform may consider factors like types of workouts or therapy, location, and trainer specialty (e.g., as part of the filtering).

The system can be configured for the beauty and personal care services. Salons, spas, and personal care service providers can utilize the example platform for scheduling appointments, with filtering options based on services offered, stylist preferences, location, and availability.

The system can be configured for hospitality and event planning services. For example, the system may be configured for booking and managing events at restaurants, event spaces, or conference rooms within corporations. It may take into account parameters like location, capacity, amenities, and available times.

The system can be configured for real estate services. Real estate agents may use the system to manage property viewing appointments with clients. The system may consider criteria such as location, property type, price range, and the agent's availability.

The system can be configured for public, governmental services. Government agencies may use the system to manage appointments for public services, such as document processing, licensing, or citizen consultations.

The system can be configured for automotive services. Auto repair shops and service centers may use the platform to enable customers to book their service or repair appointments, considering factors like type of service, vehicle make and model, location, and mechanic availability.

The system can be configured for pet care services. Veterinary clinics, pet grooming centers, and pet training institutes may utilize the platform to enable pet owners to book and manage appointments.

The system can be configured for retail services. Certain retail stores that offer personal shopping experiences may utilize the example platform to enable customers to book appointments with personal shoppers, considering factors like shopping category, personal shopper expertise, and availability.

Thus, the example scheduling platform is versatile and can be adapted to any field where appointment scheduling and management based on individual preferences and availability is required.

The disclosed system may optionally be integrated with telemedicine platforms, allowing users to book virtual appointments as well as in-person appointments.

Advanced AI (artificial intelligence) and machine learning techniques may be utilized to personalize the example platform further. Over time, using AI and machine learning, the system may learn user preferences and behaviors, thereby recommending providers, appointment times, and other options that best match the user's needs.

For example, learning engines, comprising machine learning algorithms, may be used to analyze user behavior, preferences, and historical interactions to provide personalized recommendations regarding providers, appointment times, and other options that match the user's needs. By way of example, collaborative filtering, matrix factorization, contextual Information, reinforcement learning, and/or on line learning, may be utilized.

Collaborative filtering identifies users with similar interests and preferences. The engine analyzes historical data, such as user ratings of service providers and preferred appointment times, and finds patterns among users who have shown similar preferences. It then suggests service providers or appointment times that other similar users have selected.

Matrix factorization extracts latent features or patterns from patient-item interaction data. The engine creates low-dimensional representations of patients and items (e.g., service providers and/or appointments), which helps in understanding hidden preferences and relationships. These latent factors are then used to make personalized recommendations.

Learning engines can incorporate contextual information, such as time of day, location, user demographics (e.g., age, gender), transportation available to the patient, and/or the like to provide more relevant recommendations.

Reinforcement learning can be used in recommendation engines to adapt recommendations based on user feedback. The engine learns from user interactions and adjusts its recommendations to optimize for user satisfaction over time.

Online learning enables the recommendation engine to continuously update and adapt its model in real-time as new data becomes available. This enables the system to provide up-to-date and relevant recommendations for users.

As users interact with our platform, they may show a preference for certain providers based on factors like proximity, specialties, availability, user ratings, and even interpersonal chemistry. Over time, the AI system may learn to prioritize these preferred providers in its recommendations.

Different users have different routines and lifestyle patterns. Some users may consistently prefer early morning appointments, while others favor late afternoons. By analyzing a user's appointment booking patterns, the AI system may automatically suggest appointment times that align with their lifestyle and schedule.

If a user routinely books appointments related to a specific health concern (e.g., diabetes or heart health), the AI system may anticipate this and proactively suggest related providers, services, or resources providing more holistic care.

The system can learn how users interact with the example platform interfaces. For example, some users may prefer simple, streamlined options, while others may seek out detailed information and enjoy exploring various features. The AI system may configure the interfaces to suit these preferences, creating a more personalized and satisfying user experience.

By understanding the user's preferred payment method or insurance details, the AI can streamline the process of scheduling appointments, making it more seamless and less time-consuming.

The system may learn and adapt to a patient's communication preferences. For example, some users may prefer text message reminders, while others might prefer email notifications or app-based push notifications. The system can adapt to these preferences, providing a user-centric communication approach.

The system may utilize predictive analytics: By analyzing historical data, the system may predict future availability trends and provide more intelligent recommendations to both patients and providers. This may assist patients book appointments with sought-after providers more easily and help providers optimize their schedules.

The system may provide a virtual waiting list enabling patients to be placed on a virtual waiting list when their preferred appointments are not available. When an appointment becomes available, patients on the waiting list may be alerted via a message (optionally provided in real time) and given the opportunity to schedule the appointment.

The system may be configured to provide multi-language support to make the system accessible to more people, enabling users to navigate the example platform in their preferred language.

The system may provide push notifications, and/or integration with mobile calendars and reminder systems.

The system may be configured to provide resources such as health tips, wellness articles, or recommended health tests based on the patient's profile. This feature may assist users in maintaining a proactive approach towards their health.

The system may be configured to utilize predictive health analytics incorporating artificial intelligence and machine learning, to generate personalized health forecasts. This enables potential health risks for a patient to be anticipated and in response, the system may generate and provide to the patient and/or medical service providers preventative measures or early interventions (e.g., based on a patient's health data and lifestyle factors), thereby proactively addressing a patient's healthcare needs.

The system may be configured to enable virtual reality consultations between a patient and a medical service provider so that distance is no longer a barrier to receiving top-tier healthcare services. By leveraging advancements in virtual reality (VR), that platform enables patients to have fully immersive consultation experiences with their healthcare providers right in their living rooms (e.g., using virtual reality or augmented reality headsets). This enables a patient to interact with their doctors in a virtual clinic, discussing health concerns and receiving medical advice in real time without leaving their home.

The system may incorporate genomic data integration. By considering a patient's unique genetic makeup, the platform may offer tailored healthcare recommendations, from preventative strategies to personalized treatment plans, significantly improving healthcare outcomes.

The system may utilize a healthcare blockchain, wherein health records are stored on a secure, decentralized blockchain network. This technique provides security for sensitive patient information and also provides patients control over who can access their health data.

The system may utilize a well-being companion AI system. This well-being companion AI system may be configured to provide round-the-clock support, tracking users' physical and mental health, offering relaxation and mindfulness exercises, and/or delivering motivational prompts or other recommendations.

The system may be configured to provide automated prescription delivery. The system may be integrated with drone delivery services to cause drones (e.g., unmanned aerial vehicles), to deliver prescription medications straight to the patient's doorstep, eliminating the need for pharmacy visits. This feature may be particularly valuable for elderly or mobility-restricted patients and those living in remote areas.

The system may be configured to provide continuous health monitoring by integrating with wearable technology to provide continuous, real-time health monitoring. This may include tracking heart rate, blood pressure, sleep patterns, and/or blood sugar levels. This information enables healthcare providers to have a more comprehensive understanding of a patient's health, enabling early detection of potential health issues and timely intervention.

The system may be configured to generate a holistic health score that provides a more comprehensive view of a patient's health. The holistic health score may be generated based on a variety of factors, such as physical health data, mental wellbeing, lifestyle habits, and/or environmental factors. This score may serve as an easy-to-understand measure of overall health, and guide personalized recommendations for improvements.

The system may be integrated with AI-based mental health support systems. This may optionally provide immediate, round-the-clock support for individuals dealing with stress, anxiety, depression, and other mental health concerns. Through intelligent conversations, the AI may provide coping strategies, mindfulness techniques, and when appropriate, suggest the user to consult with a healthcare professional.

A global health network may be provided, connecting patients with healthcare professionals worldwide. This network may enable patients to seek second opinions from top experts globally, or find a specialist for a particular condition, irrespective of their geographical location, thereby democratizing access to quality healthcare.

The system may provide an advanced learning hub configured to provide patients with accessible, reliable information about various health conditions, the latest research, dietary and lifestyle advice, and more. The learning hub may employ advanced AI to personalize content based on each user's unique needs and health conditions, promoting an informed and proactive approach to health.

The system may support augmented reality surgical assistance using Augmented Reality (AR) technology. Using this functionality, specialized surgeons may guide local doctors through complex procedures in real-time, improving outcomes for patients everywhere.

An aspect of the present disclosure relates generally to health and social service management technologies. An aspect of the present disclosure relates to a comprehensive referral process for managing patient flows to clinical and non-clinical services, incorporating a specialized focus on services for individuals experiencing homelessness.

Coordination between various health, social, and city services is needed for effective patient management, particularly for individuals experiencing homelessness. Existing referral processes often face numerous challenges, including bureaucratic hurdles, long approval times, and a lack of inter-agency communication, that can negatively impact patient outcomes.

An aspect of the present disclosure comprises a comprehensive referral system designed to manage patient flows efficiently to both clinical and non-clinical services. The system includes health and city services specifically aimed at aiding individuals suffering from homelessness. By locating medical records associated with a given individual (including individuals without a fixed address) and by guiding clinical and social service users through a series of distinct intake forms, the system aims to expedite the approval and acceptance process when transferring patients to appropriate service locations.

Moreover, the system enables the integration of inpatient referrals from external sites, thereby expanding its functional scope beyond the conventional outward referral mechanisms, and facilitating more effective service provision. Significantly, the system expands the traditional scope of referral systems by enabling external sites and systems to initiate inpatient referrals, thereby optimizing the utilization of services and patient outcomes.

This comprehensive referral system employs an interactive interface that dynamically guides users across clinical and social service domains through various intake forms. These forms are tailored to capture specific patient data, including medical and social history, current needs, and other relevant information. The system then analyzes this information to expedite the referral process, making it more efficient and effective in directing patients to the appropriate service locations.

In addition to managing outbound referrals, the system incorporates a unique feature that enables external sites to refer patients inwardly, thus extending its functionality beyond traditional referral mechanisms. This bi-directional referral capacity significantly enhances the ability of the system to manage patient flows, thereby improving service provision and patient outcomes in a computer-efficient manner.

With its innovative approach to managing patient referrals, this system provides a marked improvement over existing methods by reducing bureaucratic barriers, improving inter-agency communication, and providing more targeted services to vulnerable populations such as individuals experiencing homelessness. This development represents a significant advancement in health and social service management technologies.

The system integrates multiple service domains, is configured to assist individuals experiencing homelessness, uses tailored intake forms expedite processes, and processes inpatient referrals from external sites, providing enhanced computerized functions as compared to conventional systems.

An example, non-limiting, use case of the system will now be described to provide additional content to the present disclosure.

For instance, a healthcare provider seeking assistance for a homeless patient may use the system to input relevant medical and social information through the intake forms. The system may then direct the patient to a combination of medical treatment, social services, and city services like temporary housing. Simultaneously, an external site, such as that of a homeless shelter, may use the system to refer individuals needing clinical assistance, thereby utilizing the system's inward referral feature. This feature allows for a more holistic and coordinated approach to patient management, particularly benefiting vulnerable populations.

Figure 14:
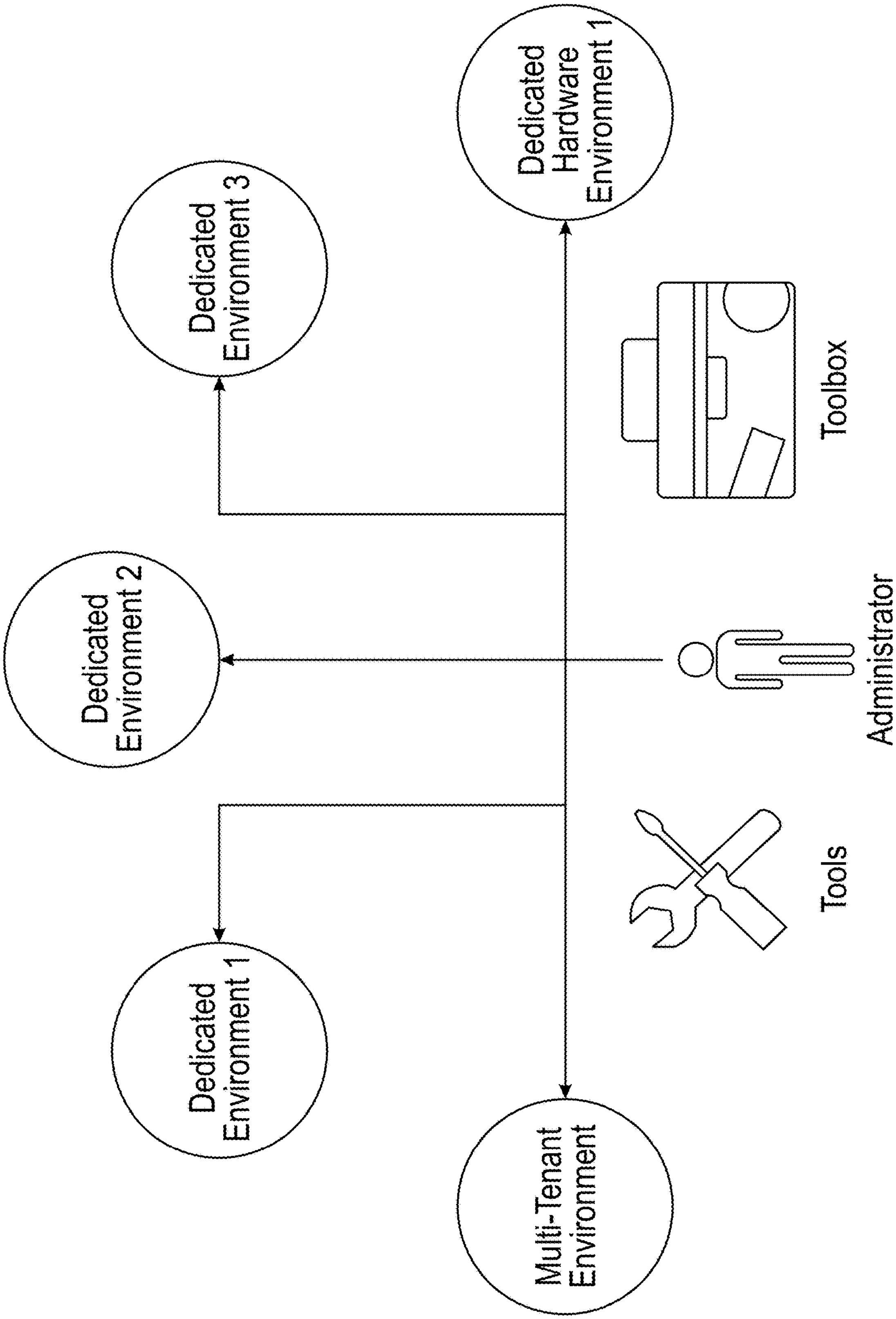
FIG. 14 illustrates an example architecture.

FIG. 14 illustrates an example architecture. Various environments may be provided to enhance security. There are several dedicated virtual software environments, a dedicated hardware environment, and a multi-tenant environment. Various administrative tools are provided.

Dedicated software environments offer several advantages. Dedicated software environments ensure isolation from the host system and other software applications. This is particularly important for critical systems, sensitive data (e.g., patient data (or running potentially harmful code. Further, by dedicating specific resources to a software environment, it can run more efficiently and utilize the available hardware without interference from other applications. Software developers may utilize the dedicated environments to test and develop t applications in a controlled and consistent setup, which helps identify and address issues more effectively. Further, in complex systems, there may be conflicting dependencies and libraries. Using a dedicated environment helps manage these dependencies without impacting the rest of the system.

Dedicated hardware environments also offer several advantages. In resource-intensive applications, such as certain applications disclosed herein, dedicated hardware environments provide the necessary computing power and scalability to handle workloads efficiently. For sensitive or critical operations (such as those disclosed herein), using dedicated hardware can enhance security by reducing the risk of unauthorized access or tampering from external sources. Further, using dedicated hardware can help ensure data integrity and privacy. In addition, in a shared environment, resources may become scarce due to the actions of other users. By contrast, dedicated hardware ensures consistent and predictable resource allocation for specific tasks. Certain applications disclosed herein may need real-time processing or low-latency performance. Dedicated hardware reduces or eliminates potential interference from other tasks running on shared systems.

Multi-tenant systems are software architectures that serve multiple customers or tenants from a single instance of the application or database. Each tenant is isolated and operates as if they have their dedicated system, even though they share the same underlying infrastructure. Multi-tenant systems offer several benefits for both service providers and tenants. Multi-tenant systems allow sharing of resources among multiple tenants, reducing infrastructure. Providers can optimize resource utilization and achieve economies of scale. Multi-tenant architectures can scale more effectively as the number of tenants grows. Providers can add more resources and capacity to handle increased demand without the need to provision and manage separate instances for each tenant. Maintaining a single instance of the software simplifies system updates and maintenance tasks. Providers can apply updates, security patches, and bug fixes to all tenants simultaneously, ensuring that all users benefit from the latest improvements.

With multi-tenancy, new tenants can be onboarded quickly, as there is no need to set up separate environments for each customer. This reduces the time and effort required to get customers up and running on the system. Multi-tenant systems promote efficient resource utilization since the resources are shared dynamically based on demand. This results in better use of computing power, storage, and other resources.

Although tenants share the same infrastructure, they are isolated from each other at the application and data level. Proper security measures ensure that each tenant's data and operations remain private and secure. A multi-tenant system provides a centralized data repository, enabling unified reporting and analytics. Usage patterns may be analyzed to gain insights across all tenants to improve services and offerings.

Because the tenants have access to the same set of features and functionalities, there is no need to customize the software for each tenant, ensuring a consistent user experience for everyone.

The multi-tenant environment may be designed to accommodate different levels of customization for individual tenants without compromising the underlying shared architecture. The multi-tenant environment optionally provides a standardized integration interface for all tenants. This simplifies the integration process with other systems and applications, promoting interoperability.

Figure 15:
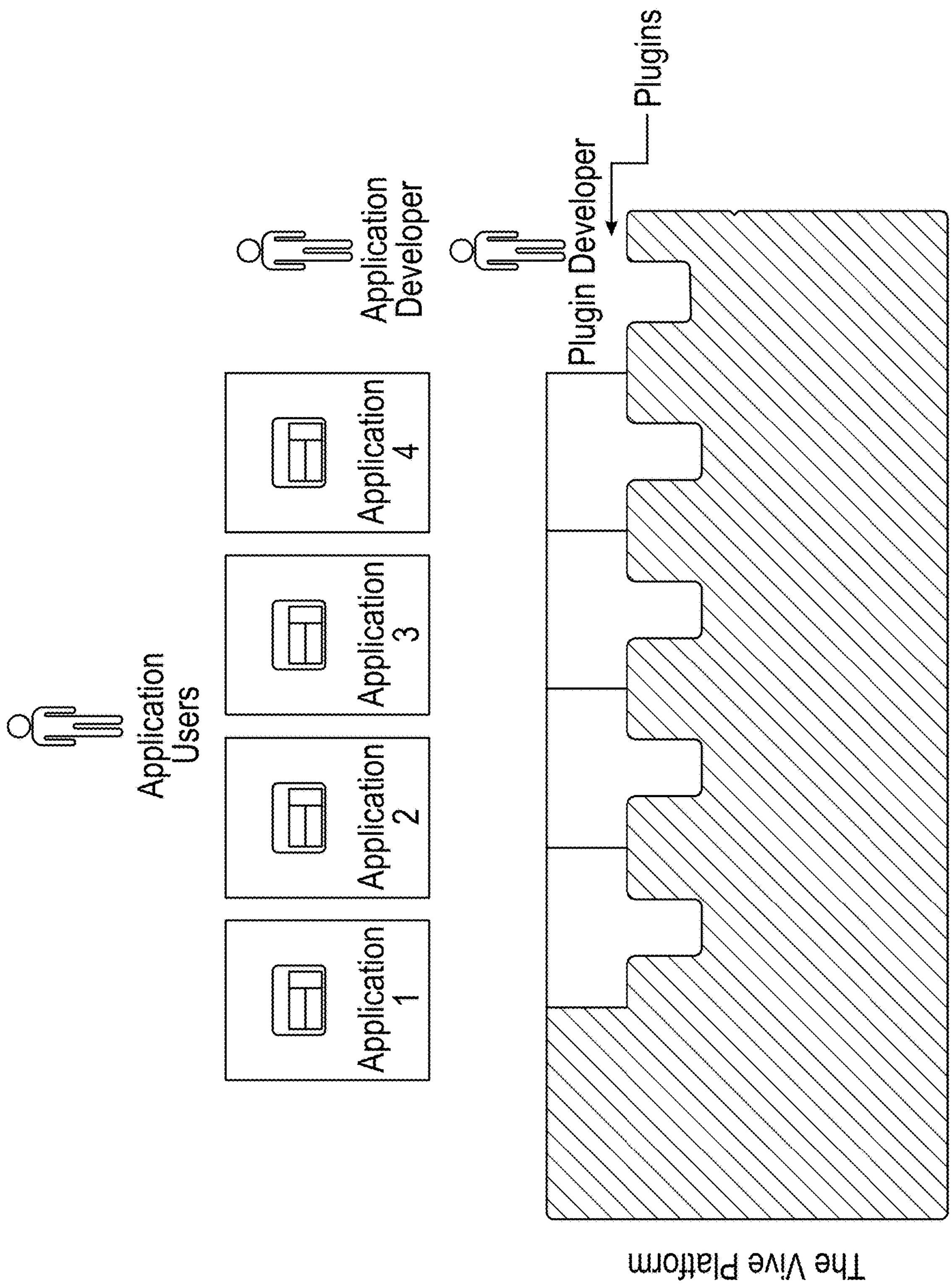
FIG. 15 illustrates example roles with respect to the disclosed system.

FIG. 15 illustrates example roles with respect to the disclosed system. Such roles may include end users (e.g., patients, medical service providers, etc.), application developers, and plug-in developers.

Figure 16:
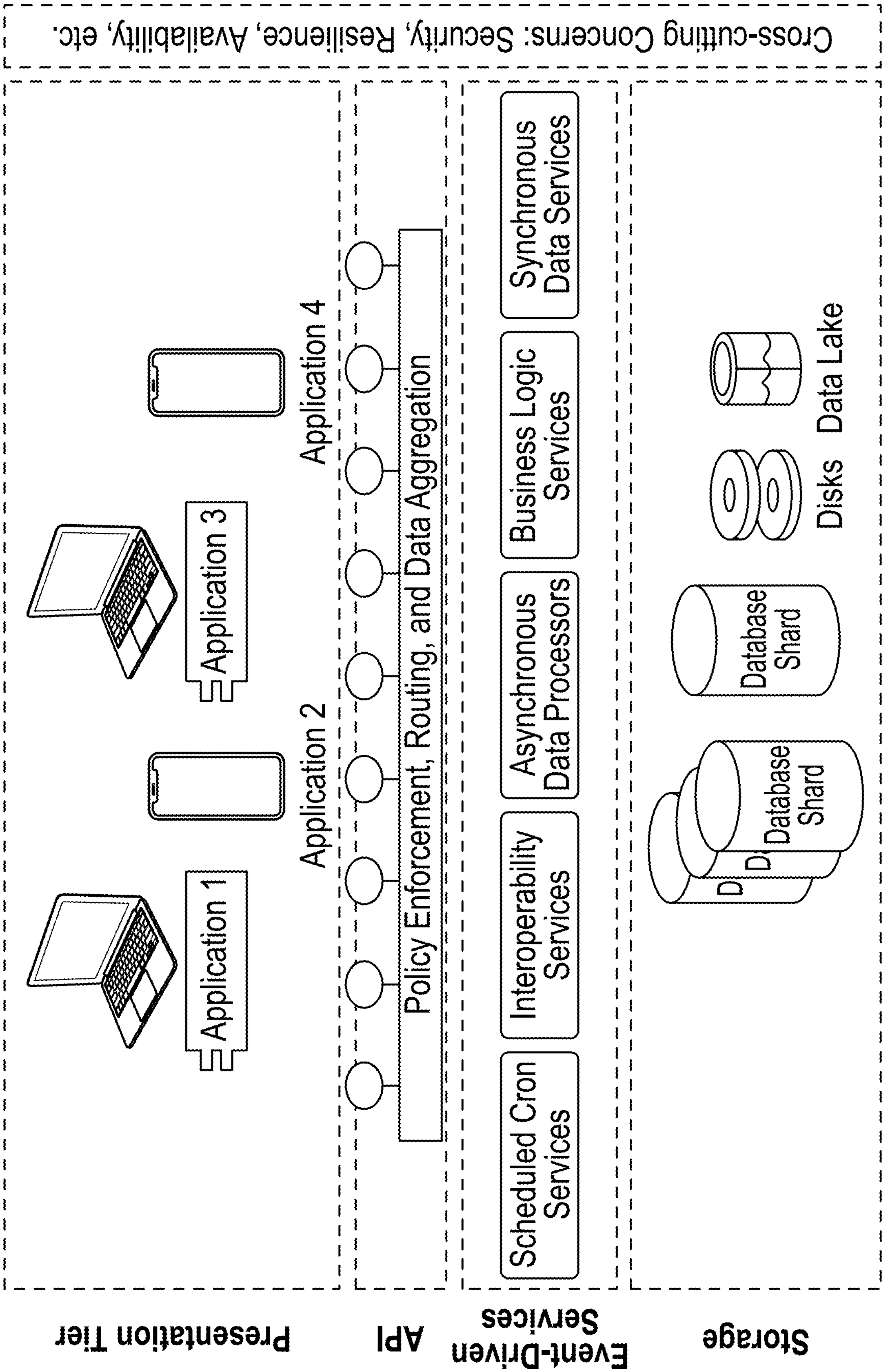
FIG. 16 illustrates an example software architecture.

FIG. 16 illustrates an example software architecture comprising a storage layer, an event-driven services layer, an API layer, and a presentation layer.

The storage layer may include disk drive storage devices, a data lake, and database shards. Database sharding splits a single dataset into partitions or shards. A given shard may contain unique rows of information that can be stored separately across multiple computers, sometimes referred to as nodes. Respective shards may run on separate nodes while sharing the original database's schema. The data lake data lake may comprise a centralized and scalable repository that enables the storage and management of vast amounts of raw, structured, semi-structured, and unstructured data.

The event-services may include a cron service comprising a time-based job scheduling system that enables the scheduling and automation of the execution of tasks or commands at specific intervals or predefined times (cron jobs). The event-services may include interoperability services comprising software components that facilitate communication and data exchange between different systems, applications, and/or devices to enable seamless interaction and integration among heterogeneous systems, allowing them to work together effectively. In the healthcare industry, interoperability services help different electronic health record (EHR) systems, medical devices, and healthcare applications exchange patient data securely. This enables healthcare providers to access comprehensive patient information, leading to better care coordination and decision-making.

The event-services may include asynchronous data processors that enable tasks to be executed independently and concurrently without waiting for each other to complete. In contrast to synchronous processing, where tasks are executed sequentially and block each other until they finish, asynchronous data processors allow multiple tasks to run concurrently, resulting in potentially faster and more efficient execution. The event-services may include business logic services that encapsulates and implements logic and rules that drive the behavior of a business application.

The event-services may include synchronous data services that perform sequential processing, in which the client application waits for the data or operation to complete before proceeding with further execution. In other words, the client makes a request to the data service, and the service responds with the requested data or result once it's ready. When a client makes a request to a synchronous data service, the client's execution is blocked or paused until the service provides the requested data or operation's result. The synchronous data services may provide real-time responses, so that the requesting client receives immediate feedback once the service processes the request.

The API layer may provide policy enforcement, routing, and data aggregation by incorporating additional layers or components that handle these specific functionalities. These layers work in conjunction with the core API to enhance its capabilities and improve the overall performance and security. For example, the APIs may implement policy enforcement mechanisms to control access, ensure security, and enforce business rules. By way of illustration, the API can authenticate users or applications and verify their permissions before permitting access to certain endpoints or data. The API can enforce rate limits to prevent abuse or excessive usage by limiting the number of requests a user or application can make within a specific time frame. The API may optionally require the use of API keys or tokens for authentication and may track usage to identify and block unauthorized access to thereby enhance protection of patient data. Further, the API can validate incoming data to ensure that it adheres to predefined standards or constraints, preventing malicious or malformed data from being processed. The APIs can employ routing mechanisms to direct incoming requests to the appropriate handlers or services. Routing can optionally be achieved through URL Mapping, where the API uses URL patterns to map incoming requests to specific API endpoints or handlers based on the requested URL. An API gateway may act as a centralized entry point that routes requests to different microservices based on the requested resource or functionality.

APIs can aggregate data from multiple sources and present it to the client as a single unified response. This is particularly valuable when clients need data from multiple endpoints or services (e.g., from multiple medical service provider systems) to fulfill their requirements. Data aggregation can be achieved through backend aggregation where the API backend collects data from various internal or external services and aggregates it into a single response before sending it back to the client. The API may provide endpoints that allow clients to request specific data sets, and the API aggregates the required data from different sources to fulfill the request. The APIs can cache responses from different data sources, reducing the need to fetch data repeatedly and improving response times. The API enables clients to send multiple requests in a single call, reducing overhead and improving efficiency when retrieving data from multiple endpoints. By incorporating policy enforcement, routing, and data aggregation, APIs can offer robust security, improved performance, and a more user-friendly experience for developers and end-users alike.

The presentation layer may include various applications described herein.

Figure 17:
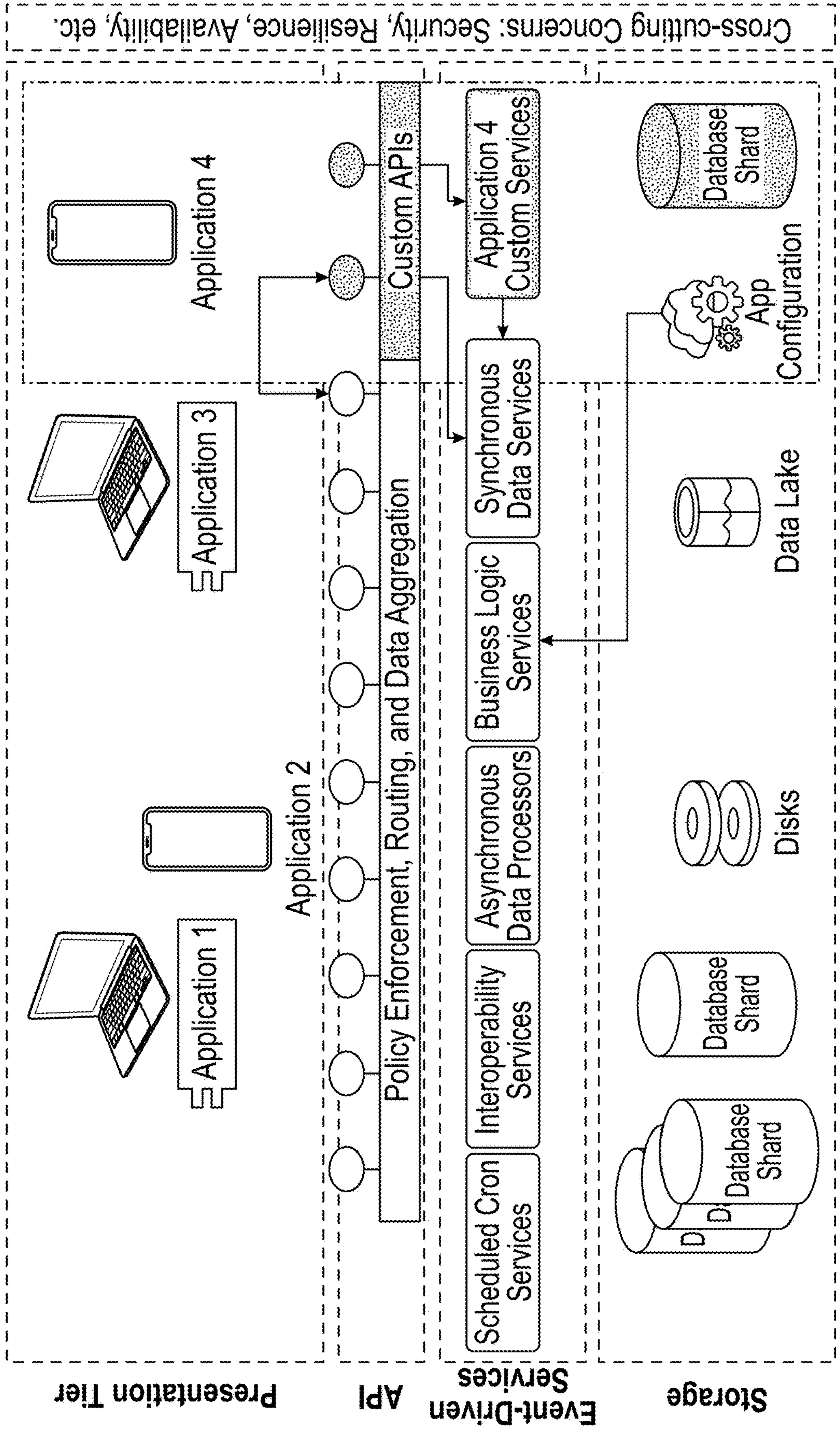
FIG. 17 depicts example flow diagrams illustrating certain processes or data flows.

FIG. 17 depicts example flow diagrams illustrating certain processes or data flows.

Various user interfaces will now be described that may be populated in whole or in part by the one or more systems disclosed herein. The user interfaces may be rendered on a user's terminal. Certain user interfaces may be rendered on a medical service provider's terminal and certain user interfaces may be rendered on a patient's terminal. A terminal may be in the form of a computing device, such as a desktop computer, a laptop computer, a smartphone, a tablet computer, a thin client, a virtual reality headset, an augmented reality headset, and/or the like.

The system may be configured to track a person's (e.g., a student's) vaccination status. The user interface may be configured to enable vaccination documents to be uploaded and to report the status of review of such documents.

Figure 18A:
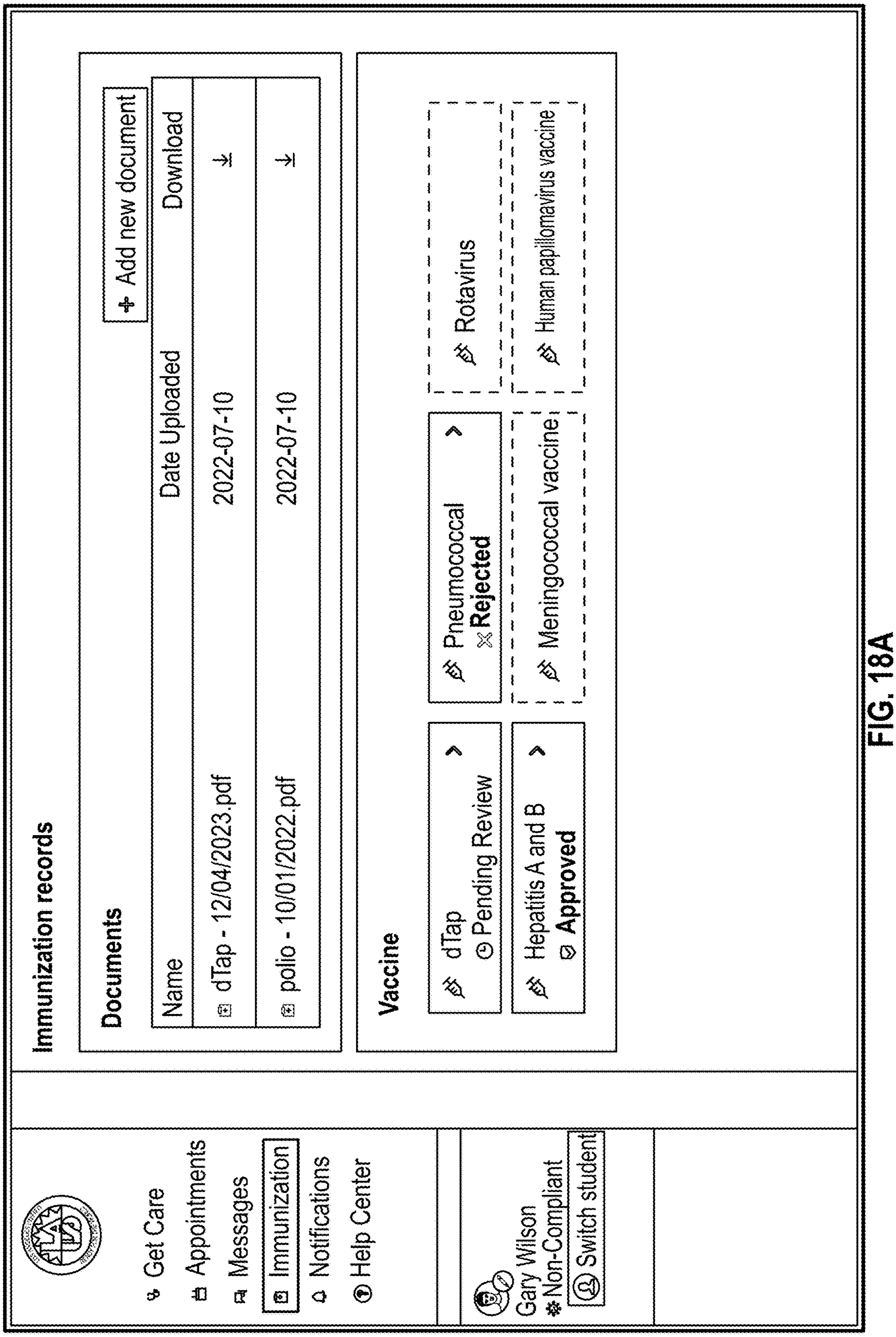
FIGS. 18A-18F illustrate example user interfaces for tracking vaccination information.

FIGS. 18A-18F illustrate example user interfaces for tracking immunizations/vaccination information, such as for students at a school. FIG. 18A illustrates an immunization summary report for a student. The information may be populated from a governmental immunization database and/or from medical services' data stores. The user interface may provide the student's name, a list of vaccinations and dates for vaccinations the student has received, as well as the dates a document evidencing such vaccination (e.g., provided by a government entity or a medical service provider) was uploaded may be provided. The status of review for a given vaccination may be provided (e.g., pending review, approved, rejected).

Figure 18B:
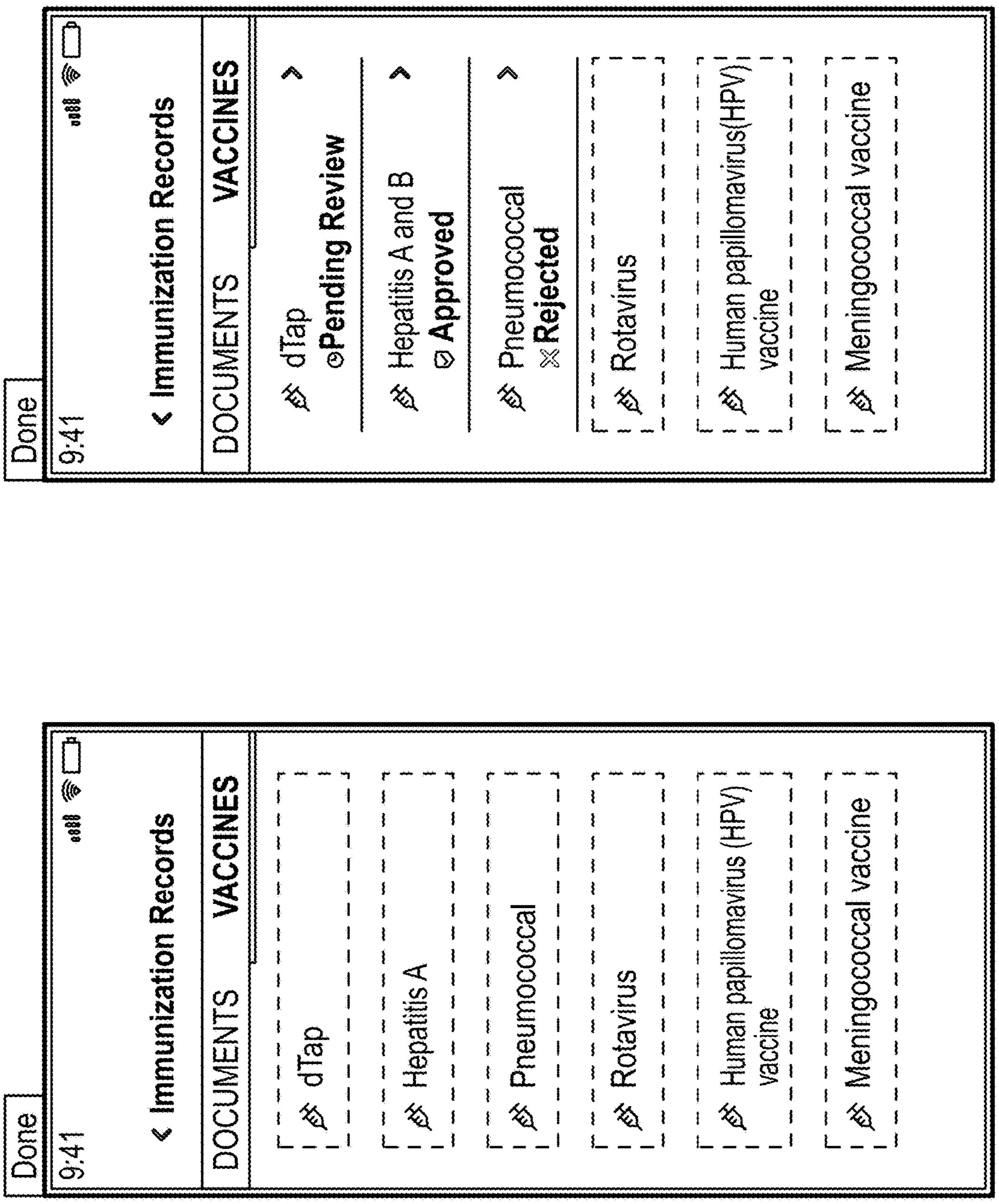

FIG. 18B illustrates a user interface configured for a mobile device listing vaccinations prior to records being received to evidence such vaccinations and a depiction of the user interface after documents for some of the vaccinations have been uploaded, along with the status of review of such documents.

Figure 18C:
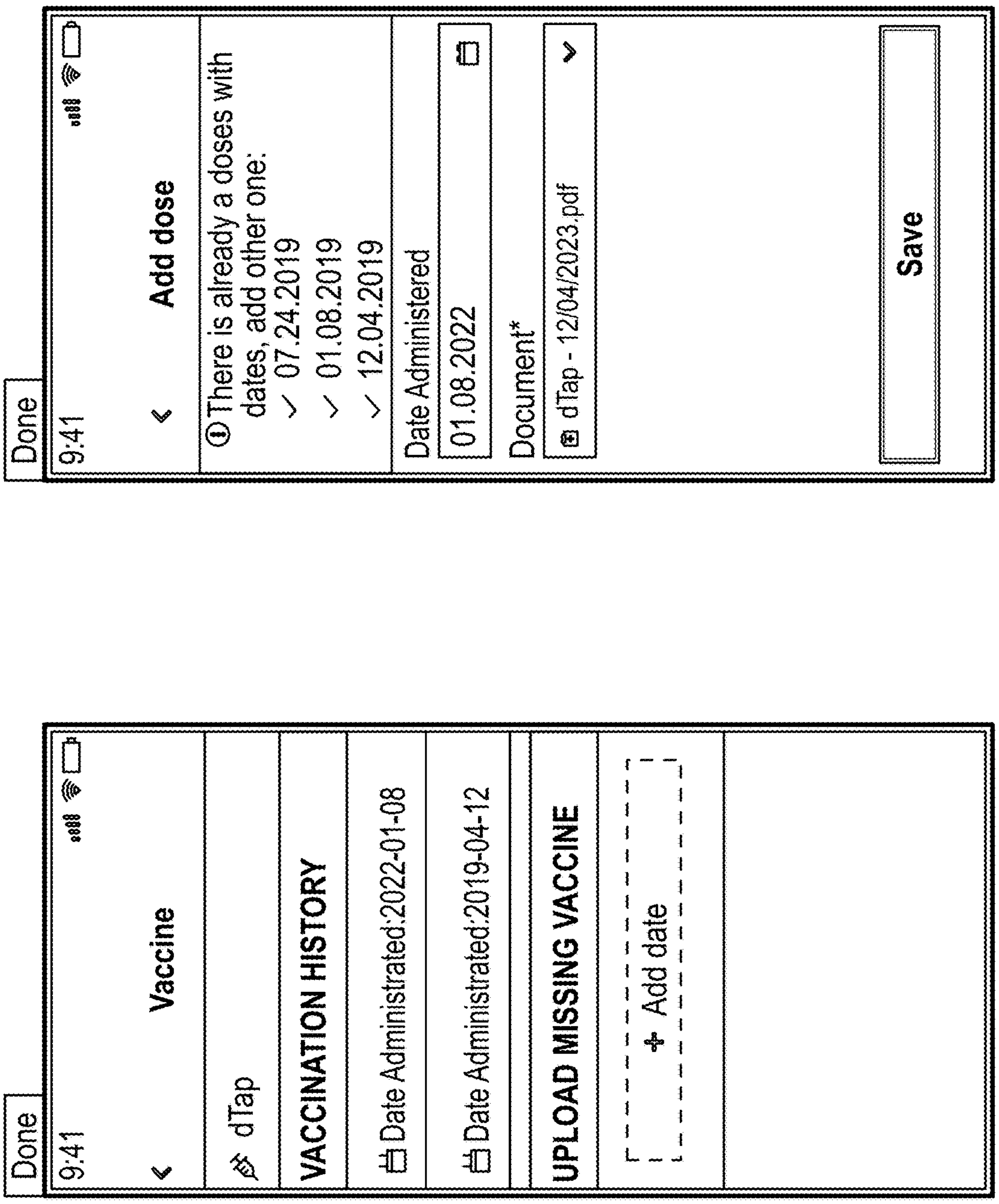

FIG. 18C illustrates a user interface depicting the vaccination history for the student, including the date the vaccines were administered and an identification of missing vaccine documents. The user may be prompted via the user interface to upload the missing vaccine documents.

Figure 18D:
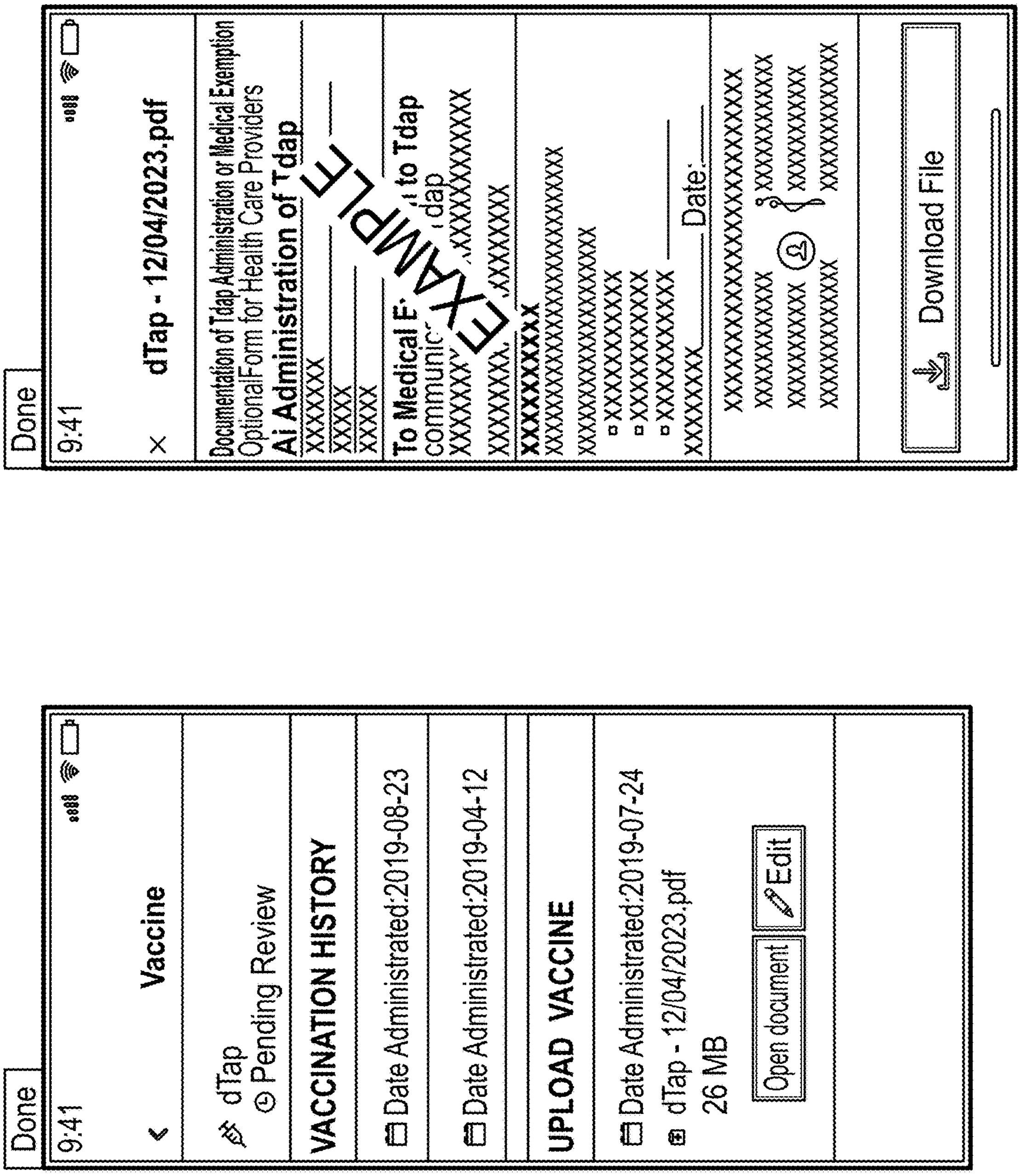

FIG. 18D illustrates the user interface of FIG. 18C after the missing vaccine document (also illustrated) is uploaded.

Figure 18E:
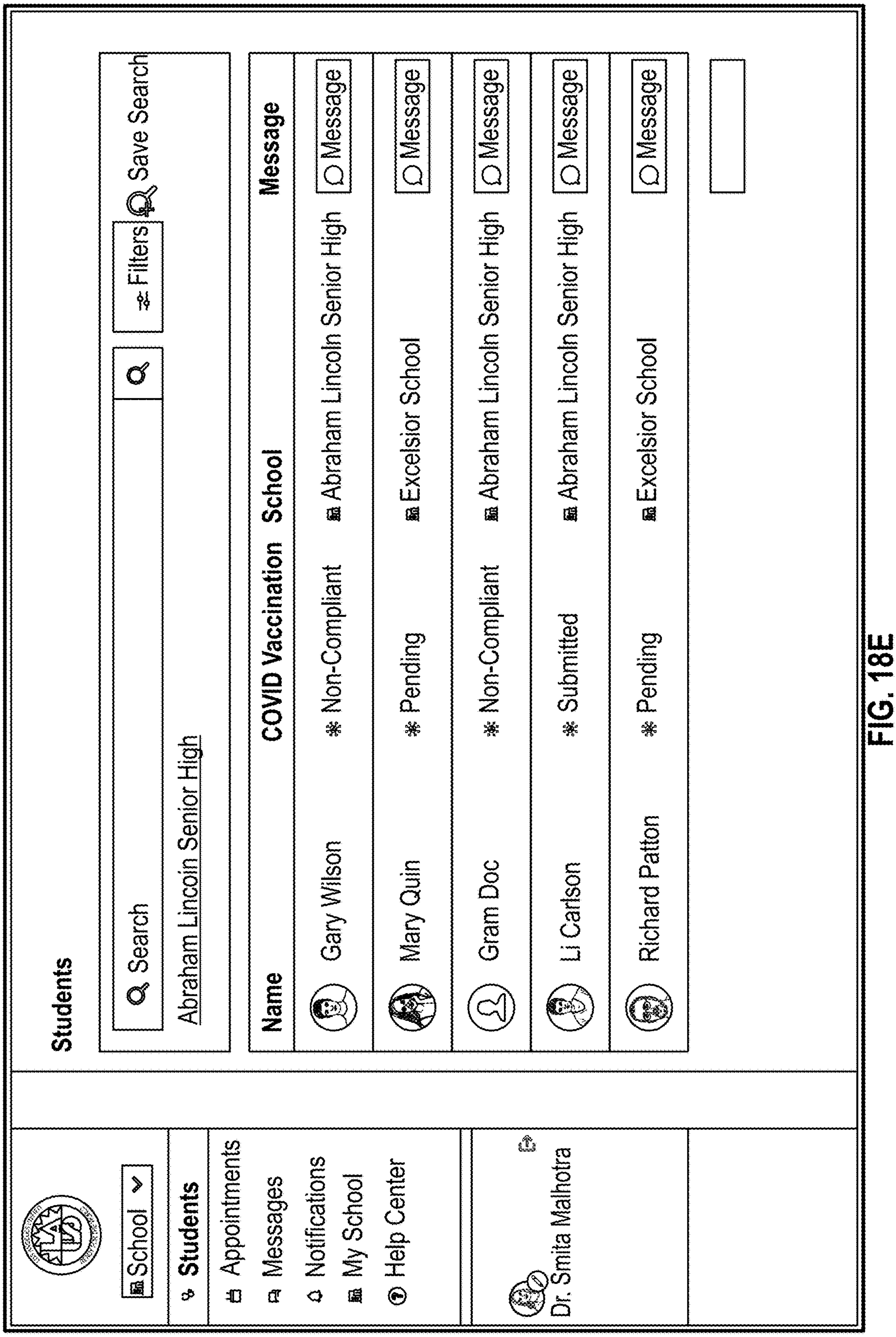

FIG. 18E illustrates an example user interface comprising a search user interface via which a user can search for student vaccination records. A search field may be provided via which text search terms may be entered (e.g., a student name, a school name, a vaccination name, etc.). Filters are provided via which search results may be filtered for a data range, a vaccination type, a vaccination status, a school, and/or the like. The search results may be generated by a search engine that identifies matching records. The search results may list corresponding student names, images, the status for a given vaccination (e.g., non-compliant, compliant, submitted, pending), and the student's school. A messaging user interface may be provided via which a user may communicate with a student, a student's parent or guardian, and/or a medical service provider regarding a given vaccination.

Figure 18F:
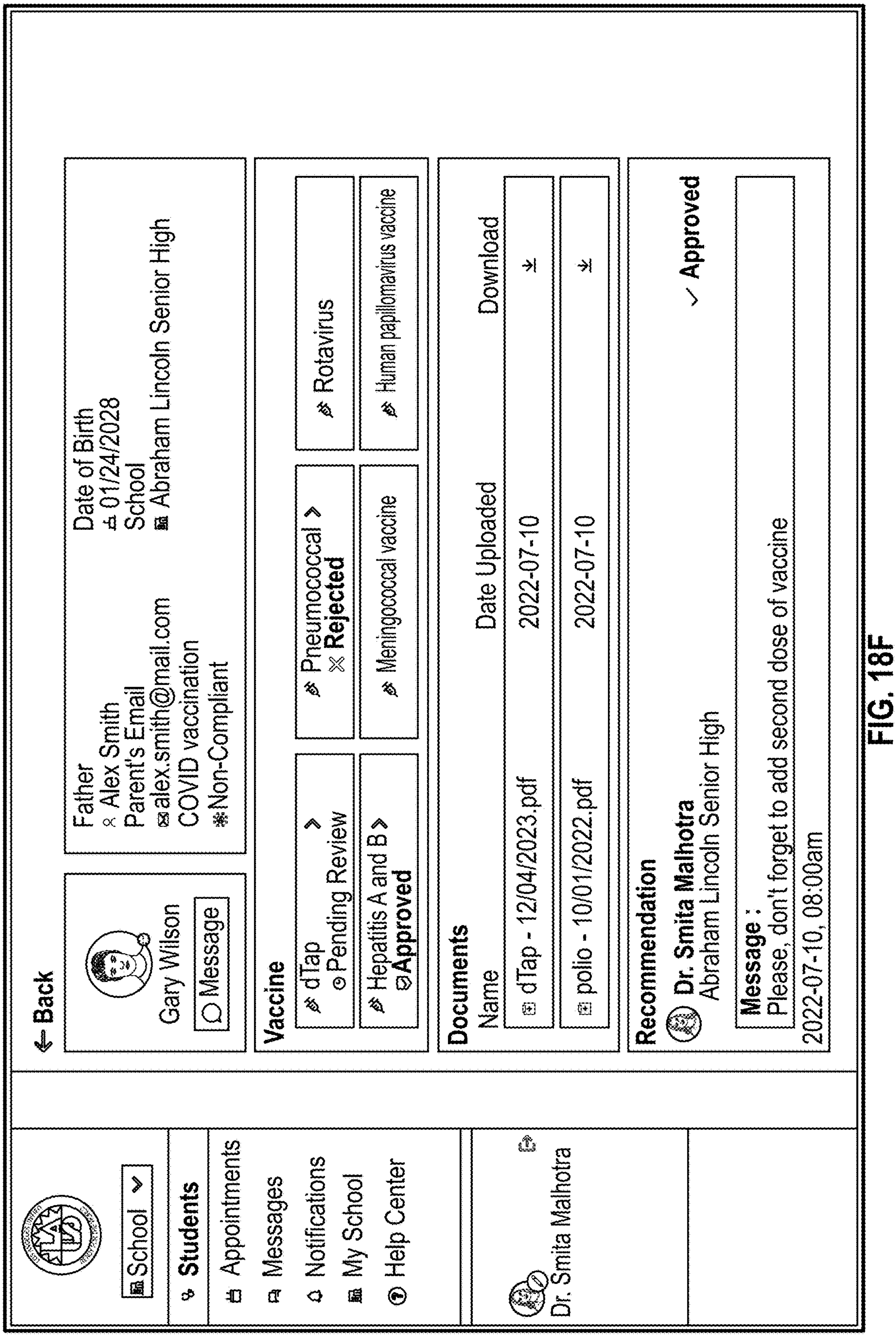

FIG. 18F illustrates an example user interface listing uploaded vaccination documents, a physician's recommendation regarding vaccinations, and a recommendation status.

Figure 19A:
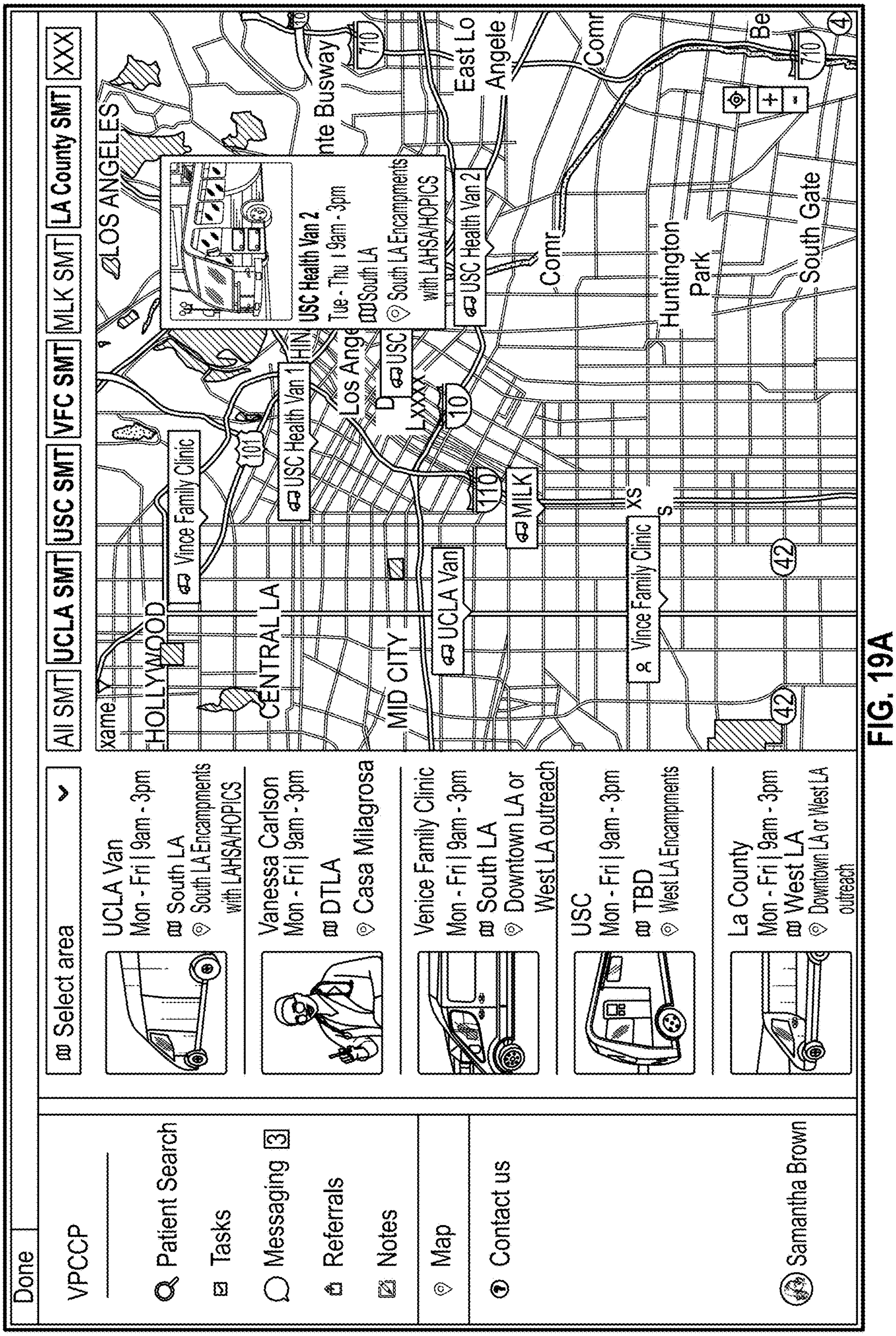
FIGS. 19A-19B illustrate example map user interfaces.
Figure 19B:
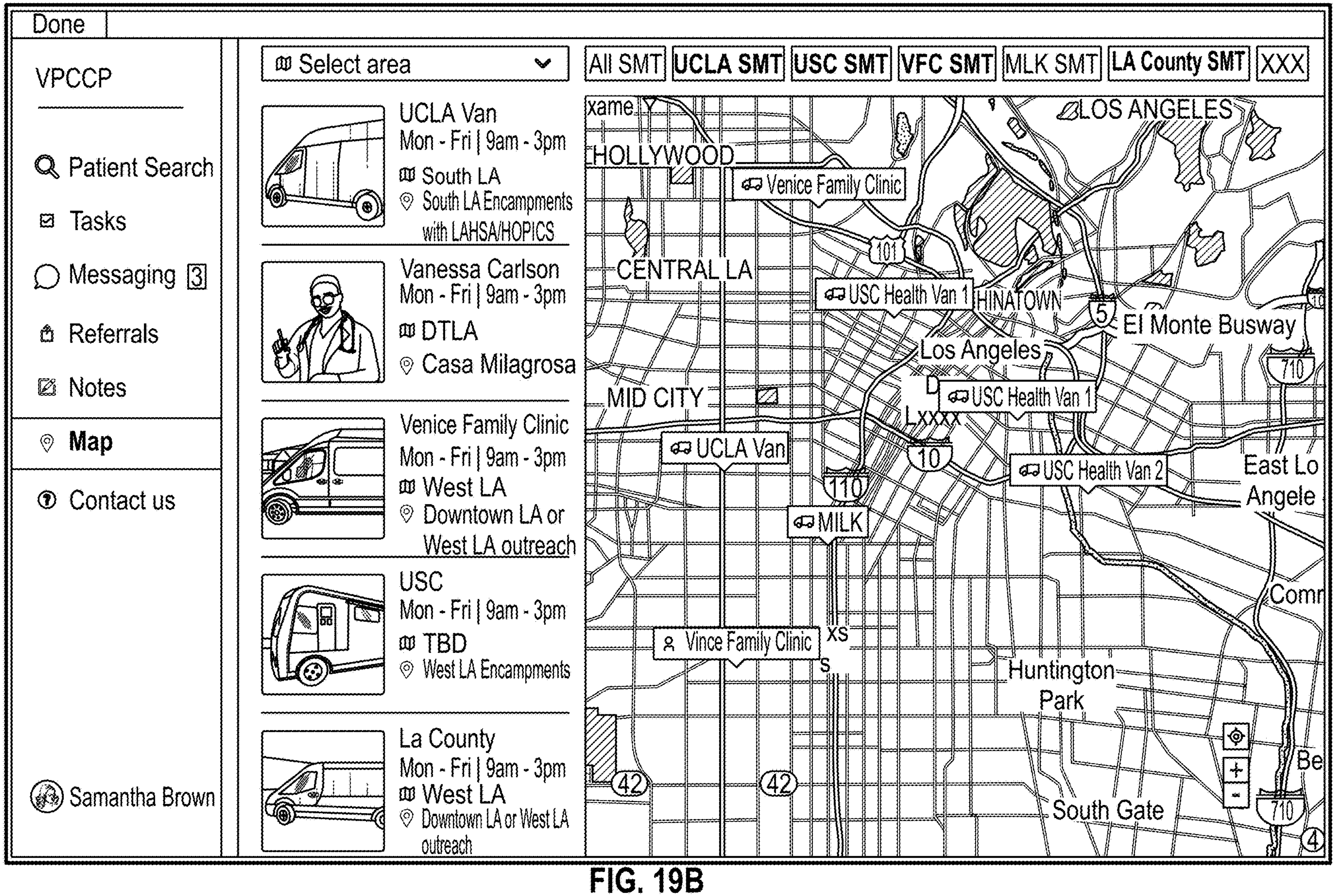

FIGS. 19A-19B illustrate example user interfaces providing mapping data that lists medical services within a given area, hours of operation, and mapped locations. A menu may be provided via which the user can select a desired area. Filter controls may be provided via which the user can specify that the user interface is only to display medical services from specific providers and/or specific areas.

FIGS. 20A-20E illustrate example task management user interfaces.

Figure 20A:
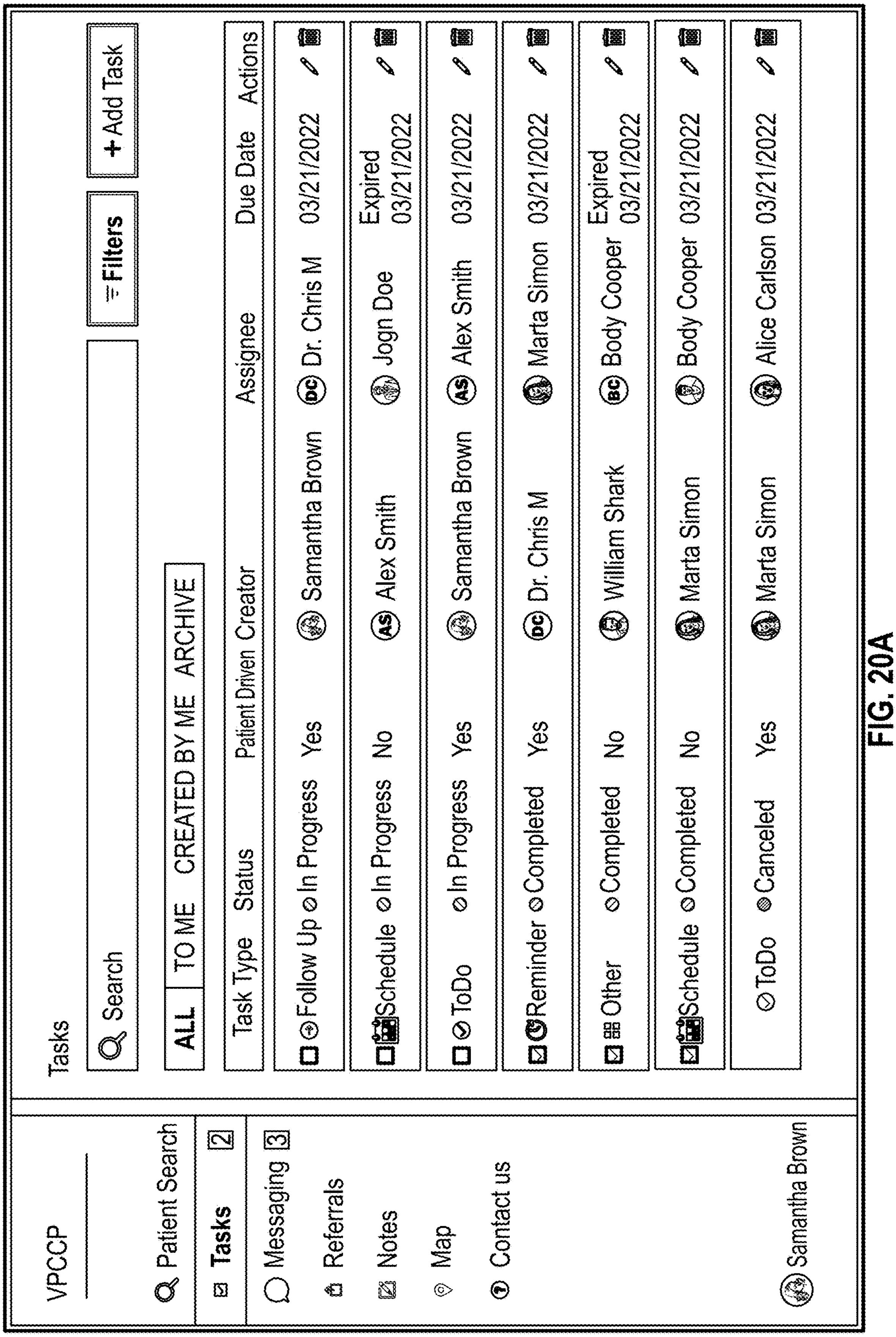
FIGS. 20A-20E illustrate example Person-Centered Care Planning and Service Engagement (PCCP) task management user interfaces.

Referring to FIG. 20A, an example PCCP user interface provides a list of tasks assigned to various medical service providers. A task type (e.g., follow-up, schedule appointment, to do, reminder, other, and/or the like), status (e.g., completed, in progress, canceled, and/or the like), a patient driver indication (e.g., yes, no), task creator, task assignee, and due date, may be provided for a given task. Controls may be provided via which a user may delete or a task. Filter controls may be provided via which a user can cause the system to filter the presented tasks. Example filter controls may include "all", tasks assigned to the user ("To me"), tasks created by the user ("Created by me"), and archived tasks. Controls may be provided via which the user can add a task.

Figure 20B:
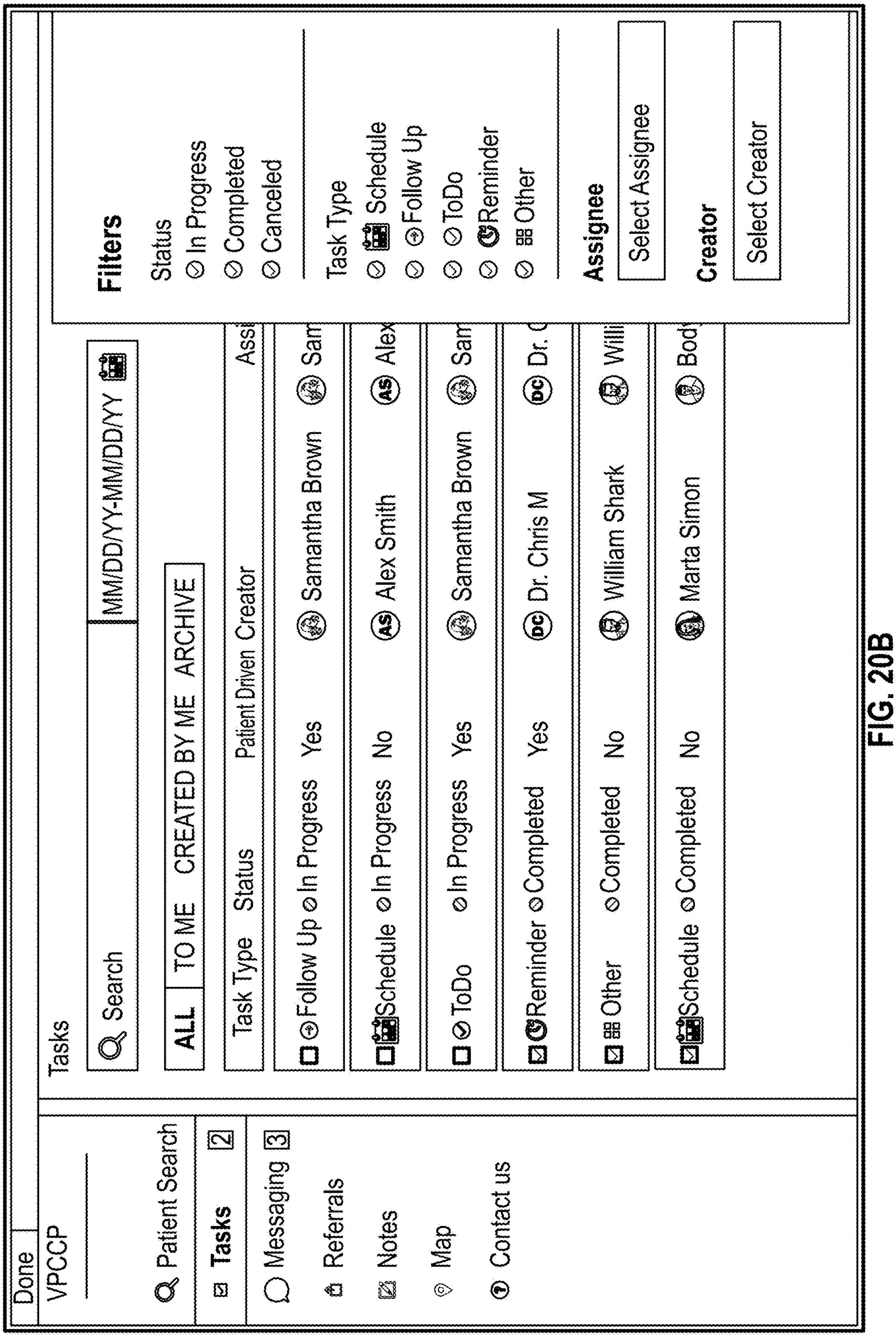

In response to the user activating the add task control, the example task definition user interface illustrated in FIG. 20B may be presented. The task definition user interface enables the user to specify a task status, a task type, an assignee, and a creator for the task. A comment field may be provided via which the user can add freeform task descriptions and comments to the task. An add media control may be provided via which the user can add media to the task (e.g., still images, video images, sound files, graphics, etc.). Interfaces may be provided via which the user can add a task due date and a task follow-up date. FIG. 20D illustrates a task addition user interface comprising a menu via which a user may select a task type, indicate whether or not the task is patient driven, select a task assignee from a menu of providers, specify a due data and a follow up date, add a description (e.g., via keyboard or via voice by activating a voice input control), upload media, and upload a file.

Figure 20C:
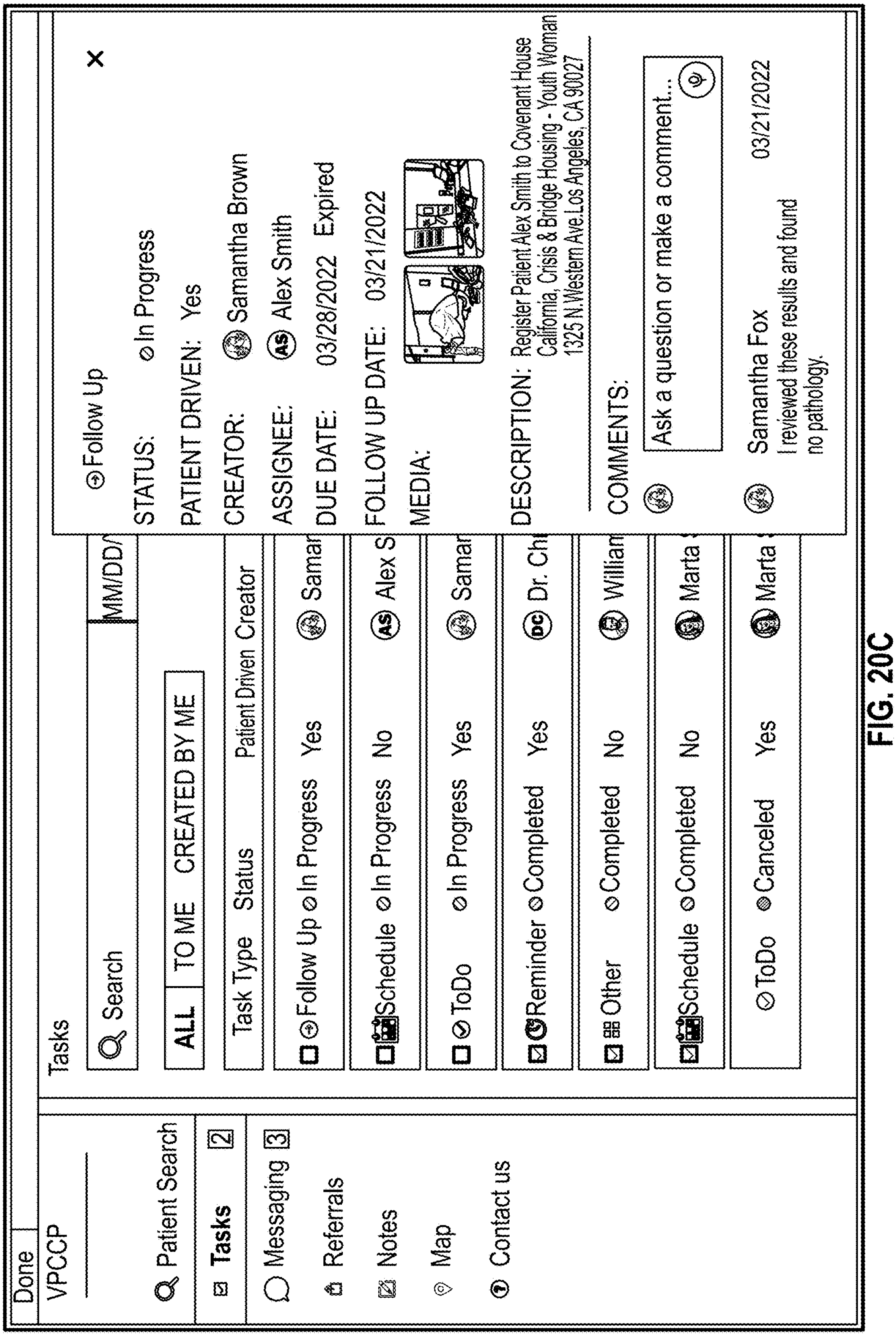
Figure 20D:
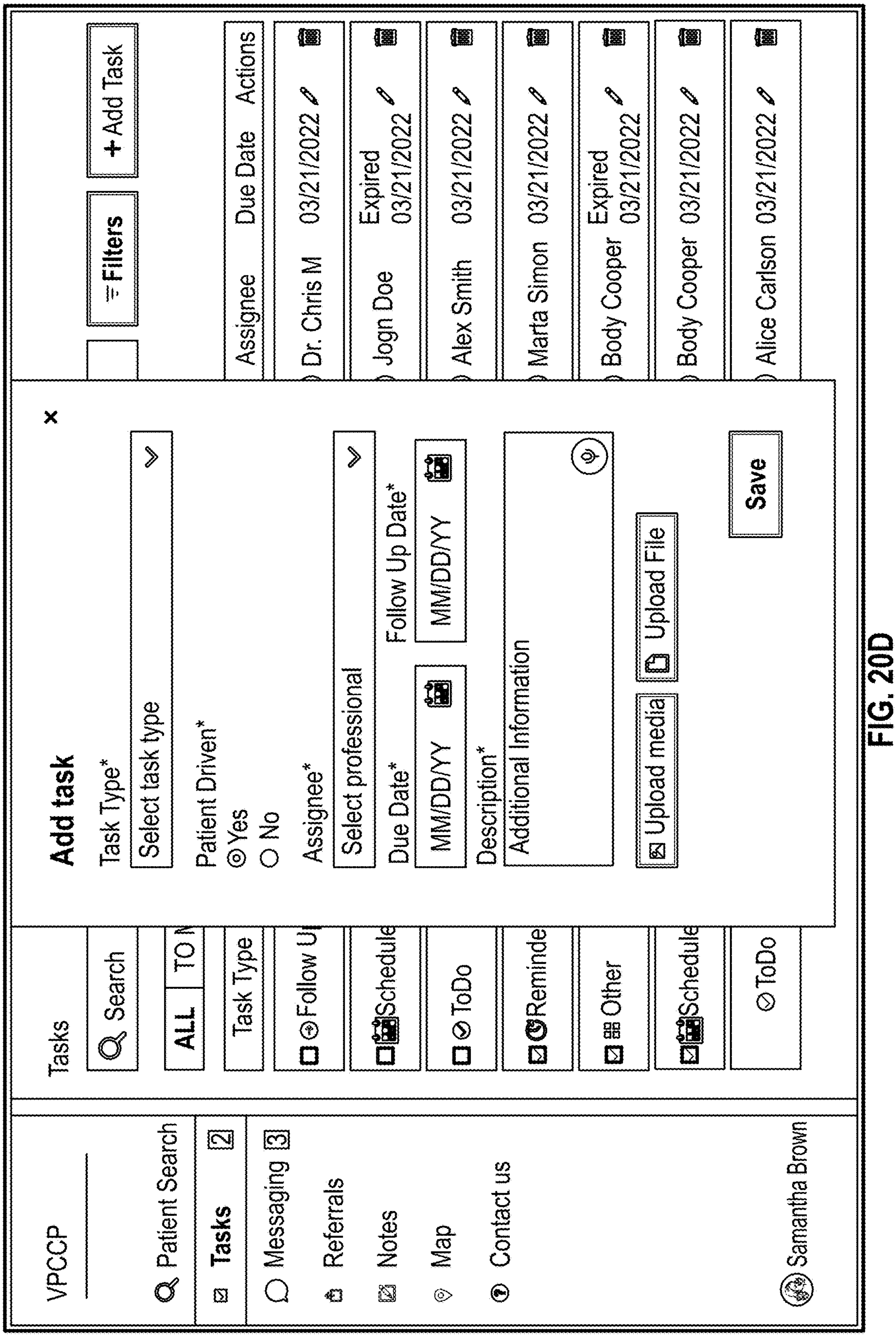
Figure 20E:
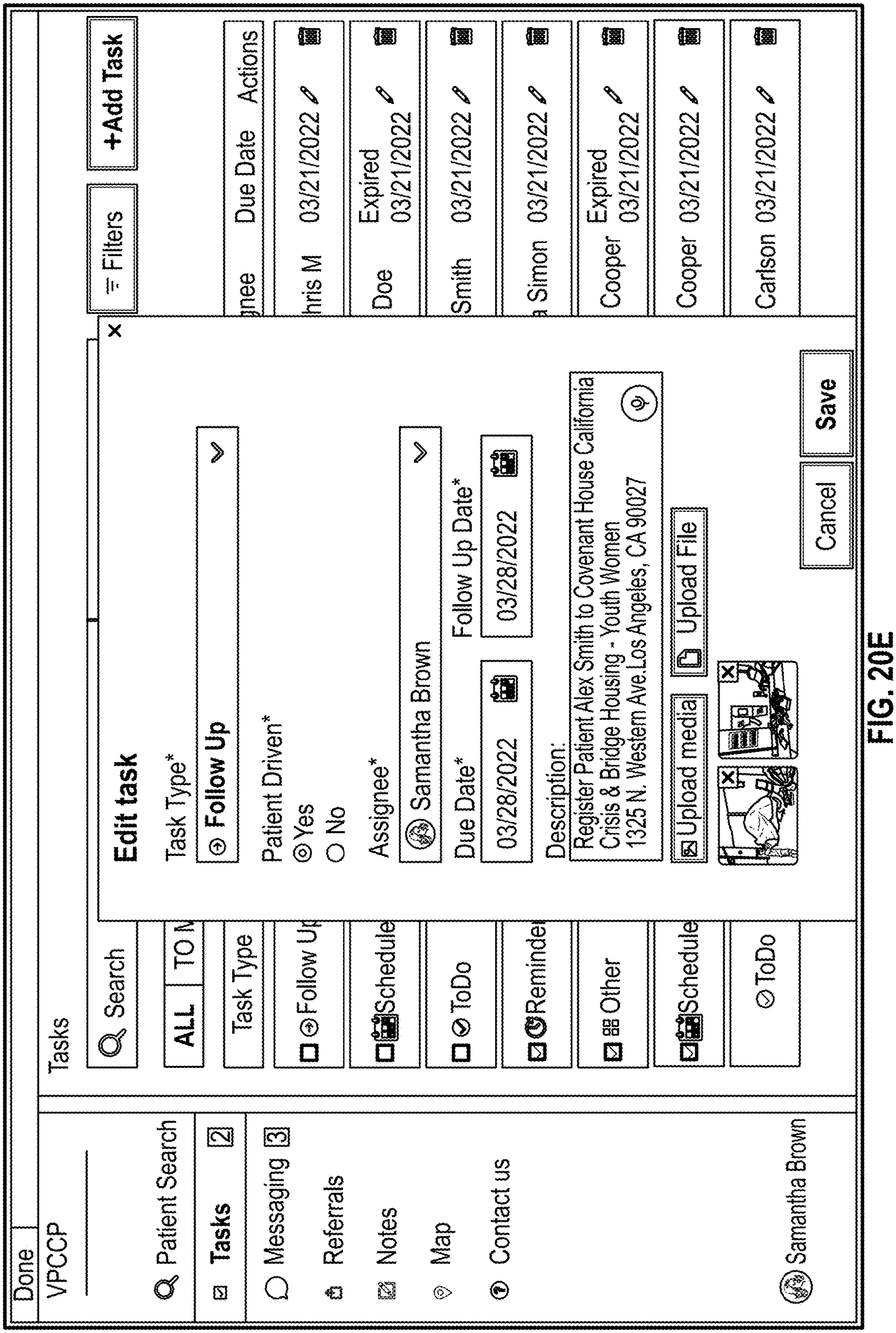

In response to selecting a task from the task list in FIG. 20A, the example task interface illustrated in FIG. 20C may be rendered. The task interface may provide the task type, the task status, an indication as to whether the task is patient driven, the task creator, the task assignee, the task due date, the task follow-up date, task related media, a task description, and comments. Activation of a save control will save the created task.

FIG. 20 illustrates a task edit user interface via which one or more of the task entries may be edited and saved.

FIGS. 21A-21H illustrate example Person-Centered Care Planning and Service Engagement (PCCP) user interfaces. A search engine may receive a specified search and return results via the user interface. The results do not have to exactly match the search query, and the search results may be ordered based on the closeness of the match. A name field is provided via which all or a portion of a patient's name may be entered. A date of birth field via which the patient date of birth may be specified. A control is provided via which the user can access an advanced search user interface.

Figure 21A:
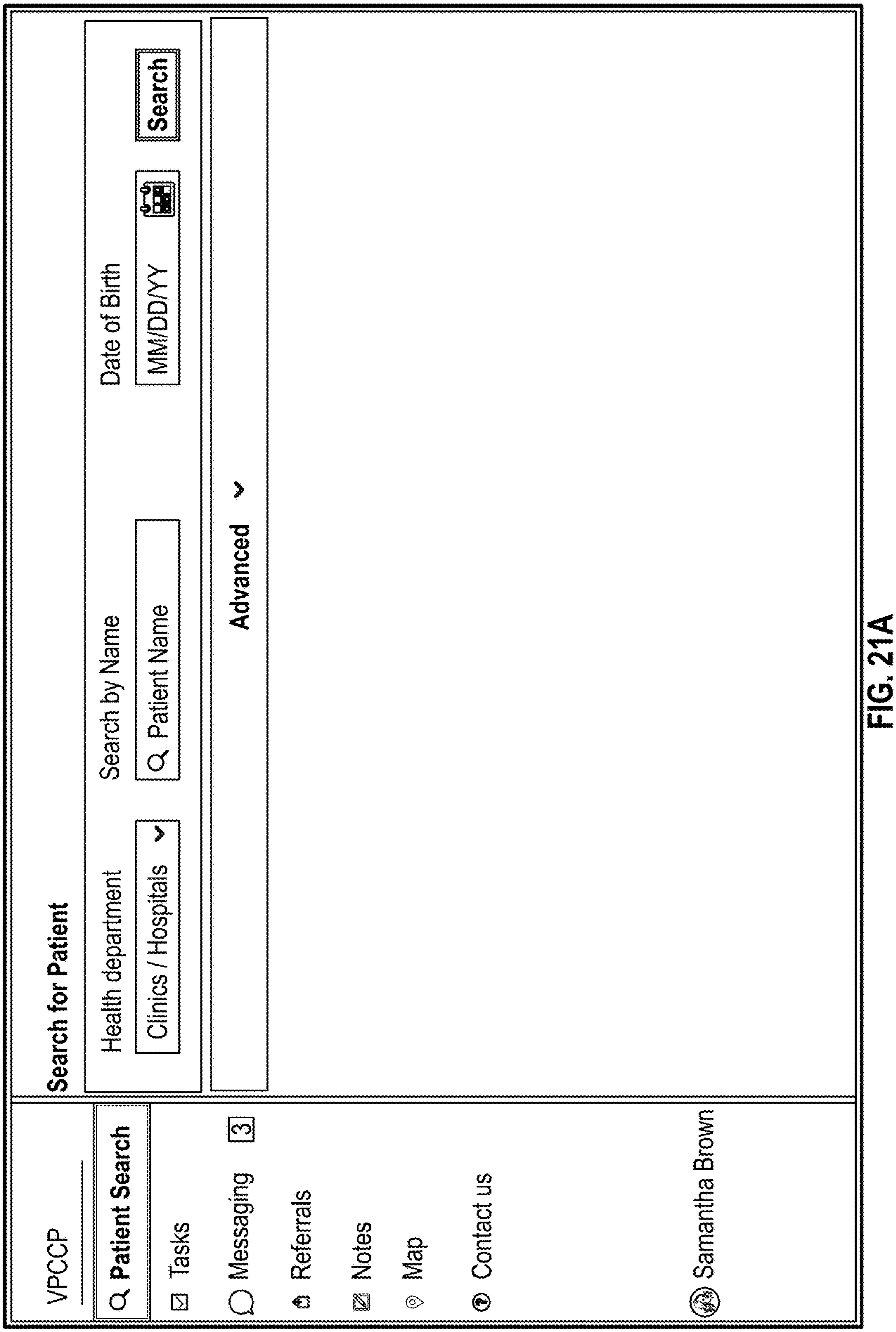
FIGS. 21A-21H illustrate additional example PCCP user interfaces.

FIG. 21A illustrates an example patient search interface that enables a user to search for a patient and associated patient records. A drop down menu is provided via which a user can select a healthcare department (e.g., clinics/hospital) to which the search is to be limited.

Figure 21B:
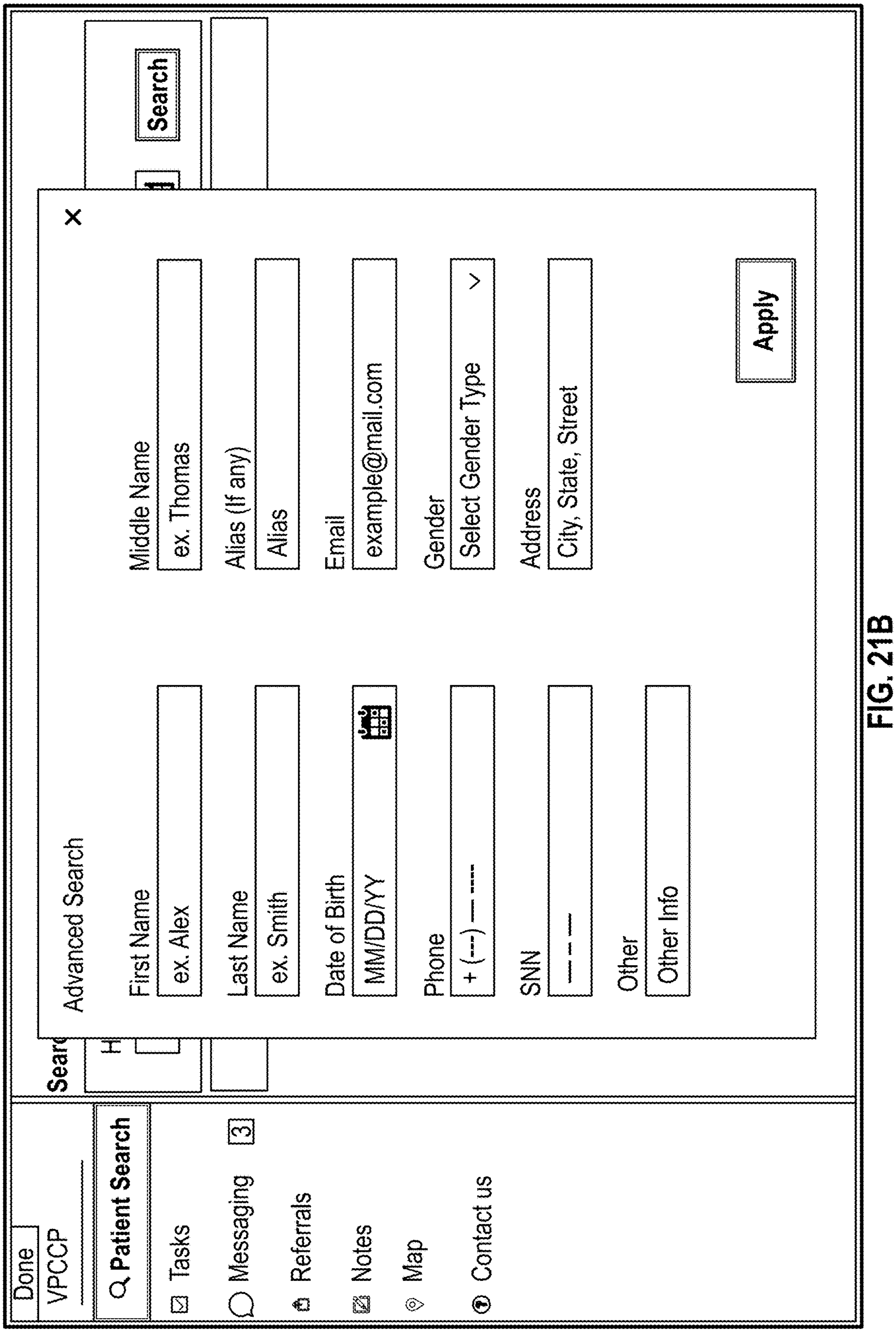

FIG. 21B illustrates an example advanced patient search interface that enables a user to search for a patient and associated patient records. A search engine may receive a specified search and return results via the advanced search user interface. The results do not have to exactly match the search query, and the search results may be ordered based on the closeness of the match. A first name field, middle name field, last name field, and alias field are provided via which all or a portion of a patient's first name, middle name, last name, and alias may be respectively entered. A date of birth field via which the patient date of birth may be specified. An email field may be provided to receive a patient email address/A phone number field may be provided to receive a patient phone number. A drop down gender menu may be provided via which a patient render may be selected. A social security number field may be provided to receive a patient social security number. An address field is provided to receive all or part of a patient address (e.g., city, state, street). An "other" field may be provided configured to receive other information to be used in performing the search.

Figure 21C:
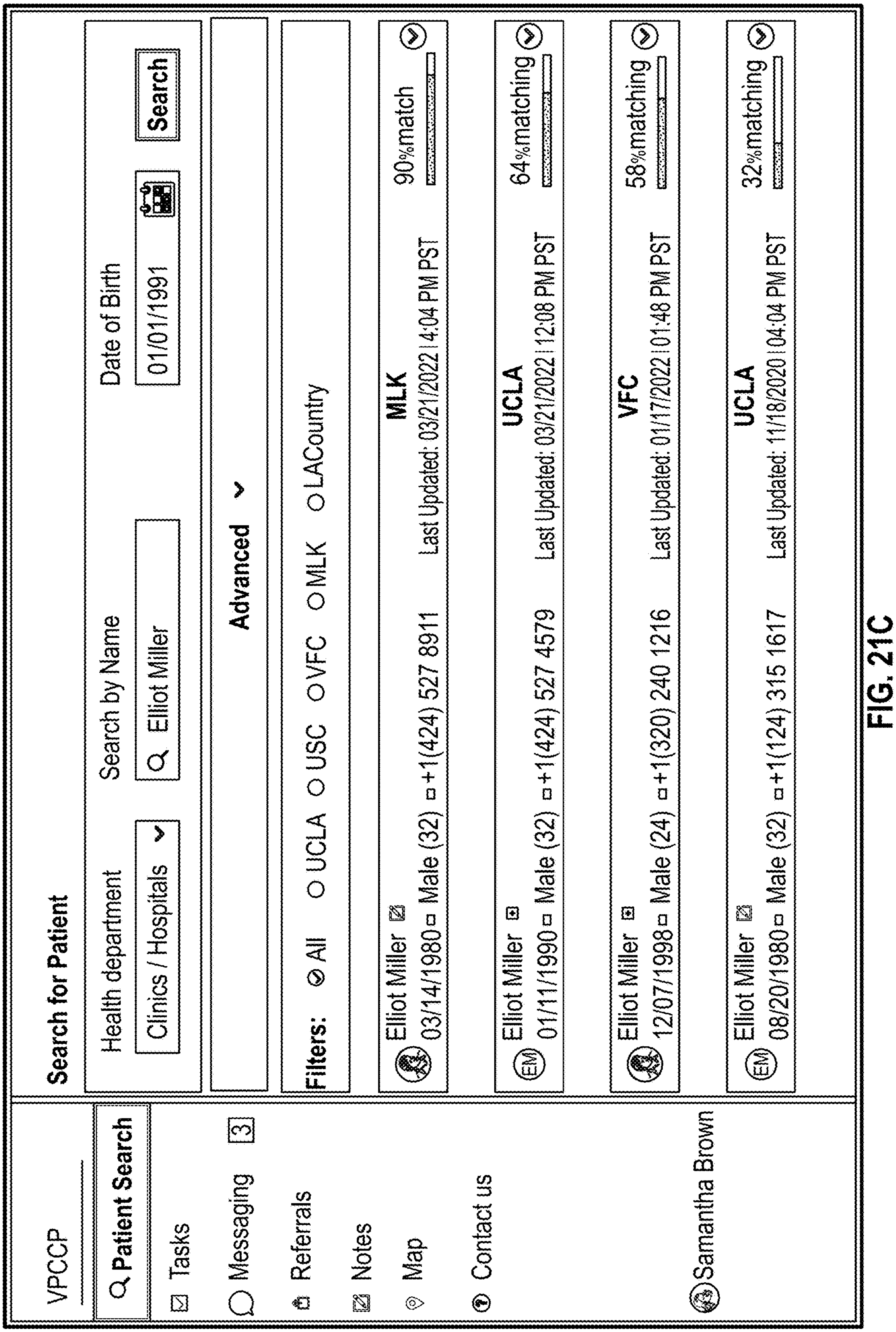

FIG. 21C illustrates an example search results user interface generated in response to a search specified via the search user interface illustrated in FIG. 21A. The search result may provide patient entries matching the search specification, including a patient image (if available), a patient name, birthdate, sex, age, telephone number, medical service provider (e.g., hospital), date/time of last update, and a score indicating the closeness of match. Filter controls are provided via which the search results may be filtered accordingly. Example filters may include "all", specific hospital/service providers, and/or geographic areas.

Figure 21D:
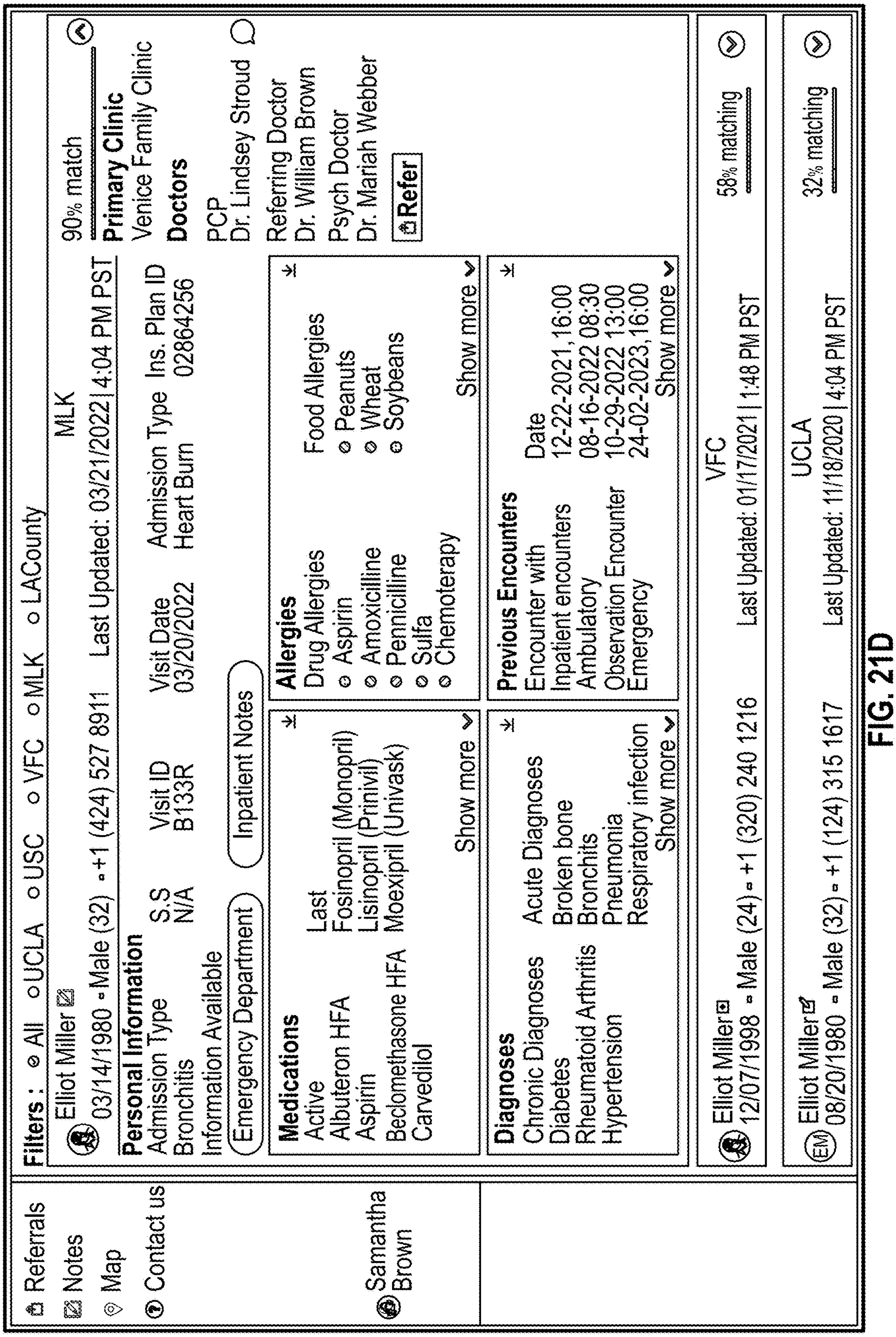

In response to a user selecting a patient entry in the search results, a patient record user interface, such as the example illustrated in FIG. 21D, may be generated and rendered (optionally in the search result user interface of FIG. 21C). The patient record user interface may provide a patient image, name, birth date, gender, age, phone number service provider, and date/time of last record update. In addition, personal information, such as admission type (e.g., medical condition), SS, visit identifier, visit date, admission type, and insurance plan identifier, may be provided. An identification of additional information may be provided (e.g., emergency department, inpatient notes, etc.). The user interface may provide the medications prescribed for the patient, including active prescriptions, and past prescriptions. In addition, the patient's drug allergies and food allergies may be provided. The user may also include diagnoses categorized as chronic diagnoses and acute diagnoses. The user interface provides previous patient encounters, including with what department the encounter was with and the date and time of such encounters. The user interface may provide the primary clinic of the patient, the patient's doctors, and the doctor's function/specialty. The user interface may enable various documents to be viewed (e.g., downloaded and viewed).

Figure 21E:
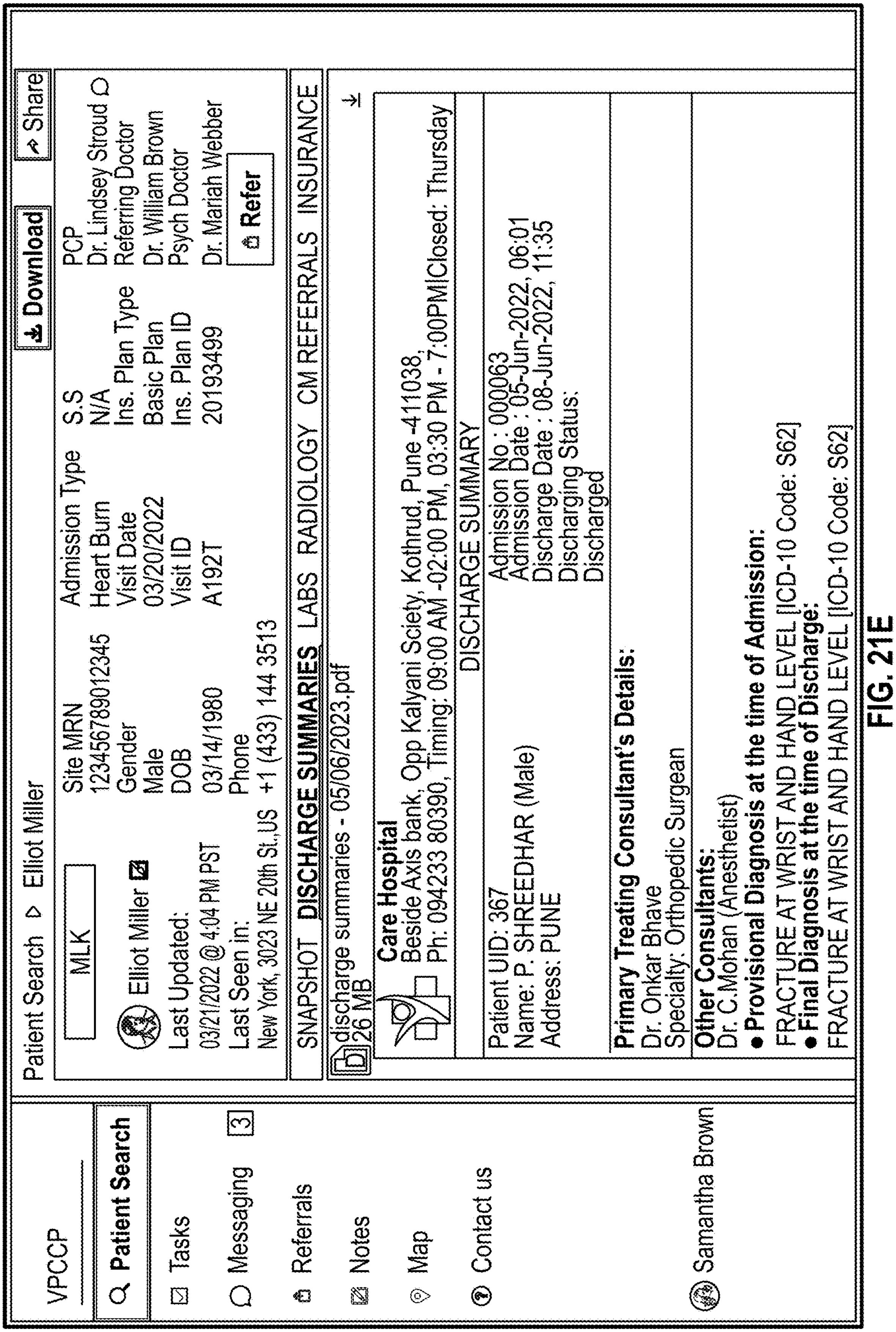
Figure 21F:
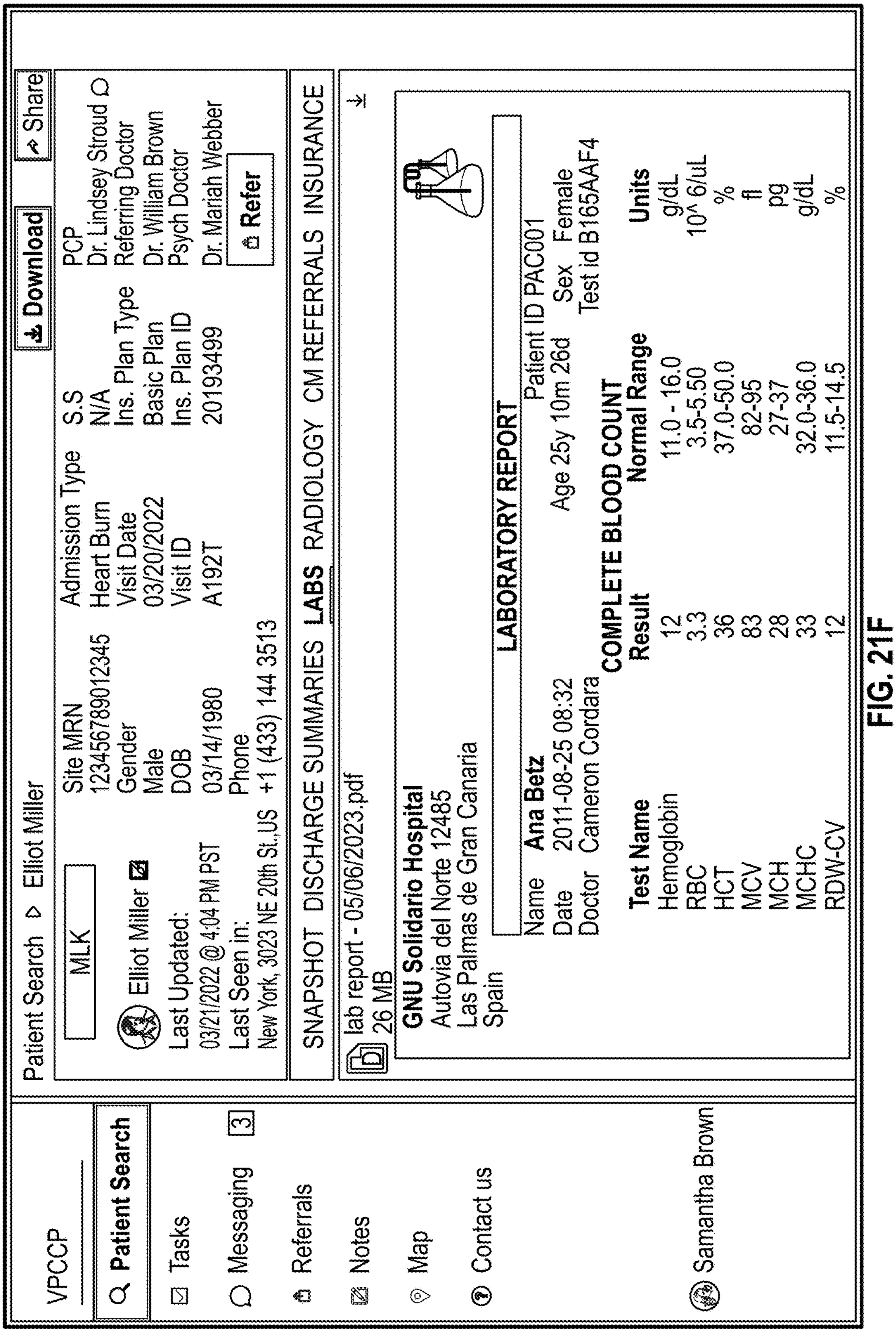
Figure 21G:
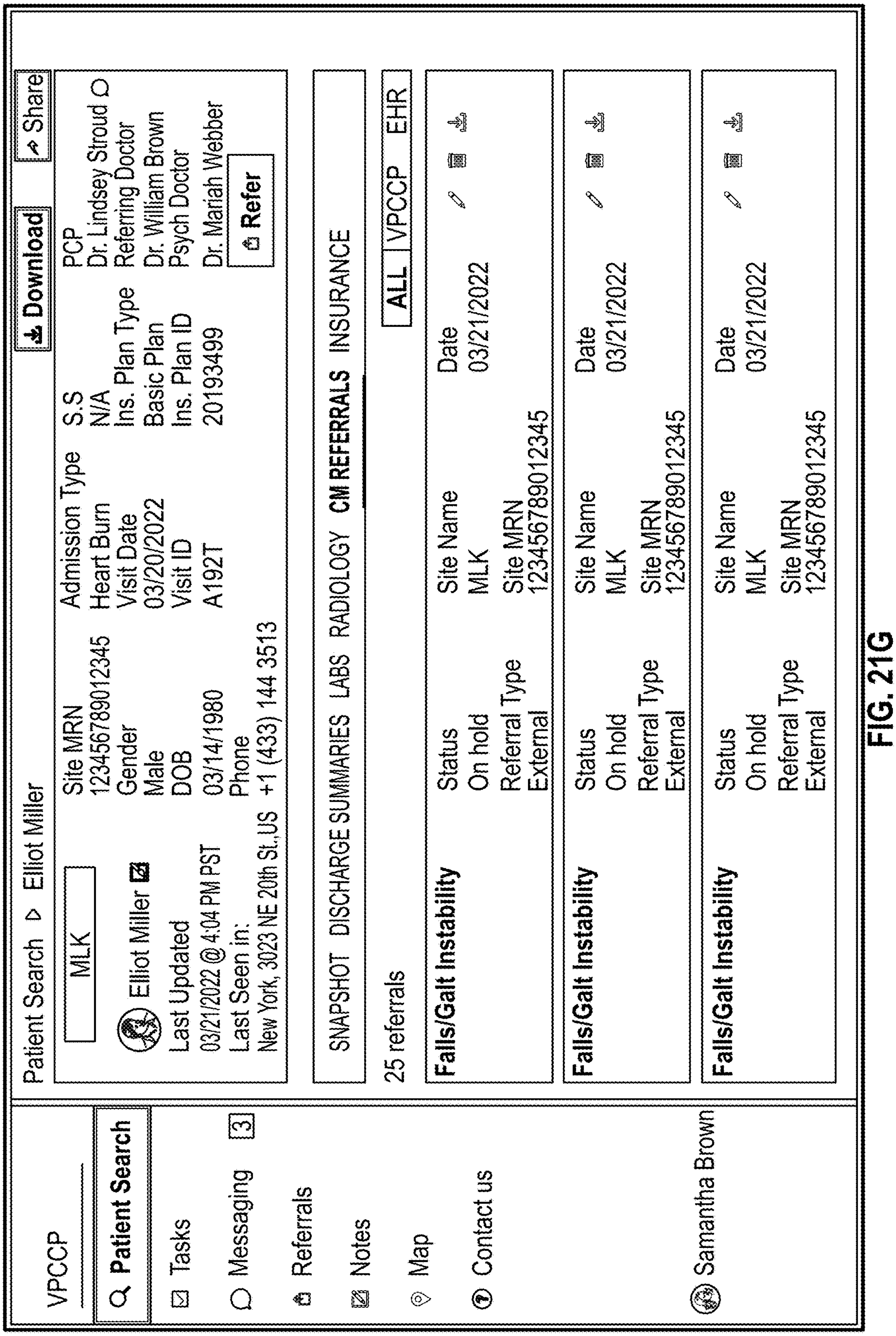
Figure 21H:
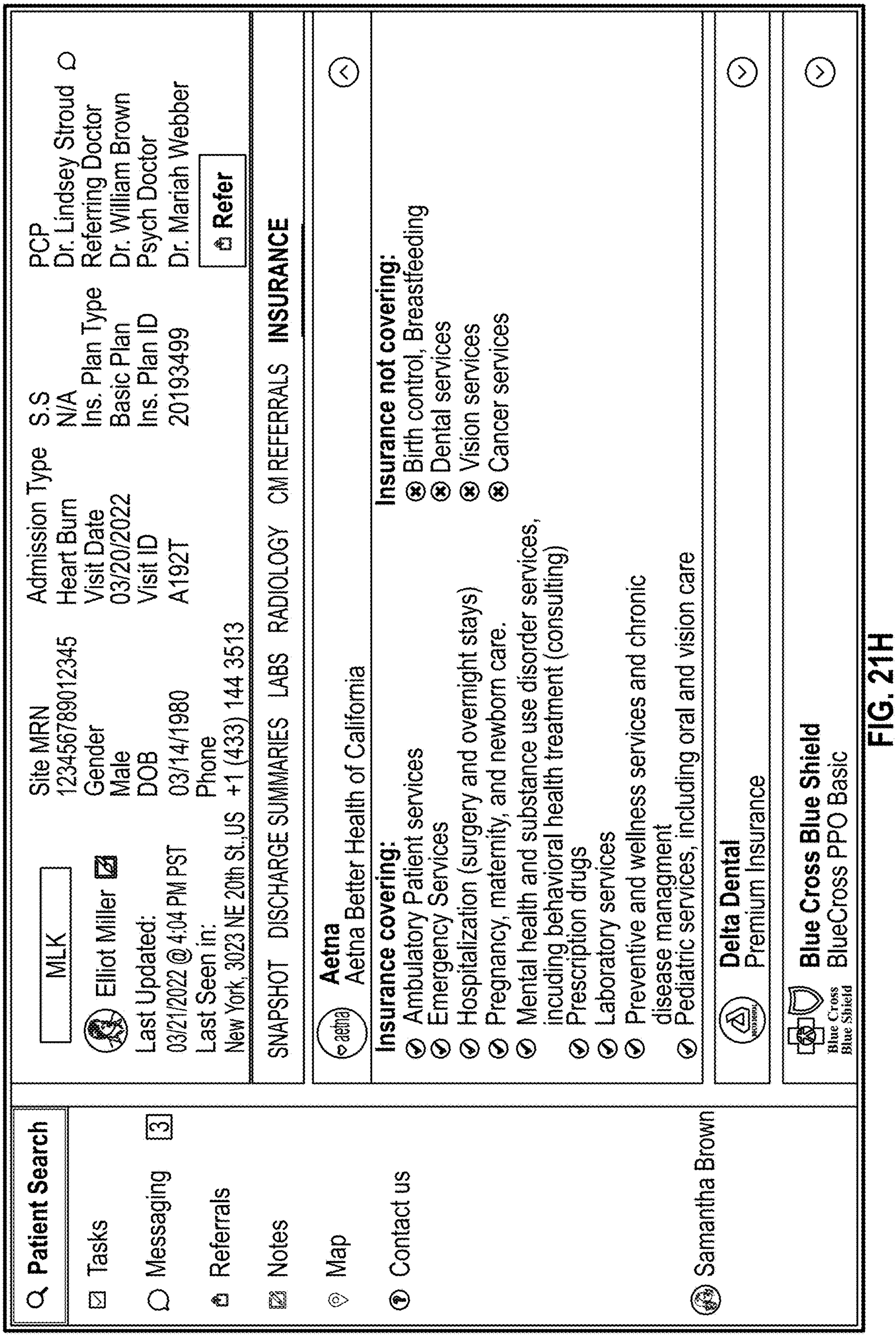

Referring to the example user interface illustrated in FIG. 21E, various patient documents may be accessed and viewed, such as a patient snapshot, discharge summaries, laboratory reports, radiology reports, care management (CM) referrals, and insurance information. In this example, a discharge summary is being presented. A control is provided via which the discharge summary may be downloaded. FIG. 21F illustrates an example where a lab report is being presented. FIG. 21G illustrates an example where CM referrals are being presented. FIG. 21F illustrates an example where insurance information is being presented.

Thus, methods and systems are described for providing secure, centralized, access to patient data from disparate sources, wherein such data is protected during transport over networks and while stored in a data store.

An aspect of the present disclosure relates to a multi-functional platform that provides concierge medical practitioners with a turnkey or customizable solution by way of a technologically advanced tool, in compliance with the Health Insurance Portability and Accountability Act ("HIPAA"). The example platform may be configured to integrate with disparate external platforms to facilitate physicians and other health care team members to establish, manage, expand, and market independent physician practices to large numbers of patients in a HIPAA compliant and organized manner, while reducing overhead by negating the need for office space.

An aspect of the present disclosure pertains to a system and method for a multi-functional platform that provides medical practitioners with a turnkey solution by way of a technologically advanced tool, in compliance with the Health Insurance Portability and Accountability Act ("HIPAA") that creates a concierge and patient centric experience for all patients. The example platform can integrate with external platforms to facilitate physicians and other health care team members to establish, manage, expand, and market independent physician practices, or independent physicians without a practice group, to an unlimited number of patients in a HIPAA compliant and organized manner, while reducing overhead by negating the need for office space, permanent staff, or costly infrastructure.

An aspect of the present disclosure relates to an example platform comprising a system and method of delivering care through a virtualized means with advanced tools of managing, treating, and coordinating care around educating, coaching, and sustaining primary care. The example platform optionally incorporates advanced technology, such as graphical and artificial intelligence ("AI") tools, allowing for the patient to customize care as their needs and those of their family are used to create services that are anticipatory of their unique health conditions as they age or experience changes in their health condition. The example platform enables caregiver collaboration and facilitates access to PHI to support the coordination of care.

The disclosed example platform is capable of deployment into underserved and rural regions to expand the availability of basic and advanced care, as well as allowing for lower income communities to access qualified physicians by matching low-income persons to physicians and other health care providers offering pro-bono care and support. The example platform decreases the burdens on the emergency rooms and lowers overall per patient healthcare costs by focusing on prevention, supporting sustainable outcomes by reinforcing and using holistic care plans, and expanding job creation and employment opportunities for health professionals and independent physician practices. The example platform can be used as a turnkey tool that enables concierge care, in office and virtual staff expansion and management, and a HIPAA compliant means of delivering services to patients.

An aspect of the present disclosure relates to an example platform configured to enable health care access to be provided to "care deserts" wherein limited access to medical care increases instances of aggravated illness and taxes the public care system. The example virtual platform allows physicians and other health care team members to provide care to individuals experiencing displacement, housing insecurity, transitional or vagrant living situations from economic crises, as well as those who live under itinerant conditions and low-income communities ("LICs"). The example platform optionally incorporates the use of the US Treasury Community Development Financial Institution ("CDFI") mapping system to identify, track, and measure engagement within LICs with health professionals.

An aspect of the present disclosure relates to a customized external Application Programming Interface ("API") platform that integrates patient data, health care resources and information through mobile online accessibility, search, geolocation, and notification functionality. The API platform facilitates health care professionals to provide necessary medical care, illness prevention and harm reduction in otherwise adverse environments and unfavorable conditions. The disclosed system uses advanced algorithms and artificial intelligence within a virtual, cloud-based graph platform to track, measure, record, and analyze patient care and activity to produce baseline predictors of emerging needs within various populations. These populations include but are not limited to those who are dispossessed for a variety of reasons, such as employment abroad, or because of economic and financial crises and insecurity. The use of filtering and subjective analysis allows for cataloging, identifying, and driving written and recorded content to patients based upon their patterns of use and care.

Due to more personalized care which focuses on prevention, the example platform while creating expanded opportunities for health professionals, is configured to advance a patient along the path at urgent care to primary care while decreasing their need to seek more costly paths of medical treatments and ensuring better outcomes through lifestyle changes and greater access to convenient care.

An aspect of the present disclosure relates to systems and methods that enable structuring rapid implementation and long-term support. An aspect of the present disclosure relates to systems and methods providing an implementation plan that is cloud-based, wherein a medical concierge feature will use the private cloud-based servers for accessing, processing, logging, storage, breaches, and redundancy backup of population health information. This example implementation is based on the HIPAA Security Controls Mapping Implementation Playbook.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications/alerts and user interfaces described herein may be provided via a Web page, a dedicated or non-dedicated phone application, computer application, a short messaging service message (e.g., SMS, MMS, etc.), instant messaging, email, push notification, audibly, a pop-up interface, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system, comprising:

a network interface;

at least one processing device operable to:

access over at least one secure communication channel encrypted data in a first format from a first source for a first subject;

access over at least one secure communication channel, via the network interface, encrypted data in a second format from a second source for the first subject;

decrypt the encrypted data in the first format from the first source for the first subject;

decrypt the encrypted data in the second format from the second source for the first subject;

convert the decrypted data in the first format from the first source to a third format;

store the data from the first source in the third format in a data store in a record associated with the first subject;

convert the decrypted data in the second format from the second format to the third format;

store the data from the second source in the third format in the data store in the record associated with the first subject;

receive, via a security layered application programming interface (API) a request for information regarding the first subject from a first system;

at least partly in response to the request for information, access from the data store at least a portion of the data from the first source and the second source;

transmit, via the security layered API, the data accessed from the data store in encrypted form to the first system and enable the transmitted data to be rendered in a first user interface;

receive an indication that a second subject is to reserve a first resource;

periodically access a first resource reservation system for the first resource;

detect a newly available time period for the first resource;

transmit a notification to the second subject regarding the newly available time period for the first resource; and enable the second subject to reserve the first resource for the newly available time period.

2. A system, comprising:

a network interface;

at least one processing device operable to:

access over at least one secure communication channel encrypted data in a first format from a first source for a first subject;

access over at least one secure communication channel, via the network interface, encrypted data in a second format from a second source for the first subject;

decrypt the encrypted data in the first format from the first source for the first subject;

decrypt the encrypted data in the second format from the second source for the first subject;

convert the decrypted data in the first format from the first source to a third format;

store the data from the first source in the third format in a data store in a record associated with the first subject;

convert the decrypted data in the second format from the second format to the third format;

store the data from the second source in the third format in the data store in the record associated with the first subject;

receive, via a security layered application programming interface (API) a request for information regarding the first subject from a first system;

at least partly in response to the request for information, access from the data store at least a portion of the data from the first source and the second source;

transmit, via the security layered API, the data accessed from the data store in encrypted form to the first system and enable the transmitted data to be rendered in a first user interface; and perform authentication on an application attempting to access the security layered API, determine if an authenticated application is authorized to access data being requested by the authenticated application, perform input validation and sanitization on received data, and to perform throttling.

3. The system as defined in claim 1, wherein the system is configured to:

provide a dedicated virtual software environment, a dedicated hardware environment, and a multi-tenant environment.

4. The system as defined in claim 1, wherein the system is configured to:

utilize the security layered API configured to provide search, web, application and notification functions.

5. The system as defined in claim 1, wherein the system is configured to:

process an internal referral to a first resource; and process an external referral to a second resource.

6. The system as defined in claim 1, wherein the system is configured to:

perform device discovery and communication using a distributed hierarchical registry.

7. The system as defined in claim 1, wherein the system is configured to:

perform data cleaning and conflict resolution on data from the first source and data from the second source.

8. The system as defined in claim 1, wherein the system is configured to issue JSON queries to request elements of stored JSON documents comprising patient data.

9. The system as defined in claim 1, wherein the data from the first source stored in the third format is encrypted using a customer master key.

10. The system as defined in claim 1, wherein the system is configured to:

receive a search request for a patient record from a requester system, the search request comprising at least a portion of a patient name;

identify patients matching the search request;

score a closeness of matches for the identified patients; and provide search results comprising at least a portion of the identified patients, the search results comprising, for a given identified patient a name, birthdate, sex, age, telephone number, service provider, and a score indicating the closeness of match.

11. The system as defined in claim 1, wherein the system is configured to:

populate a first user interface using data accessed from a database with data comprising a student name, vaccinations received by the student and respective vaccination dates.

12. A computer-implemented method, the method comprising:

accessing over at least one secure communication channel encrypted data in a first format from a first source for a first subject;

accessing over at least one secure communication channel encrypted data in a second format from a second source for the first subject;

decrypting the encrypted data in the first format from the first source for the first subject;

decrypting the encrypted data in the second format from the second source for the first subject;

converting the decrypted data in the first format from the first source to a third format;

storing the data from the first source in the third format in a data store in a record associated with the first subject;

converting the decrypted data in the second format from the second format to the third format;

storing the data from the second source in the third format in the data store in the record associated with the first subject;

receiving, via a security layered application programming interface (API) a request for information regarding the first subject from a first system;

at least partly in response to the request for information, accessing from the data store at least a portion of the data from the first source and the second source;

transmitting, via the security layered API, the data accessed from the data store in encrypted form to the first system and enable the transmitted data to be rendered in a first user interface; and performing authentication on an application attempting to access the security layered API, determining if an authenticated application is authorized to access data being requested by the authenticated application, and performing input validation and sanitization on received data.

13. A computer-implemented method, the method comprising:

accessing over at least one secure communication channel encrypted data in a first format from a first source for a first subject;

accessing over at least one secure communication channel encrypted data in a second format from a second source for the first subject;

decrypting the encrypted data in the first format from the first source for the first subject;

decrypting the encrypted data in the second format from the second source for the first subject;

converting the decrypted data in the first format from the first source to a third format;

storing the data from the first source in the third format in a data store in a record associated with the first subject;

converting the decrypted data in the second format from the second format to the third format;

storing the data from the second source in the third format in the data store in the record associated with the first subject;

receiving, via a security layered application programming interface (API) a request for information regarding the first subject from a first system;

at least partly in response to the request for information, accessing from the data store at least a portion of the data from the first source and the second source;

transmitting, via the security layered API, the data accessed from the data store in encrypted form to the first system and enable the transmitted data to be rendered in a first user interface;

receiving an indication that a second subject is to reserve a first resource;

periodically accessing a first resource reservation system for the first resource;

detecting a newly available time period for the first resource;

transmitting a notification to the second subject regarding the newly available time period for the first resource; and enabling the second subject to reserve the first resource for the newly available time period.

14. The method as defined in claim 12, the method further comprising:

providing a dedicated virtual software environment, a dedicated hardware environment, and a multi-tenant environment.

15. The method as defined in claim 12, the method further comprising:

utilizing the security layered API configured to provide search, web, application and notification functions.

16. The method as defined in claim 12, the method further comprising:

processing an internal referral to a first resource; and processing an external referral to a second resource.

17. The method as defined in claim 12, the method further comprising:

performing device discovery and communication using a distributed hierarchical registry.

18. The method as defined in claim 12, the method further comprising:

performing data cleaning and conflict resolution on data from the first source and data from the second source.

19. The method as defined in claim 12, the method further comprising issuing one or more JSON queries to request elements of stored JSON documents comprising patient data.

20. The method as defined in claim 12, wherein the data from the first source stored in the third format is encrypted using a customer master key.

21. The method as defined in claim 12, the method further comprising:

receiving a search request for a patient record from a requester system, the search request comprising at least a portion of a patient name;

identifying patients matching the search request;

scoring a closeness of matches for the identified patients; and providing search results comprising at least a portion of the identified patients, the search results comprising, for a given identified patient a name, birthdate, sex, age, telephone number, service provider, and a score indicating the closeness of match.

22. The method as defined in claim 12, the method further comprising:

populating a first user interface using data accessed from a database with data comprising a student name, vaccinations received by the student and respective vaccination dates.

* * * * *